US012569846B2

(12) United States Patent
Son et al.

(10) Patent No.: US 12,569,846 B2
(45) Date of Patent: Mar. 10, 2026

(54) MICROFLUIDIC REACTION VESSEL ARRAY WITH PATTERNED FILMS

(71) Applicant: Kryptos Biotechnologies, Inc., Hayward, CA (US)

(72) Inventors: Jun Ho Son, Albany, CA (US); Luc Bousse, Los Altos, CA (US)

(73) Assignee: Kryptos Biotechnologies, Inc., Hayward, CA (US)

(*) Notice: Subject to any disclaimer, the term of this patent is extended or adjusted under 35 U.S.C. 154(b) by 0 days.

(21) Appl. No.: 18/340,296

(22) Filed: Jun. 23, 2023

(65) Prior Publication Data

US 2024/0165612 A1 May 23, 2024

Related U.S. Application Data

(63) Continuation of application No. 16/924,041, filed on Jul. 8, 2020, now abandoned.

(Continued)

(51) Int. Cl.
*G01N 1/40* (2006.01)
*B01L 3/00* (2006.01)
*B01L 7/00* (2006.01)

(52) U.S. Cl.
CPC ........... *B01L 3/502715* (2013.01); *B01L 7/52* (2013.01); *B01L 2300/0816* (2013.01); *B01L 2300/1861* (2013.01)

(58) Field of Classification Search
CPC ................. B01L 3/502715; B01L 7/52; B01L 2300/0816; B01L 2300/1861; G01N 1/4055; G01N 1/40; G01N 1/28

(Continued)

(56) References Cited

U.S. PATENT DOCUMENTS 7,118,910 B2 * 10/2006 Unger ................. B01L 3/50851 356/497
2004/0067051 A1 4/2004 Kylberg et al.

(Continued)

FOREIGN PATENT DOCUMENTS

EP 2316569 A1 5/2011
JP 2004156925 A 6/2004
WO 2016115542 A1 7/2016

OTHER PUBLICATIONS

Application No. EP20837765.5 , Extended European Search Report, Mailed On Sep. 19, 2023, 12 pages.

(Continued)

*Primary Examiner* — Christine T Mui
(74) *Attorney, Agent, or Firm* — Kilpatrick Townsend & Stockton LLP

(57) ABSTRACT

This disclosure describes various microfluidic devices that may be used in thermal cyclic fluid samples. Some of these devices may include a plurality of microwells that may be coupled by interconnected fluidic channels. These microwells may not be physically separated and yet may include features allowing for effective isolation of target molecules within each microwell. Other devices may include a plurality of microwells that may not be interconnected. The devices may also include mechanisms for causing a fluid to flow across the device. The devices may also include light-absorbing films for converting light energy to heat so as to allow for thermal cycling of samples within the microwells.

19 Claims, 39 Drawing Sheets

Related U.S. Application Data

(60) Provisional application No. 62/872,168, filed on Jul. 9, 2019.

(58) Field of Classification Search
USPC .................................................. 422/502, 500
See application file for complete search history.

(56) References Cited

U.S. PATENT DOCUMENTS

| | | | |
|---|---|---|---|
| 2005/0129582 | A1 | 6/2005 | Breidford et al. |
| 2008/0280776 | A1 | 11/2008 | Bashir et al. |
| 2011/0053151 | A1 | 3/2011 | Hansen et al. |
| 2011/0079094 | A1 | 4/2011 | Gransee et al. |
| 2011/0151499 | A1 | 6/2011 | Quake et al. |
| 2013/0171679 | A1 | 7/2013 | Lee et al. |
| 2014/0073013 | A1 | 3/2014 | Gorman et al. |
| 2015/0141268 | A1 | 5/2015 | Rothberg et al. |
| 2015/0290669 | A1 | 10/2015 | Li et al. |
| 2016/0144362 | A1 | 5/2016 | Lee et al. |
| 2018/0297028 | A1 | 10/2018 | Lee et al. |
| 2019/0032114 | A1 | 1/2019 | Trivedi |

OTHER PUBLICATIONS

U.S. Appl. No. 16/924,041, Non-Final Office Action, Mailed on Jan. 25, 2023, 13 pages.
Alonso et al., "Advances in Microfluidics-Based Technologies for Single Cell Culture", Advanced Biosystems, vol. 3, Issue 11, Apr. 14, 2019, pp. 1-10.
Eddings et al., "A PDMS-Based Gas Permeation Pump for on-Chip Fluid Handling in Microfluidic Devices", Journal of Micromechanics and Microengineering, vol. 16, Sep. 26, 2006, pp. 2396-2402.
Application No. EP16738021.1, Extended European Search Report, Mailed on May 24, 2018, 6 pages.
Application No. EP16738021.1, Office Action, Mailed on Nov. 26, 2019, 4 pages.
Application No. EP16831290.8 Extended European Search Report, Mailed on Jan. 30, 2019, 9 pages.
Application No. EP16831290.8, Office Action, Mailed on Nov. 14, 2019, 5 pages.
EP20837765.5, "Partial Supplementary European Search Report", Jun. 15, 2023, 13 pages.
Guan et al., "Streamline Based Design Guideline for Deterministic Microfluidic Hydrodynamic Single Cell Traps", Biomicrofluidics,, Mar. 6, 2015, pp. 1-10.
Kim et al., "Nanodroplet Real-Time PCR System with Laser Assisted Heating", Optics Express, vol. 17, Issue No. 1, Jan. 5, 2009, pp. 218-227.
Kim et al., "Petri Dish PCR: Laser-Heated Reactions in Nanoliter Droplet Arrays", Lab on a Chip, vol. 9, No. 9, May 7, 2009, pp. 1230-1235.
Kolnik et al., "Vacuum-Assisted Cell Loading Enables Shear-Free Mammalian Microfluidic Culture", Lab Chip, vol. 12, No. 22, Aug. 24, 2012, pp. 4732-4737.
Lamberti et al., "PDMS Membranes with Tunable Gas Permeability for Microfluidic Applications", Royal Society of Chemistry, RSC Advances, vol. 4, Nov. 7, 2014, pp. 61415-61419.
Miralles et al., "A Review on Heating and Temperature Control in Microfluidic Systems: Techniques and Applications", Diagnostics, vol. 3, No. 1, 2013, pp. 33-67.
Application No. PCT/US2020/041278, International Preliminary Report on Patentability, Mailed on Jan. 20, 2022, 8 pages.
Application No. PCT/US2020/041278, International Search Report and Written Opinion, Mailed on Nov. 24, 2020, 12 pages.
PCT/US2020/041278, "Invitation To Pay Additional Fees And, Where Applicable, Protest Fee", Sep. 25, 2020, 3 pages.
Roche et al., "Demonstration of a Plasmonic Thermocycler for The Amplification of Human Androgen Receptor DNA", The Analyst, vol. 137, No. 19, Oct. 7, 2012, pp. 4475-4481.
Son et al., "Ultrafast Photonic PCR", Light: Science & Applications, vol. 4, Jul. 31, 2015, pp. 1-7.
Xu et al., "Vacuum-Driven Power-Free Microfluidics Utilizing the Gas Solubility or Permeability of Polydimethylsiloxane (PDMS)", Lab on a Chip, Issue 20, Oct. 21, 2015, pp. 1-18.
Yesilkoy et al., "Highly Efficient and Gentle Trapping of Single Cells in Large Microfluidic Arrays for Time- lapse Experiments", Biomicrofluidics, 2016, pp. 1-8.
Yu et al., "Quantitative Polymerase Chain Reaction using Infrared Heating on a Microfluidic Chip", Analytical Chemistry, vol. 84, No. 6, Feb. 17, 2012, pp. 2825-2829.

* cited by examiner

*A-A*

B-B

2300

MICROFLUIDIC REACTION VESSEL ARRAY WITH PATTERNED FILMS

CROSS-REFERENCE TO RELATED APPLICATIONS

This application claims benefit and is a continuation of application Ser. No. 16/924,041 filed Jul. 8, 2020, which claims benefit of U.S. Provisional Patent Application No. 62/872,168, filed Jul. 9, 2019, which applications are hereby incorporated by reference in their entirety.

BACKGROUND

Reaction vessels are often used to perform various operations on DNA strands that can include operations such as polymerase chain reaction (PCR) and DNA sequencing. Polymerase chain reaction (PCR) has become an essential technique in the fields of life science, clinical laboratories, agricultural science, environmental science, and forensic science. PCR requires thermal cycling, or repeated temperature changes between two or three discrete temperatures to amplify specific nucleic acid target sequences. To achieve such thermal cycling, conventional bench-top thermal cyclers generally use a metal heating block powered by Peltier elements. Unfortunately, this method of thermally cycling the materials within the reaction vessels can be slower than desired. For these reasons, alternate means that improve the speed and/or reliability of the thermal cycling are desirable.

SUMMARY OF THE INVENTION

This disclosure relates to methods and apparatuses suitable for use with a reaction vessel.

In some embodiments, a microfluidic device may include the following: (a) a first substrate formed of gas-permeable materials, the first substrate including: a network of interconnected fluidic channels disposed or formed within the first substrate connected to at least one sample inlet and a plurality of micro-wells, and a network of interconnected circulation channels disposed or formed within the first substrate connected to at least one suction outlet; (b) a second substrate mounted to the first substrate; (c) a vacuum source operably coupled to the network of interconnected circulation channels and configured to evacuate the network of interconnected circulation channels, wherein the network of interconnected fluidic channels are located in proximity to the network of interconnected circulation channels, and wherein gases located in the network of fluidic structures diffuse into the evacuated (or evacuating) circulation channels through the first substrate. In some embodiments, the second substrate may be gas-impermeable. The diffusion may create a negative pressure within at least a portion of the network of interconnected fluidic channels and cause movement of a sample fluid in the network of interconnected fluidic channels (e.g., such that the movement of fluid causes the microwells to be loaded with the sample fluid). The sample fluid includes a liquid from the sample inlet. The microfluidic device may also include a plurality of patterned films arranged across regions of the second substrate that corresponds to the positions of the plurality of micro-wells.

In some embodiments, a filler liquid source may be operably coupled to the circulation channels, wherein the circulation channels may be configured to be filled with the filler liquid after the microwells are loaded with the sample fluid.

In some embodiments, the circulation channels may include a first circulation channel and a second circulation channel, wherein the first circulation channel is operably coupled to a first vacuum source and the second circulation channel is operably coupled to a second vacuum source, wherein the first vacuum source is distinct from the second vacuum source. The first circulation channel may be capable of having a first concentration of air therein due to the first vacuum source, and wherein the second circulation channel is capable of having a second concentration of air therein due to the second vacuum source, wherein the first concentration is different from the second concentration. In some embodiments, the circulation channels may include a first circulation channel including a first segment and a second segment operably coupled to a single vacuum source, further including a valve for isolating the first segment from the second segment.

In some embodiments, the circulation channels may include a first circulation channel that surrounds a majority of a perimeter of a first microwell. As an example, the first circulation channel may surround 70% or more of the perimeter of the first microwell. As another example, diverse circulation channel may surround 60% or more of the perimeter of the first microwell. In some embodiments, a first fluidic channel may lead to the first microwell, and the first circulation channel may surround substantially all of the perimeter not impinged by the first fluidic channel. In some embodiments, a distance between the first fluidic channel and the first circulation channel is minimized. In some embodiments, a distance between the first fluidic channel is less than a length or width of the first microwell. In some embodiments, the distance is less than 50% of a length or width of the first microwell. In some embodiments, the distance is less than 25% of a length or width of the first microwell.

In some embodiments, a plurality of patterned films may be arranged across regions of the second substrate that correspond to positions of the plurality of microwells, wherein the patterned films are configured to absorb photonic energy to increase a temperature of a corresponding microwell.

In some embodiments, a method may include evacuating (e.g., using a vacuum source) one or more circulation channels of a fluidic device, wherein the circulation channels are located in proximity to at least a portion of a network of interconnected fluidic channels coupled to at least one sample inlet and a plurality of microwells, and wherein the circulation channels and the network of interconnected fluidic channels are disposed in a first substrate including a gas-permeable material; causing a gas within the network of interconnected fluidic channels to diffuse through the first substrate into the circulation channels; and causing a sample fluid to move from the sample inlet toward the microwells.

In some embodiments, the circulation channels may include a first circulation channel and a second circulation channel, wherein the first circulation channel is operably coupled to a first vacuum source and the second circulation channel is operably coupled to a second vacuum source. In some embodiments, using the first vacuum source, a vacuum of a first strength may be applied to the first circulation channel to create a first concentration of air in the first circulation channel, wherein the first circulation channel is in proximity to a first microwell. The second vacuum source may be used to apply a vacuum of a second strength to the first circulation channel to create a second concentration of air in the second circulation channel, wherein the second circulation channel is in proximity to a second microwell, wherein the first concentration is different from the second concentration.

In some embodiments, a method of thermal cycling may include loading a plurality of microwells of a fluidic device with one or more sample fluids, wherein the fluidic device includes a network of interconnected fluidic channels coupled to at least one sample inlet and the microwells, wherein the microwells are physically separated but connected to each other via the network of interconnected fluidic channels; and thermal cycling a first microwell. In some embodiments, a first microwell is connected to a second microwell via a first fluidic channel. The first microwell may be separated from the second microwell by a first distance that is greater than a distance at which one or more molecules are capable of diffusing during thermal cycling. The first fluidic channel may separate the first microwell from the second microwell by a first distance greater than a distance at which one or more molecules (e.g., DNA molecules, RNA molecules, nucleic acids, nucleotide molecules, fluorescent dyes) are capable of diffusing during thermal cycling. As an example, the distance may be around 100 μm to 1 mm. As another example, the distance may be around 100 μm to 10 mm. As another example, the distance may be around 800 μm.

In some embodiments, a first photonic energy may be applied (e.g., using a light emitting diode) to a first film corresponding to the first microwell such that the first film absorbs the photonic energy to increase a temperature of the first microwell by a first amount. A second photonic energy may be applied to a second film corresponding to a second microwell such that the second film absorbs the photonic energy to increase a temperature of the second microwell by a second amount. In some embodiments, fluid in the first microwell and the second microwell is thermally cycled, and fluid in the first fluidic channel may remain substantially not thermally cycled. In some embodiments, the first amount to be different from the second amount. In some embodiments, the first photonic energy may be emitted by a first source, and the second photonic energy may be emitted by a second source different from the first source. In some embodiments, the number of microwells is the same as the number of photonic energy sources (i.e. one microwell per one photonic energy source). In some embodiments, a photonic energy source is a micro light-emitting diode (microLED) or a mini light emitting diode (miniLED). In some embodiments, the first film and the second film may be patterned films, wherein the first film is of a different pattern than the second film. In some embodiments, the photonic energy may include infrared light. In some embodiments, the photonic energy may include light at a wavelength of 940 nm.

In some embodiments, a reaction vessel assembly includes the following: a reaction vessel, including: a housing component; a reaction chamber defined by the housing component; and a light absorbing layer conforming to a portion of an interior-facing surface of the housing component that defines the reaction chamber, the light absorbing layer including an electrically conductive pathway; a first energy source configured to direct light through at least a portion of the housing component at a portion of the electrically conductive pathway; and a second energy source configured to direct electrical energy through the electrically conductive pathway.

In some embodiments, the reaction vessel assembly also includes a processor configured to determine a temperature within the reaction chamber based upon a voltage drop of the electrical energy after passing through the electrically conductive pathway. In some embodiments, the electrical energy is conducted through an entirety of the light absorbing layer. In other embodiments, the light absorbing layer includes a first layer in direct contact with the housing component and a second layer stacked atop the first layer that forms the electrically conductive pathway, wherein the first layer is electrically insulated from the second layer.

In some embodiments, a microfluidic device may be configured for use with a fluid sample including a liquid and a plurality of cells (e.g., for thermal cycling portions of the fluid sample, for example, for PCR or other applications). In some embodiments, microfluidic device may include a plurality of microwells fluidically coupled to each other via a plurality of fluidic channels, wherein each of the plurality of microwells is configured to trap a single cell of the plurality of cells; a sample inlet coupled to a first microwell of the plurality of microwells via a first fluidic channel of the plurality of fluidic channels; a suction source coupled to a second microwell of the plurality of microwells via a second fluidic channel of the plurality of fluidic channels, wherein the suction source is configured to draw the fluid sample from the sample inlet through the plurality of microwells via the plurality of fluidic channels; and a plurality of discrete light-absorbing regions disposed adjacent to the plurality of microwells, wherein each discrete light-absorbing region is configured to absorb light energy from a light source to increase a temperature of an adjacent microwell.

In some embodiments, the plurality of microwells are arranged in series such that the fluid sample is configured to flow sequentially through the plurality of microwells.

In some embodiments, each of the plurality of microwells includes: a raised shelf region partially bounded by trapping walls, wherein the shelf region is configured to retain a single cell and wherein the shelf region has a first interior gap height; and a reservoir portion fluidically coupled to the shelf region, wherein the fluid sample is configured to flow into the reservoir portion past the shelf region, and wherein the reservoir portion has a second interior gap height that is greater than the first interior gap height.

In some embodiments, each of the plurality of microwells further includes an antechamber, each antechamber having a first end coupled to a fluidic channel and a second end coupled to the shelf region, wherein the second end includes guiding walls that taper inward to guide the sample fluid toward a middle of the shelf region. In some embodiments, the trapping walls include an aperture at a central portion of the shelf region, wherein the aperture is sized to admit the liquid of the fluid sample into the reservoir portion but not admit a cell of the fluid sample through the aperture. In some embodiments, the reservoir portion is coupled to a fluidic channel such that the fluid sample is configured to flow from the reservoir portion into the fluidic channel. In some embodiments, the plurality of fluidic channels includes one or more fluidic channels including inward constrictions to move cells of the sample fluid toward a center of the one or more fluidic channels. In some embodiments, the first interior gap height is 20 micrometers and the second interior gap height is 50 micrometers.

In some embodiments, each of the plurality of discrete light-absorbing regions is disposed adjacent to a single microwell of the plurality of microwells.

In some embodiments, the plurality of discrete light-absorbing regions is disposed on a substrate beneath or above the plurality of microwells. In some embodiments, the plurality of discrete light-absorbing regions is disposed within the plurality of microwells. In some embodiments, the suction source is a syringe pump. In some embodiments, the suction source is a vacuum source.

In some embodiments, a first microwell of the plurality of microwells is separated from a second microwell of the plurality of microwells by a third fluidic channel of the plurality of fluidic channels, wherein a length of the third fluidic channel is greater than a distance at which target molecules are capable of diffusing during the thermal cycling process. In some embodiments, the third fluidic channel is shaped to have a meandering pathway.

In some embodiments, a microfluidic device configured for use in thermal cycling a sample (e.g., a fluid sample including a liquid and a plurality of cells) may include a sample inlet; a plurality of microwells each fluidically coupled to the sample inlet by a respective fluidic channel, wherein each microwell is isolated from other microwells and each fluidic channel is isolated from other fluidic channels; a plurality of interconnected circulation channels each disposed around at least a portion of a perimeter of each of the plurality of microwells; a suction source coupled to each of the circulation channels and configured to evacuate the circulation channels to cause a gas within the fluidic channels to diffuse into the circulation channels and thereby draw the fluid sample into the plurality of microwells; and a plurality of discrete light-absorbing regions disposed adjacent to the plurality of microwells, wherein each discrete light-absorbing region is configured to absorb light energy from a light source to increase a temperature of an adjacent microwell.

In some embodiments, each microwell is sized to retain a volume of the fluid sample determined to statistically limit the number of cells present in the volume to a predetermined number. In some embodiments, each microwell is 600 micrometers×600 micrometers×50 micrometers. In some embodiments, each microwell has an internal volume of 16 nanoliters.

In some embodiments, each of the plurality of discrete light-absorbing regions is disposed adjacent to a single microwell of the plurality of microwells. In some embodiments, the plurality of discrete light-absorbing regions is disposed on a substrate beneath or above the plurality of microwells. In some embodiments, the plurality of discrete light-absorbing regions is disposed within the plurality of microwells.

In some embodiments, the suction source is a syringe pump. In some embodiments, the suction sources a vacuum source.

In some embodiments, one or more of the plurality of fluidic channels are shaped to have a meandering pathway.

In some embodiments, a microfluidic device may be used to perform a method of thermal cycling portions of a fluid sample including a liquid and a plurality of cells. The method may include engaging a suction source to draw the fluid sample into a plurality of microwells that are fluidically coupled to each other via a plurality of fluidic channels, wherein each of the plurality of microwells has a trapping region configured to trap a single cells; trapping, within each trapping region of one or more of the plurality of microwells, a single cell of the plurality of cells; causing a flushing solution to flow through the plurality of microwells to flush away untrapped cells; and directing light energy toward a plurality of discrete light-absorbing regions disposed adjacent to the plurality of microwells so as to cause the discrete light-absorbing regions to absorb the light energy and increase a temperature of an adjacent microwell.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
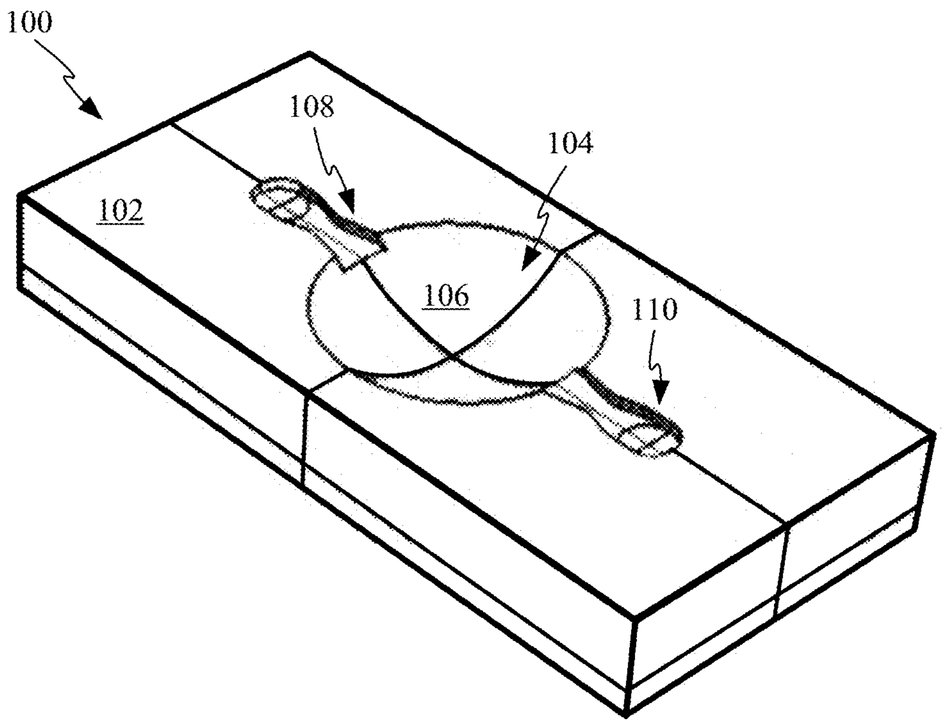
FIG. 1A shows an exemplary reaction vessel suitable for use with the described embodiments.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Microfluidics systems or devices have widespread use in chemistry and biology. In such devices, fluids are transported, mixed, separated or otherwise processed. In many microfluidic devices, various applications rely on passive fluid control using capillary forces. In other applications, external actuation means (e.g., rotary drives) are used for the directed transport of fluids. "Active microfluidics" refers to the defined manipulation of the working fluid by active (micro) components such as micropumps or microvalves. Micropumps supply fluids in a continuous manner or are used for dosing. Microvalves determine the flow direction or the mode of movement of pumped liquids. Processes that are normally carried out in a laboratory can be miniaturized on a single chip in order to enhance efficiency and mobility as well to reduce sample and reagent volumes. Microfluidic structures can include micropneumatic systems, i.e., microsystems for the handling of off-chip fluids (liquid pumps, gas valves, etc.), and microfluidic structures for the on-chip handling of nanoliter (nl) and picoliter (pl) volumes (Nguyen and Wereley, Fundamentals and Applications of Microfluidics, Artech House, 2006).

Advances in microfluidics technology are revolutionizing molecular biology procedures for enzymatic analysis (e.g., glucose and lactate assays), DNA analysis (e.g., polymerase chain reaction and high-throughput sequencing), and proteomics. Microfluidic biochips integrate assay operations such as detection, as well as sample pre-treatment and sample preparation on one chip (Herold and Rasooly, editors, Lab-on-a-Chip Technology: Fabrication and Microfluidics, Caister Academic Press, 2009; Herold and Rasooly, editors, Lab-on-a-Chip Technology: Biomolecular Separation and Analysis, Caister Academic Press, 2009). An emerging application area for biochips is clinical pathology, especially the immediate point-of-care diagnosis of diseases. In addition, some microfluidics-based devices are capable of continuous sampling and real-time testing of air/water samples for biochemical toxins and other dangerous pathogens.

Many types of microfluidic architectures are currently in use and include open microfluidics, continuous-flow microfluidics, droplet-based microfluidics, digital microfluidics, paper-based microfluidics and DNA chips (microarrays).

In open microfluidics, at least one boundary of the system is removed, exposing the fluid to air or another interface (i.e., liquid) (Berthier et al., Open microfluidics, Hoboken, NJ: Wiley, Scrivener Publishing, 2016; Pfohl et al., Chem Phys Chem. 4:1291-1298, 2003; Kaigala et al., Angewandte Chemie Internationalmicrofluidic Edition. 51:11224-11240, 2012). Advantages of open microfluidics include accessibility to the flowing liquid for intervention, larger liquid-gas surface area, and minimized bubble formation (Berthier et al., Open microfluidics, Hoboken, NJ: Wiley, Scrivener Publishing, 2016; Kaigala et al., Ange. Chemie Int. Ed. 51:11224-11240, 2012; Li et al., Lab on a Chip 17: 1436-1441). Another advantage of open microfluidics is the ability to integrate open systems with surface-tension driven fluid flow, which eliminates the need for external pumping methods such as peristaltic or syringe pumps (Casavant et al., Proc. Nat. Acad. Sci. USA 110:10111-10116, 2013). Open microfluidic devices are also inexpensive to fabricate by milling, thermoforming, and hot embossing (Guckenberger et al., Lab on a Chip, 15: 2364-2378, 2015; Truckenmuller et al., J. Micromechanics and Microengineering, 12: 375-379, 2002; Jeon et al., Biomed. Microdevices 13: 325-333, 2010; Young et al., Anal. Chem. 83:1408-1417, 2011). In addition, open microfluidics eliminates the need to glue or bond a cover for devices which could be detrimental for capillary flows. Examples of open microfluidics include open-channel microfluidics, rail-based microfluidics, paper-based, and thread-based microfluidics (Berthier et al., Open microfluidics, Hoboken, NJ: Wiley, Scrivener Publishing, 2016; Casavant et al., Proc. Nat. Acad. Sci. USA 110:10111-10116, 2013; Bouaidat et al., Lab on a Chip 5: 827, 2005).

Continuous flow microfluidics are based on the manipulation of continuous liquid flow through microfabricated channels (Nguyen et al., Micromachines 8:186, 2017; Antfolk and Laurell, Anal. Chim. Acta 965:9-35, 2017). Actuation of liquid flow is implemented either by external pressure sources, external mechanical pumps, integrated mechanical micropumps, or by combinations of capillary forces and electrokinetic mechanisms. Continuous-flow devices are useful for many well-defined and simple biochemical applications and for certain tasks such as chemical separations, but they are less suitable for tasks requiring a high degree of flexibility or fluid manipulations. Process monitoring capabilities in continuous-flow systems can be achieved with highly sensitive microfluidic flow sensors based on micro-electro-mechanical systems (MEMS) technology, which offers resolutions down to the nanoliter range.

Droplet-based microfluidics manipulates discrete volumes of fluids in immiscible phases with low Reynolds number and laminar flow regimes (see reviews at Shembekar et al., Lab on a Chip 8:1314-1331, 2016; Zhao-Miao et al., Chinese J. Anal. Chem. 45:282-296, 2017. Microdroplets allow for the manipulation of miniature volumes (μl to fl) of fluids conveniently, provide good mixing, encapsulation, sorting, and sensing, and are suitable for high throughput applications (Chokkalingam et al., Lab on a Chip 13:4740-4744, 2013).

Alternatives to closed-channel continuous-flow systems include open structures, wherein discrete, independently controllable droplets are manipulated on a substrate using electrowetting. By using discrete unit-volume droplets (Chokkalingam et al., Appl. Physics Lett. 93:254101, 2008), a microfluidic function can be reduced to a set of repeated basic operations, i.e., moving one unit of fluid over one unit of distance. This "digitization" method facilitates the use of a hierarchical, cell-based approach for microfluidic biochip design. Therefore, digital microfluidics offers a flexible, scalable system architecture as well as high fault-tolerance. Moreover, because each droplet can be controlled independently, these systems also have dynamic reconfigurability, whereby groups of unit cells in a microfluidic array can be reconfigured to change their functionality during the concurrent execution of a set of bioassays. Alternatively, droplets can be manipulated in confined microfluidic channels. One common actuation method for digital microfluidics is electrowetting-on-dielectric (EWOD) (reviewed in Nelson and Kim, J. Adhesion Sci. Tech., 26:12-17, 1747-1771, 2012). Many lab-on-a-chip applications have been demonstrated within the digital microfluidics paradigm using electrowetting. However, recently other techniques for droplet manipulation have also been demonstrated using magnetic force (Zhang and Nguyen, Lab on a Chip 17.6: 994-1008, 2017), surface acoustic waves, optoelectrowetting, mechanical actuation (Shemesh et al., Biomed. Microdevices 12:907-914, 2010), etc.

Paper-based microfluidics (Berthier et al., Open Microfluidics, John Wiley & Sons, Inc. pp. 229-256, 2016) rely on the phenomenon of capillary penetration in porous media. In order to tune fluid penetration in porous substrates such as paper in two and three dimensions, the pore structure, wettability and geometry of the microfluidic devices can be controlled, while the viscosity and evaporation rate of the liquid play a further significant role. Many such devices feature hydrophobic barriers on hydrophilic paper that passively transport aqueous solutions to outlets where biological reactions take place (Galindo-Rosales, Complex Fluid-Flows in Microfluidics, Springer, 2017).

Early biochips were based on the idea of a DNA microarray, e.g., the GeneChip DNA array from Affymetrix, which is a piece of glass, plastic or silicon substrate on which DNA molecules (probes) are affixed in an array. Similar to a DNA microarray, a protein array is an array in which a multitude of different capture agents, e.g., monoclonal antibodies, are deposited on a chip surface. The capture agents are used to determine the presence and/or amount of proteins in a biological sample, e.g., blood. For a review, see, e.g., Bumgarner, Curr. Protoc. Mol. Biol. 101:22.1.1-22.1.11, 2013.

In addition to microarrays, biochips have been designed for two-dimensional electrophoresis, transcriptome analysis, and PCR amplification. Other applications include various electrophoresis and liquid chromatography applications for proteins and DNA, cell separation, in particular, blood cell separation, protein analysis, cell manipulation and analysis including cell viability analysis and microorganism capturing.

Reaction vessels are often used to perform various types of operations on DNA strands that include polymerase chain reactions (PCR) and DNA sequencing. Reaction vessels can incorporate one or more of the microfluidics architectures listed above but it should be appreciated that reaction vessels can be larger than microfluidic devices and for that reason may not incorporate any of the microfluidics architectures describes above. Operations of the reaction vessels often include the need to make rapid changes in temperature within the reaction vessel. For example, a PCR operation solution containing DNA strands is positioned within a reaction chamber defined by the reaction vessel. A heating element is used to thermally cycle the solution in order to breakdown and/or build up various different types of DNA. Unfortunately, conventional means of thermally cycling the solution are often slower than desired and not capable of varying a temperature of specific regions of a reaction chamber within the reaction vessel.

One solution to this problem is to position a light absorbing layer within the reaction chamber of the reaction vessel with light absorption characteristics that allow absorption of between 50 and 90% of the photonic energy in any light absorbed by the light absorbing layer. An energy source can be configured to direct light at the light absorbing layer, which efficiently absorbs energy from photons of the light directed at the light absorbing layer. The absorption of the photonic energy rapidly increases the temperature of the light absorbing layer. This energy received by the light absorbing layer is then transferred to solution within the reaction chamber by thermal conduction.

In some embodiments, the light absorbing layer is divided into discrete regions. Dividing the light absorbing layer into discrete regions has the following advantages: (1) patterning the discrete regions into different shapes and thicknesses allows a specific spatial heating profile to be achieved within the reaction chamber of the reaction vessel; (2) optical sensors are able to take readings of solution within the reaction chamber through gaps between the discrete regions; and (3) an array of energy sources can be used to add different amounts of energy to each of the discrete regions of the light absorbing layer, thereby allowing solution within a first region of the reaction chamber to have a substantially different temperature than solution within a second region of the reaction chamber.

In some embodiments, the light absorbing layer can be patterned as a serpentine or meandering electrically conductive pathway that covers a majority of a light absorbing surface of the reaction vessel. A temperature of the reaction vessel can be continuously monitored by routing electrical current through this electrically conductive pathway. A resistance of this electrically conductive pathway to electricity can be correlated with a temperature of the reaction chamber. In this way, the light absorbing layer is operative to convert photonic energy into heat energy within the reaction vessel and monitor a temperature of the reaction vessel. In some embodiments, the temperature data derived from the measured electrical resistance can be used to perform feedback control of the amount of photonic energy directed at the light absorbing layer to achieve a desired thermal profile within the reaction chamber. In some embodiments, the reaction chamber can include a first light absorbing layer patterned as an electrically conductive pathway and a second light absorbing layer that operates only to heat material within the reaction vessel. In some embodiments, the first and second layers can have substantially conformal shapes that prevent the presence of large gaps between the layers that could lead to uneven heating of the reaction chamber.

These and other embodiments are discussed below with reference to FIGS. 1A-10; however, those skilled in the art will readily appreciate that the detailed description given herein with respect to these figures is for explanatory purposes only and should not be construed as limiting.

FIG. 1A shows a perspective view of an exemplary reaction vessel 100 suitable for use with the described embodiments. In particular, reaction vessel 100 includes a housing component 102 formed from an optically transparent material that defines a reaction chamber 104. While reaction chamber 104 is depicted as having a substantially circular geometry it should be appreciated that the depicted shape of reaction chamber 104 should not be construed as limiting and other shapes such as oval, rhombic and rectangular are also possible. In some embodiments, the optically transparent material forming housing component 102 can be optically transparent to only those wavelengths of light that are used to heat reaction vessel 100. For example, the optically transparent material could be optically transparent to only select visible, infrared or ultraviolet frequencies of light. Reaction chamber 104 can be closed by a second housing component (not depicted) that encloses a liquid being heated within reaction chamber 104. In this way, DNA strands in a liquid solution within reaction chamber 104 can undergo rapid thermal cycles and at least a portion of any vaporized portion of the solution can subsequently condense back into the solution between the thermal cycles or after the thermal cycling is complete. A light absorbing layer 106 can be plated onto or otherwise adhered to an interior-facing surface of reaction chamber 104. Light absorbing layer 106 has good light absorbing properties and can be in direct contact with any liquid disposed within reaction chamber 104. For example, light absorbing layer 106 can be configured to absorb about 50-90% of the photonic energy incident to light absorbing layer 106. In some embodiments, light absorbing layer 106 can be a metal film formed from elemental gold, chromium, titanium, germanium or a gold alloy such as, e.g., gold-germanium, gold-chromium, gold-titanium, gold-chromium-germanium and gold-titanium-germanium. In some embodiments, light absorbing layer 106 can be a multilayer metal film formed from elemental gold, chromium, titanium, germanium or a gold alloy such as, e.g., gold-germanium, gold-chromium, gold-titanium, gold-chromium-germanium and gold-titanium-germanium. Light absorbing layer 106 can have a thickness of about 5 nm-200 nm. Housing component 102 also defines inlet channel 108 and outlet channel 110, which can be used to cycle various chemicals, primers, DNA strands and other biological materials into and out of reaction chamber 104. In some embodiments, housing component 152 can have dimensions of about 7 mm by 14 mm; however, it should be appreciated that this size can vary.

Figure 1B:
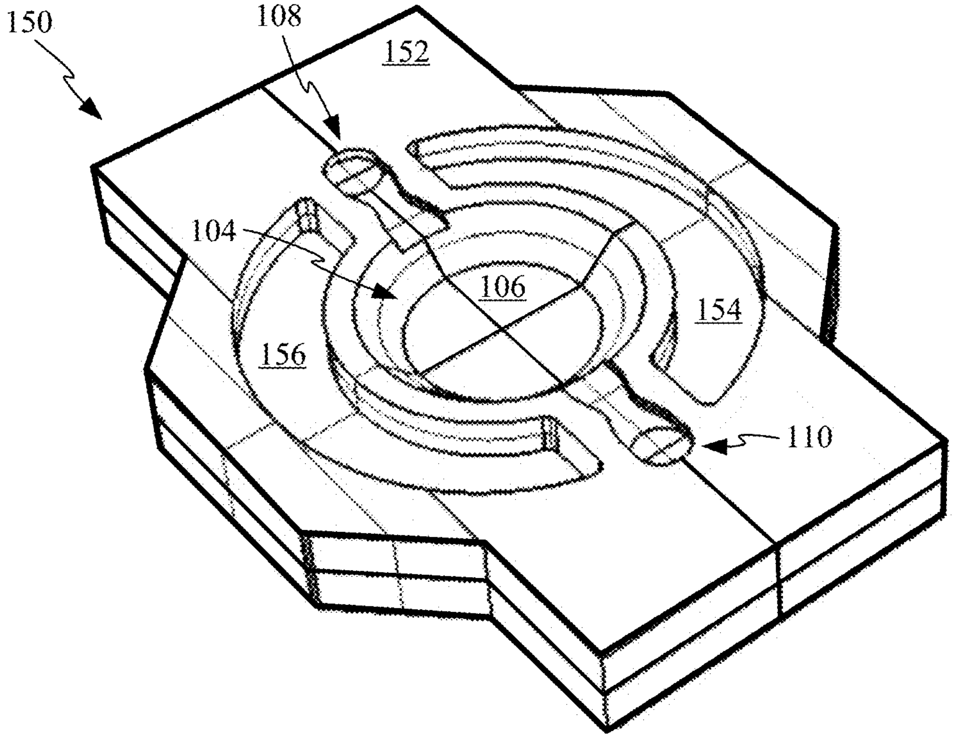
FIG. 1B shows another exemplary reaction vessel suitable for use with the described embodiments.

FIG. 1B shows a perspective view of another exemplary reaction vessel 150. Reaction vessel 150, similar to reaction vessel 100 includes housing component 152, reaction chamber 104, light absorbing layer 106, inlet channel 108 and outlet channel 110. Housing component 152 includes a widened central region that accommodates the inclusion of air gap regions 154 and 156. Air gap regions 154 and 156 can be left empty in order to discourage the lateral transmission of heat to adjacent reaction vessels. In some embodiments, the transfer of heat through air gap regions 154 and 156 can be further reduced by removing the air from air gap regions 154 and 156. In some embodiments, a diameter of housing component 152 can be about 5 mm; however, it should be appreciated that this size can vary. For example, the diameter of housing component 152 could vary from between 2 mm to 15 mm.

Figure 1C:
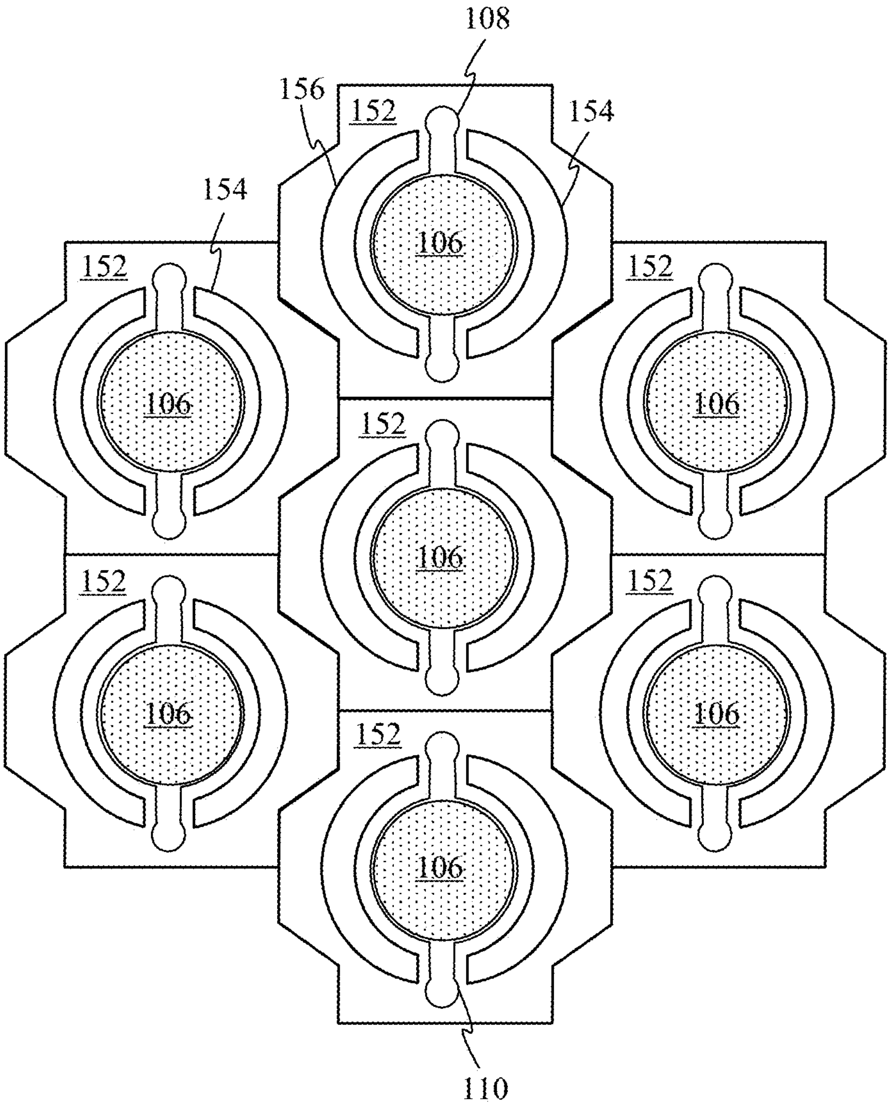
FIG. 1C shows how air gap regions establish robust barriers that reduce the lateral transfer of heat between adjacent reaction vessels.

FIG. 1C shows how the shape of housing component 152 allow reaction vessels 150 to be packed tightly into a honeycomb or hexagonal pattern. FIG. 1C also illustrates how air gap regions 154 and 156 are able to establish robust barriers that reduce the lateral transfer of heat between adjacent reaction vessels 150. When a diameter of reaction vessel 150 is about 5 mm reaction chamber 104 can be hold about 10 ul of solution and have a depth of 800 um. Generally, these devices are configured to hold between 2.5 ul and 500 ul with a depth of 200-1500 um.

Figure 2:
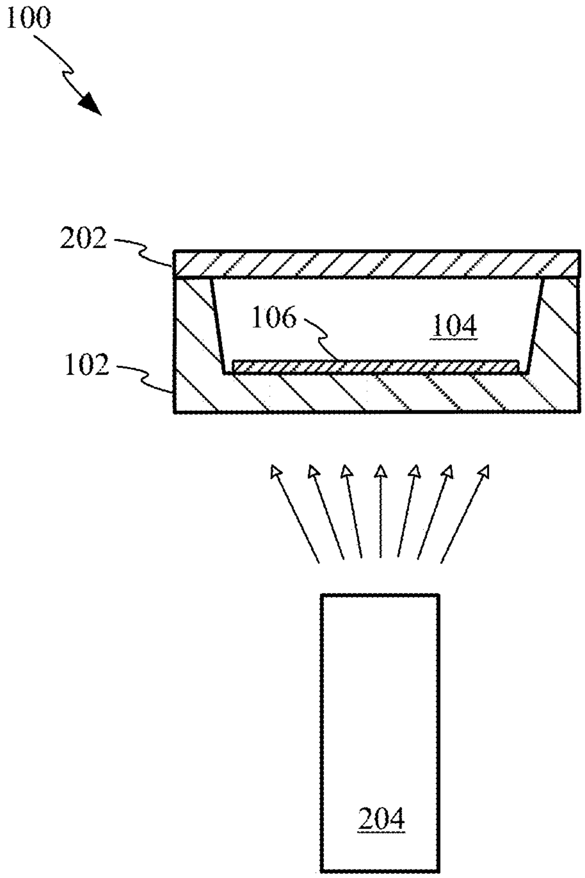
FIG. 2 shows a schematic cross-sectional side view of a reaction vessel and how reaction chamber can be closed.

FIG. 2 shows a schematic cross-sectional side view of a reaction vessel 100 and how reaction chamber 104 defined by housing component 102 can be closed by housing component 202, which can take the form of a cap. In some embodiments, housing components 102 and 202 can be sealed together to prevent contamination and allow for control of other factors such as pressure within reaction chamber 104. FIG. 2 also shows energy source 204, which is configured to project light upon light absorbing layer 106. A frequency of the light projected by energy source 204 can vary. In some embodiments, energy source 204 can take the form of a light emitting diode configured to emit light with a wavelength of 450 nm, a power of 890 mW and current of 700 mA. When light absorbing layer 106 is illuminated by an energy source, a large temperature difference between the hot metal surface and the cooler surrounding solution disposed within reaction chamber 104 occurs, resulting in the heating of the surrounding solution. When the energy source stops illuminating light absorbing layer 106, the resulting rapid cooling of the light absorbing layer 116 helps facilitate rapid cooling of the heated solution.

Figure 3A:
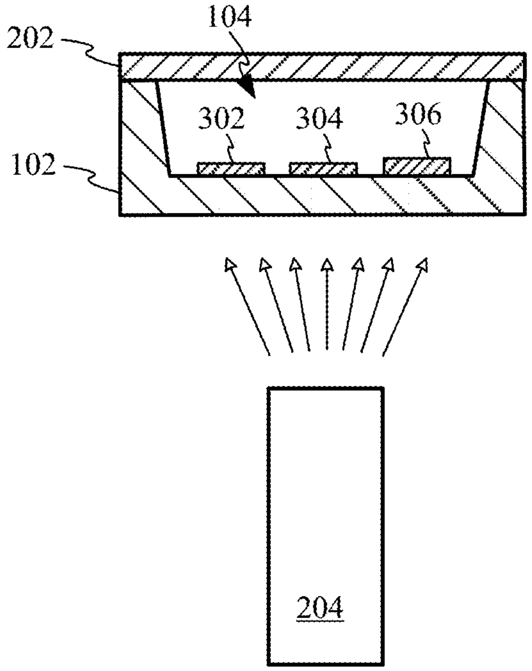
FIG. 3A shows a cross-sectional side view of a reaction vessel and how a light absorbing layer can be separated into discrete regions.

FIG. 3A shows a cross-sectional side view of reaction vessel 100 and how light absorbing layer 106 can be separated into discrete regions 302, 304 and 306. In some embodiments, these discrete regions can be setup to help establish a targeted amount of energy into reaction chamber 104. The gaps between regions 302, 304 and 306 reduce a total surface area across which light is received from energy source 204 compared with a light absorbing layer that extends across an entire bottom surface of reaction chamber 104. Increasing or decreasing the size of the gaps between regions 302, 304 and 306 can be used to tune the energy input into reaction chamber 104. A total area in contact with solution within reaction chamber 104 is also reduced, thereby reducing an efficiency of the transfer of heat from discrete regions 302, 304 and 306 to the solution. Gaps between regions 302, 304 and 306 also allow for optical monitoring of solution within reaction chamber 104. Gaps between regions 302, 304 and 306 may not be uniform in size allowing for some regions within reaction chamber 104 to be heated substantially more than other regions. Furthermore, discrete region 306 can be thicker than discrete regions 302 and 304, thereby increasing the efficiency with which heat can be drawn into reaction chamber 104 proximate discrete region 306.

Figure 3B:
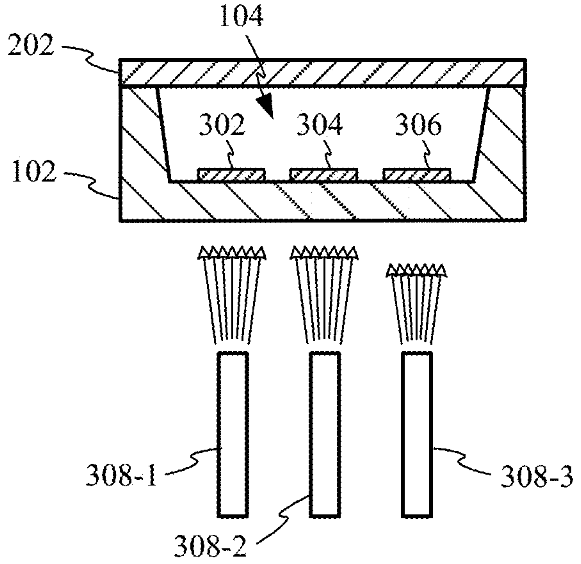
FIGS. 3B-3C show cross-sectional side views of a reaction vessel being illuminated by an array of energy sources.

FIG. 3B shows a cross-sectional side view of reaction vessel 100 being illuminated by an array of energy sources 308-1, 308-2, and 308-3. Using an array of energy sources 308-1, 308-2, and 308-3 can reduce an amount of light extending between or dissipating in discrete regions 302, 304 and 306 by allowing energy sources 308-1, 308-2, and 308-3 to focus energy only on discrete regions 302, 304 and 306. In some embodiments, energy sources 308-1, 308-2, and 308-3 may include specialized focusing optics to specifically target one of discrete regions 302, 304 or 306. Each energy source 308-1, 308-2, and 308-3 of the array of energy sources 308-1, 308-2, and 308-3 can be controlled separately to create a desired gradient of heat within reaction chamber 104. For example, different types of biological material can be attached proximate or directly on top of a particular one of discrete regions 302, 304 and 306. Because energy sources 308-1, 308-2, and 308-3 can be controlled individually, the materials associated with a particular discrete region can be heated in accordance with a customized heating profile. For example, biological material proximate discrete region 306 could have a substantially lower denaturing temperature than the biological material proximate discrete region 302. By operating energy source 308-1 at a higher power level than the energy source 308-3 a desired denaturing temperature can be achieved for both types of biological material.

Figure 3C:
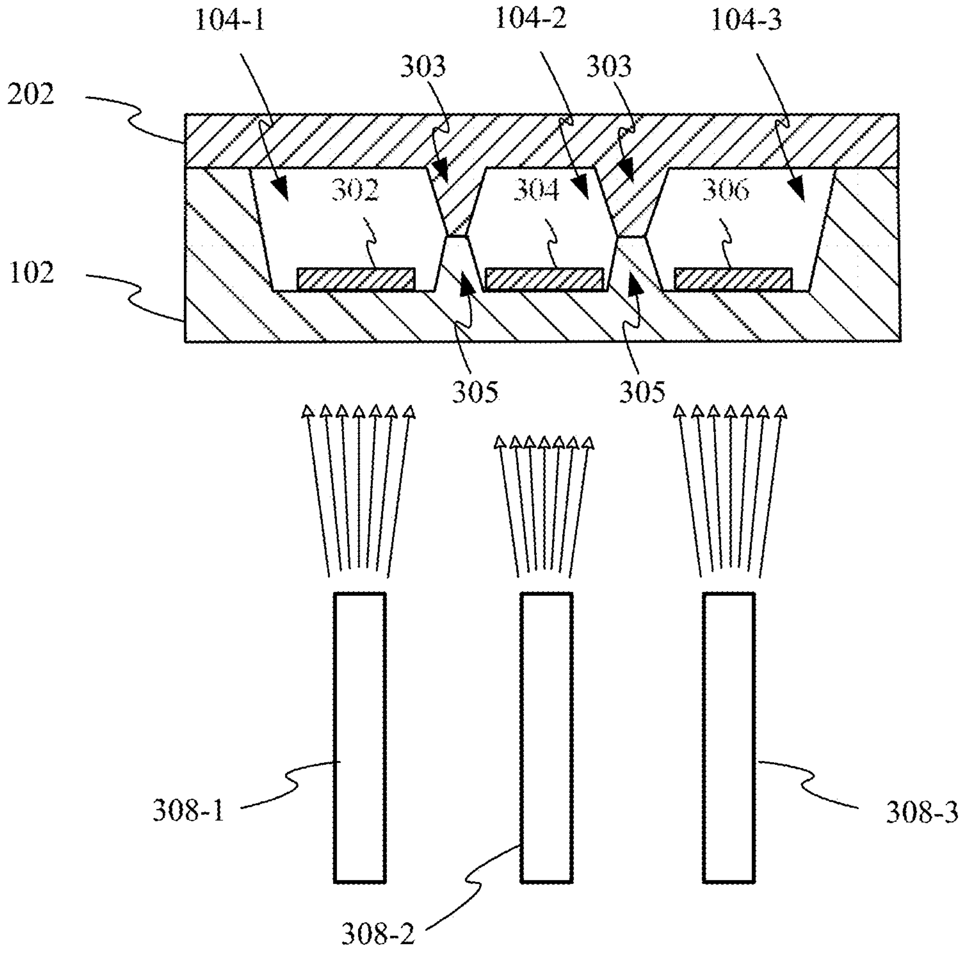

FIG. 3C shows a cross-sectional side view of reaction vessel 100 being illuminated by an array of energy sources 308-1, 308-2, and 308-3. FIG. 3C shows how housing component 202 can include multiple protrusions or ridges 303 that meet protrusions or ridges 305 of housing component 102 to divide reaction chamber 104 into multiple smaller reaction chambers 104-1, 104-2 and 104-3. In this way, the solution within reaction chamber 104 can be separated, further improving the thermal isolation enabled by discrete regions 302, 304 and 306. While both housing components 202 and 102 are shown including respective protrusions 303 and 305, it should be appreciated that in some embodiments, protrusions 303 could extend all the way to a flat interior-facing surface of housing component 102 or protrusions 305 could extend all the way to a flat interior-facing surface of housing component 202. In some embodiments, reaction vessel 100 could include multiple different housing components 202 with different configurations of protrusions 303. For example, a housing component 202 with no protrusions could allow reactions to be carried out with a single reaction chamber 104 and in subsequent experiments or operations, the depicted housing component 202 with protrusions 303 could divide the reaction chamber into multiple smaller reaction chambers as depicted. In other embodiments, housing component 202 could include a configuration of protrusions 303 that defined different sized reaction chambers 104. For example, housing component 202 could include only one protrusion 303 defining one reaction chamber 104 that includes discrete regions 302 and 304 and then another reaction chamber 104 that includes only discrete region 306. It should be appreciated that protrusions 303 and/or 305 can include sealing elements at their distal ends that helps prevent the passage of solution between adjacent reaction chambers 104.

Figure 3D:
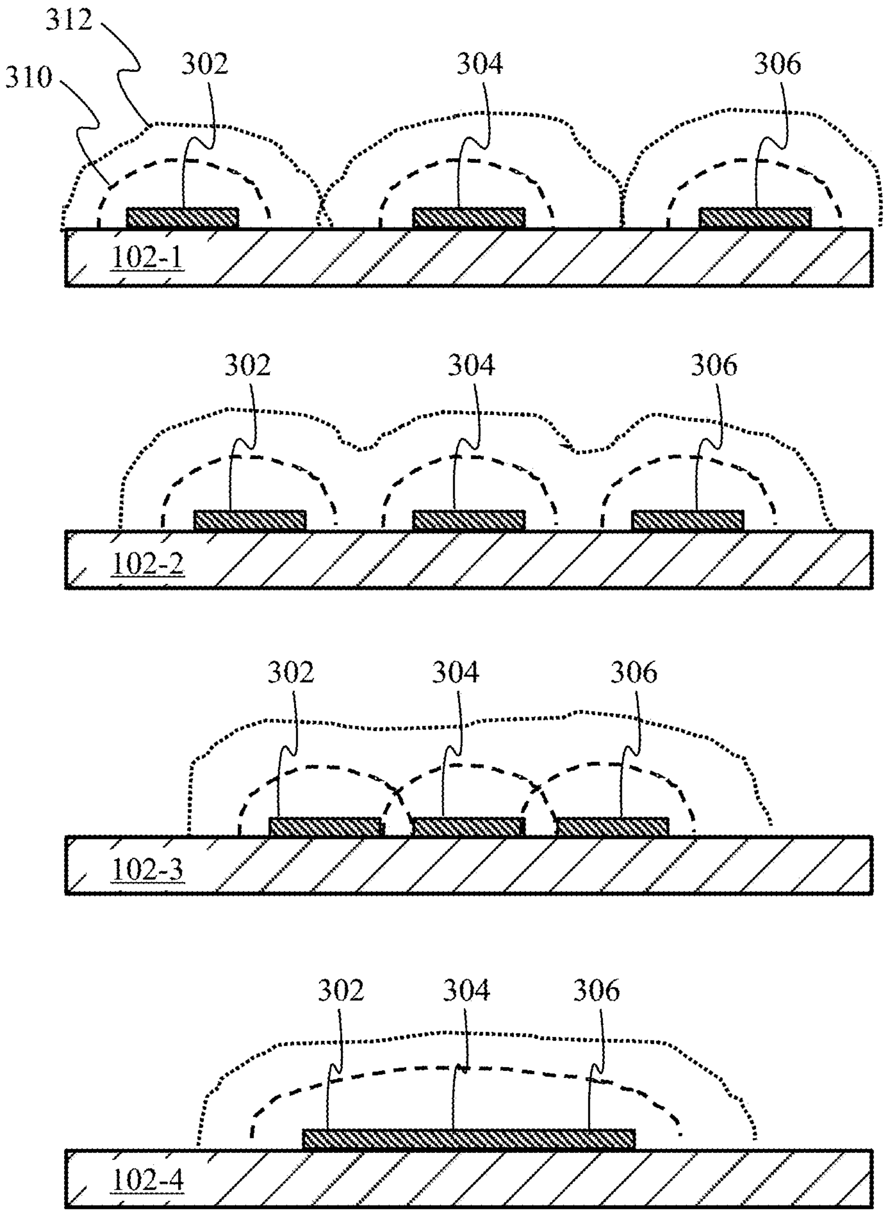
FIG. 3D shows a cross-sectional side view of a thermal profile of a portion of a reaction vessel with different sized gaps between discrete regions of a light absorbing layer.

FIG. 3D shows a cross-sectional side view of a thermal profile of a portion of a reaction vessel with different sized gaps between discrete regions 302, 304 and 306 of a light absorbing layer. In particular, housing component 102 is depicted with four different discrete region configurations, which are differentiated by the labels housing component 102-1, 102-2, 102-3 and 102-4. These configurations depict two sets of contours indicative of an amount of energy (contour 312) or temperature (contour 310) change taking place in portions of the solution adjacent to discrete regions 302-306. In particular, these depictions show how adjusting a gap size between adjacent discrete regions can improve or change a uniformity of the heating applied to a solution within a reaction chamber. Housing component 102-4 shows only a large single discrete region or alternatively a discrete region made up of regions 302, 304 and 306 in abutting contact with one another such that they effectively form a single discrete region. It should be noted that while placing discrete regions 302-306 in abutting contact yields the largest heated area in a central portion of housing component 102-4, the peripheral ends of housing component 102 can fall below a desired temperature in some embodiments.

Figure 4A:
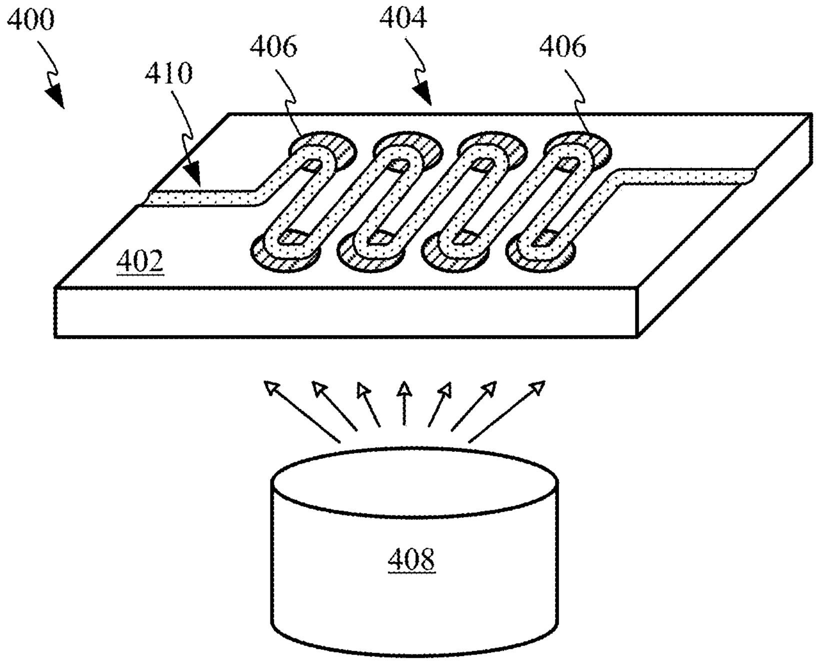
FIG. 4A shows a schematic perspective view of a reaction vessel having a reaction chamber taking the form of a serpentine channel.

FIG. 4A shows a schematic perspective view of a reaction vessel 400 that includes housing component 402. Housing component 402 includes a light absorbing layer 404 distributed into multiple discrete regions 406 configured to receive optical radiation from energy source 408 for the localized heating of solution disposed within reaction vessel 400. Housing component 402 has a reaction chamber taking the form of a serpentine channel through which solution can flow through each of discrete regions 406. The flow of solution through serpentine channel 410 can be facilitated in many ways including by a pump, gravity fed or by a wicking structure. It should be appreciated that each of discrete regions 406 can also be configured with its own respective energy source 408 similar to the configuration depicted in FIG. 3B.

Figure 4B:
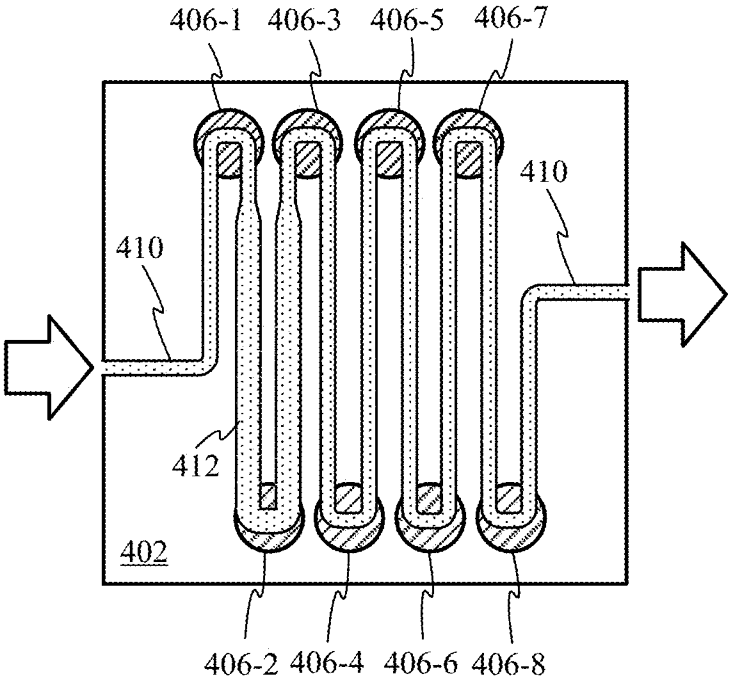
FIG. 4B shows a top view of the reaction vessel depicted in FIG. 4A with labels indicating each of discrete regions 406-1 through 406-8 of a light absorbing layer.

FIG. 4B shows a top view of reaction vessel 400 with labels indicating each of discrete regions 406-1 through 406-8 of light absorbing layer 404. While FIG. 4B shows a direction of the flow of solution through serpentine channel 410 in a first direction, it should be appreciated that the flow of solution through serpentine channel 410 can move in a second direction opposite the first direction. In embodiments that include a pump mechanism, the flow of solution through serpentine channel 410 can be reversed at various points during a reaction to achieve a desired thermal heating profile for the solution disposed within channel 410. In some embodiments, single strand DNA can be affixed to a binder positioned atop one or more of discrete regions 406-1 through 406-8 allowing biological materials within the solution being conducted along channel 410 to interact with the single strand DNA at various temperatures generated by heat transferred to the solution at discrete regions 406. In some embodiments, a speed at which the solution passes through channel 410 can be varied by increasing the width and/or depth of the channel. For example, channel segment 412 is depicted having an increased width thereby reducing the speed and increasing the time the solution has to cool between discrete regions 406-1 and 406-2.

Figure 4C:
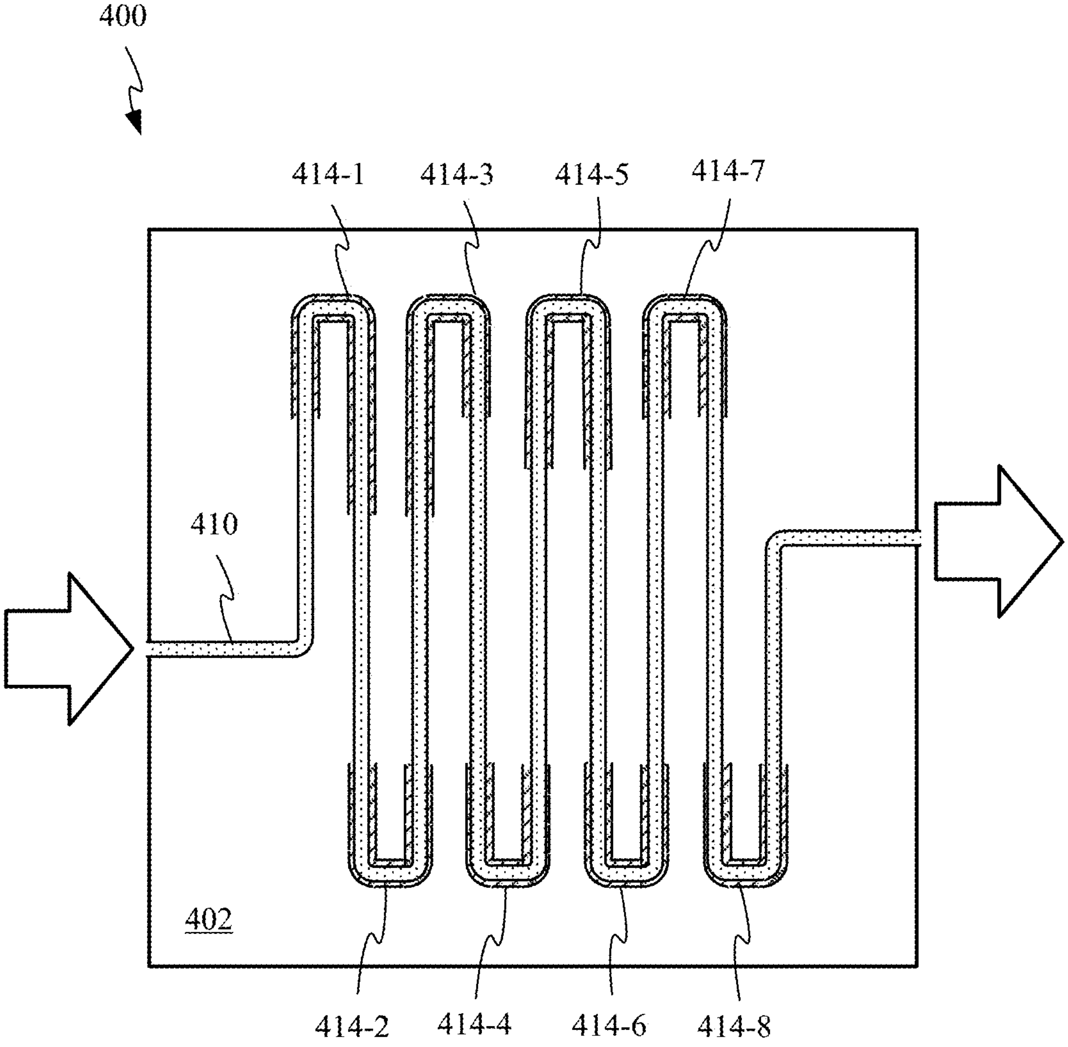
FIG. 4C shows another embodiment of a reaction vessel that includes a light absorbing layer with conformal discrete regions.

FIG. 4C shows another embodiment of reaction vessel 400 that includes a light absorbing layer with conformal discrete regions 414 (414-1, 414-2, 414-3, 414-4, 414-5, 414-6, 414-7, and 414-8). Conformal discrete regions allow the energy from an energy source to be targeted at specific sections of channel 410. In this way, a length of segments of channel 410 between sequential discrete regions can be increased or decreased. For example, as depicted solution flowing between regions 414-1, 414-2 and 414-3 has less time to cool than when the solution is passing from region 414-3 to region 414-4. As previously described, each of discrete regions 414 could be supported by a shared energy source, by its own dedicated energy source, or by an energy source that illuminates a subset of discrete regions 414. It should be appreciated that while reaction chambers have been described in the context of a unitary chamber as shown in FIGS. 1A-3B, a divided reaction chamber as shown in FIG. 3C and as a channel in FIGS. 4A-4C that other reaction chamber configurations are possible. For example, a reaction chamber could take the form of an interior volume defined by a series of glue channels positioned between two flat plates or could simply consist of a location on a reaction vessel substrate. In general, the reaction chamber can be considered to be any fluidic path defined by the reaction vessel along which various reactions can be initiated. The fluidic path could be closed/sealed or open to the environment in certain embodiments.

Figure 5A:
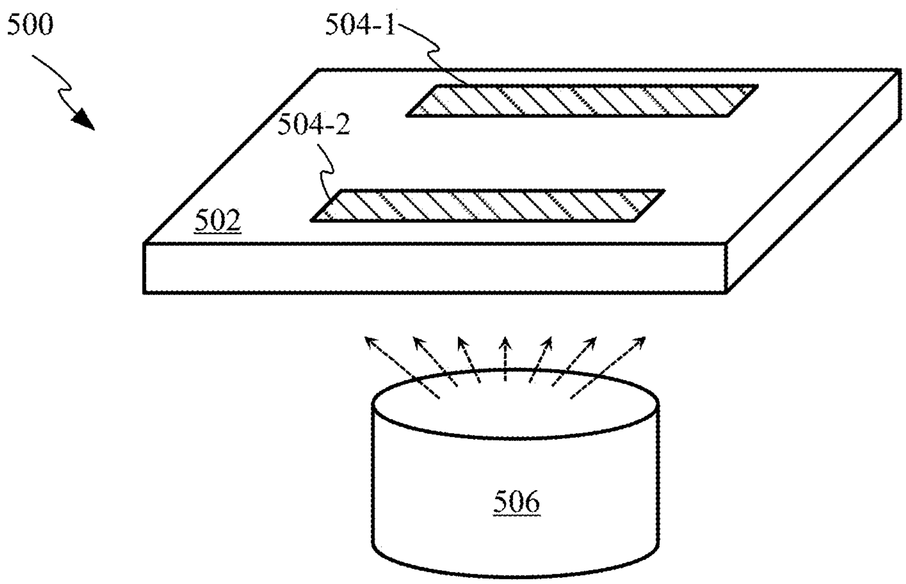
FIG. 5A shows a reaction vessel that includes a housing component having a light absorbing layer made up of two discrete regions.
Figure 5B:
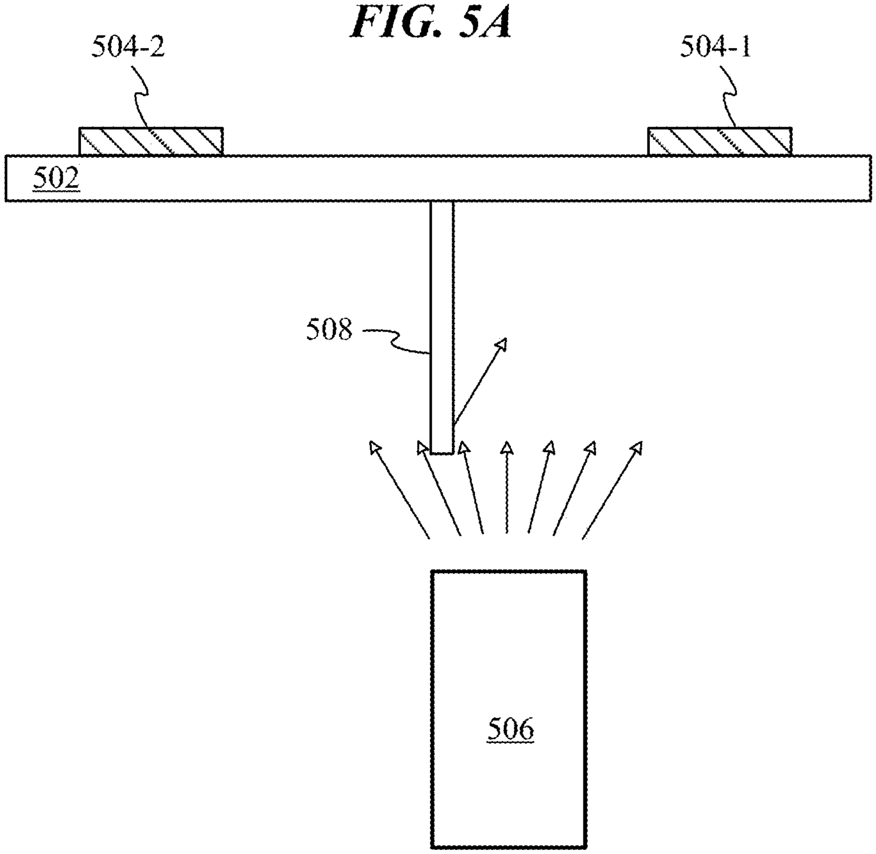
FIG. 5B shows how an energy source can be offset toward one of the two discrete regions such that one of the discrete regions receives more energy from the energy source than the other discrete region.

FIG. 5A shows a reaction vessel 500 that includes a housing component 502 having a light absorbing layer made up of two discrete regions 504-1 and 504-2. In some embodiments, discrete regions 504-1 and 504-2 can be driven by a single energy source 506, allowing each of discrete regions 504 to receive similar amounts of energy. FIG. 5B shows how energy source 506 can be offset toward discrete region 504-1 such that discrete region 504-1 receives more energy from energy source 506 than discrete region 504-2. This variance in energy between discrete regions 504-1 and 504-2 can be increased more by a reflector element 508 that further limits the amount of light arriving at discrete region 504-2 and is able to increase the light arriving at discrete region 504-1 by reflecting light emitted by energy source 506 toward discrete region 504-1 as depicted. In some embodiments, reflector element 508 can be tilted toward discrete region 504-1 to further increase the amount of light received from energy source 506.

Figure 5C:
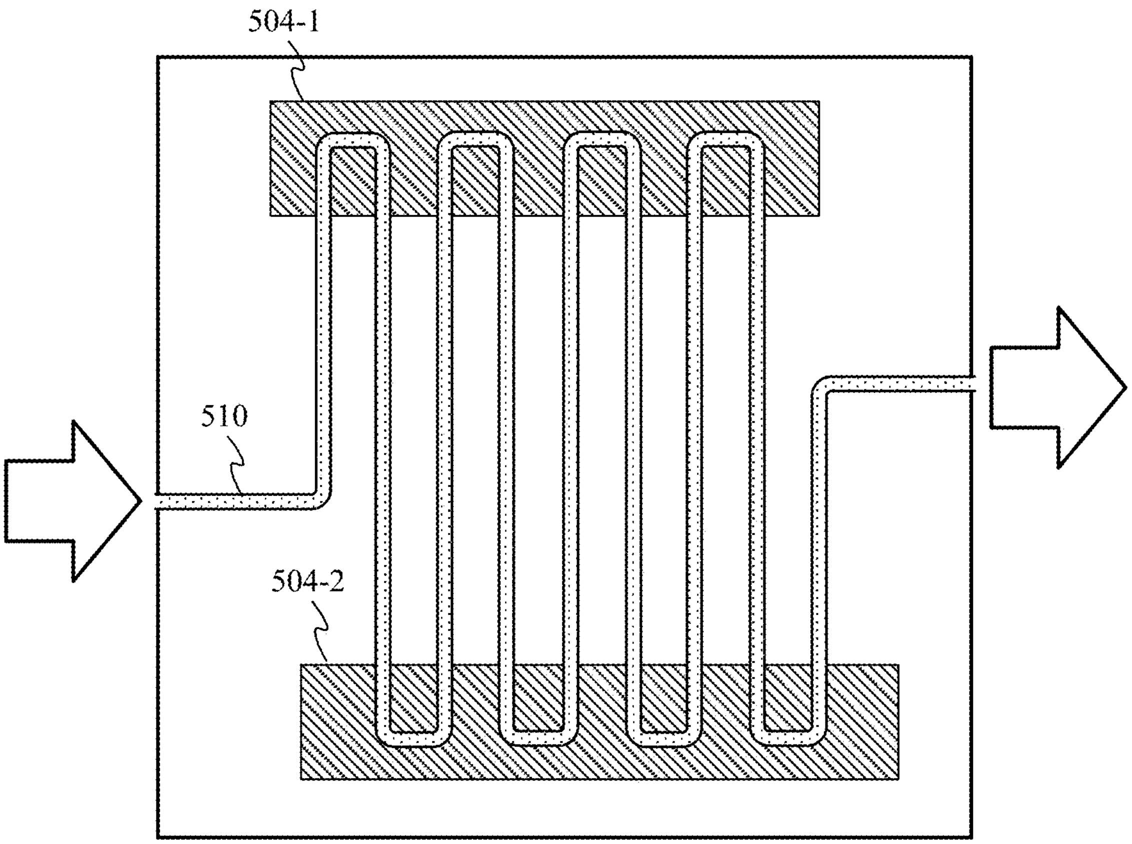
FIG. 5C shows a top view of the reaction vessel depicted in FIGS. 5A and 5B and how the reaction vessel can include a channel for guiding solution back and forth between the two discrete regions.

FIG. 5C shows a top view of reaction vessel 500 and how it can include a channel 510 for guiding solution back and forth between discrete regions 504-1 and 504-2. In some embodiments, discrete regions 504-1 and 504-2 can receive the same amount of energy. In this type of heating configuration, solution flowing through channel 510 passes from discrete region 504-1 at time $T_1$, through a portion of channel 510 disposed between discrete regions 504-1 and 504-2 at time $T_2$ and then through discrete region 504-2 at time $T_3$. In this way the solution carried by channel 510 cycles from a first temperature at time $T_1$ to a second temperature at time $T_2$ and then back to the first temperature at time $T_3$. In other embodiments, discrete regions 504-1 and 504-2 can receive different amounts of energy by offsetting an associated energy source toward one of discrete regions 504 by including dedicated energy sources for each of discrete regions 504 or by increasing or decreasing a thickness of a portion of the light absorbing layer making up one of discrete regions 504. By configuring the system to provide different amounts of energy at discrete regions 504-1 and 504-2, solution flowing through channel 510 is able to reach a larger variety of temperatures as it flows from one end of channel 510 to another.

Exemplary PCR Reactions

PCR amplifies a specific region of a DNA strand (the DNA target). Most PCR methods amplify DNA fragments of between 0.1 and 10 kilo basepairs (kb). The amount of amplified product is determined by the available substrates in the reaction, which become limiting as the reaction progresses. A basic PCR set-up requires several components and reagents, including: a DNA template that contains the DNA target region to amplify; a DNA polymerase, an enzyme that polymerizes new DNA strands; heat-resistant Taq polymerase is especially common, as it is more likely to remain intact during the high-temperature DNA denaturation process; two DNA primers that are complementary to the 3' ends of each of the sense and anti-sense strands of the DNA target; specific primers that are complementary to the DNA target region are selected beforehand, and are often custom-made in a laboratory or purchased from commercial biochemical suppliers; deoxynucleoside triphosphates, or dNTPs; a buffer solution providing a suitable chemical environment for optimum activity and stability of the DNA polymerase; bivalent cations, typically magnesium (Mg) or manganese (Mn) ions; $Mg^{2+}$ is the most common, but $Mn^{2+}$ can be used for PCR-mediated DNA mutagenesis, as a higher $Mn^{2+}$ concentration increases the error rate during DNA synthesis; and monovalent cations, typically potassium (K) ions.

The reaction is commonly carried out in a volume of 10-200 μl in small reaction chambers (0.2-0.5 ml volumes) in a thermal cycler, which heats and cools the reaction tubes to achieve the temperatures required at each step of the reaction. Thin-walled reaction tubes permit favorable thermal conductivity to allow for rapid thermal equilibration.

Typically, PCR consists of a series of 20-40 repeated temperature changes, called cycles, with each cycle commonly consisting of two or three discrete temperature steps. The cycling is often preceded by a single temperature step at a very high temperature (>90° C. [194° F.]), followed by one hold at the end for final product extension or brief storage. The temperatures used and the length of time they are applied in each cycle depend on a variety of parameters, including the enzyme used for DNA synthesis, the concentration of bivalent ions and dNTPs in the reaction, and the melting temperature © of the primers. The individual steps common to most PCR methods are as follows:

(1) Initialization: This step is only required for DNA polymerases that require heat activation by hot-start PCR. It consists of heating the reaction chamber to a temperature of 94-96° C. (201-205° F.), or 98° C. (208° F.) if extremely thermostable polymerases are used, which is then held for 1-10 minutes.

(2) Denaturation: This step is the first regular cycling event and consists of heating the reaction chamber to 94-98° C. (201-208° F.) for 20-30 seconds. This causes DNA melting, or denaturation, of the double-stranded DNA template by breaking the hydrogen bonds between complementary bases, yielding two single-stranded DNA molecules.

(3) Annealing: In the next step, the reaction temperature is lowered to 50-65° C. (122-149° F.) for 20-40 seconds, allowing annealing of the primers to each of the single-stranded DNA templates. Two different primers are typically included in the reaction mixture: one for each of the two single-stranded complements containing the target region. The primers are single-stranded sequences themselves, but are much shorter than the length of the target region, complementing only very short sequences at the 3' end of each strand. The correct temperature for the annealing step is important, since this temperature strongly affects efficiency and specificity. This temperature must be low enough to allow for hybridization of the primer to the strand, but high enough for the hybridization to be specific, i.e., the primer should bind only to a perfectly complementary part of the strand, and nowhere else. If the temperature is too low, the primer may bind imperfectly. If it is too high, the primer may not bind at all. A typical annealing temperature is about 3-5° C. below the Tm of the primers used. Stable hydrogen bonds between complementary bases are formed only when the primer sequence very closely matches the template sequence. During this step, the polymerase binds to the primer-template hybrid and begins DNA formation.

(4) Extension/elongation: The temperature at this step depends on the DNA polymerase used; the optimum activity temperature for the thermostable DNA polymerase of Taq (*Thermus aquaticus*) polymerase is approximately 75-80° C. (167-176° F.), though a temperature of 72° C. (162° F.) is commonly used with this enzyme. In this step, the DNA polymerase synthesizes a new DNA strand complementary to the DNA template strand by adding free dNTPs from the reaction mixture that are complementary to the template in the 5'-to-3' direction, condensing the 5'-phosphate group of the dNTPs with the 3'-hydroxy group at the end of the nascent (elongating) DNA strand. The precise time required for elongation depends both on the DNA polymerase used and on the length of the DNA target region to amplify. As a rule of thumb, at their optimal temperature, most DNA polymerases polymerize a thousand bases per minute. Under optimal conditions (i.e., if there are no limitations due to limiting substrates or reagents), at each extension/elongation step, the number of DNA target sequences is doubled. With each successive cycle, the original template strands plus all newly generated strands become template strands for the next round of elongation, leading to exponential (geometric) amplification of the specific DNA target region.

The processes of denaturation, annealing and elongation constitute a single cycle. Multiple cycles are required to amplify the DNA target to millions of copies. The formula used to calculate the number of DNA copies formed after a given number of cycles is 2n, where n is the number of cycles.

(5) Final elongation: This single step is optional, but is performed at a temperature of 70-74° C. (158-165° F.) (the temperature range required for optimal activity of most polymerases used in PCR) for 5-15 minutes after the last PCR cycle to ensure that any remaining single-stranded DNA is fully elongated.

(6) Final hold: The final step cools the reaction chamber to 4-15° C. (39-59° F.) for an indefinite time, and may be employed for short-term storage of the PCR products.

To check whether the PCR successfully generated the anticipated DNA target region (also sometimes referred to as the amplimer or amplicon), agarose gel electrophoresis may be employed for size separation of the PCR products. The size(s) of PCR products is determined by comparison with a DNA ladder, a molecular weight marker which contains DNA fragments of known size run on the gel alongside the PCR products. As with other chemical reactions, the reaction rate and efficiency of PCR are affected by limiting factors. Thus, the entire PCR process can further be divided into three stages based on reaction progress:

(1) Exponential amplification: At every cycle, the amount of product is doubled (assuming 100% reaction efficiency). After 30 cycles, a single copy of DNA can be increased up to one billion copies. The reaction is very sensitive: only minute quantities of DNA must be present.

(2) Leveling off stage: The reaction slows as the DNA polymerase loses activity and as consumption of reagents such as dNTPs and primers causes them to become limiting.

(3) Plateau: No more product accumulates due to exhaustion of reagents and enzyme.

Upon loading and sealing, the system may generate an amplified product through thermal cycling. Thermal cycling may include one or more cycles of incubating a reaction mixture at a denaturation temperature for a denaturation time period followed by incubating the mixture at an annealing temperature for an annealing time period further followed by incubating the mixture at an elongation temperature for an elongation time period. A system may heat the wells of the reaction well by using one or more light sources as previously described. Focused light by lens between light source and reaction well may be used also. The embedded lens may be used to focus emission from the fluorescent dye integrated in the reaction vessel/wells. For the cooling of the sample and reagents, the one or more light sources may be turned off for a cooling time period. In some cases, a fluid circulation channel may be used as previously described for the cooling of the reagents and samples in the wells of the reaction well.

Amplification of a sample may be performed by using the systems described previously to perform one or more thermal cycles including a denaturation cycle, an annealing cycle and an elongation cycle. The time in which an amplification reaction may yield a detectable result in the form of an amplified product may vary depending on the target nucleic acid, the sample, the reagents used and the protocol for PCR. In some cases, an amplification process may be performed in less than 1 minute. In some cases, an amplification process may be performed in about 1 minute to about 40 minutes. In some cases, an amplification process may be performed in at least about 1 minute. In some cases, an amplification process may be performed in at most about 40 minutes. In some cases, an amplification process may be performed in about 1 minute to about 5 minutes, about 1 minute to about 10 minutes, about 1 minute to about 15 minutes, about 1 minute to about 20 minutes, about 1 minute to about 25 minutes, about 1 minute to about 30 minutes, about 1 minute to about 35 minutes, about 1 minute to about 40 minutes, about 5 minutes to about 10 minutes, about 5 minutes to about 15 minutes, about 5 minutes to about 20 minutes, about 5 minutes to about 25 minutes, about 5 minutes to about 30 minutes, about 5 minutes to about 35 minutes, about 5 minutes to about 40 minutes, about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some cases, an amplification process may be performed in about 1 minute, about 5 minutes, about 10 minutes, about 15 minutes, about 20 minutes, about 25 minutes, about 30 minutes, about 35 minutes, or about 40 minutes.

In some cases, amplification of a sample may be performed by repeating the thermal cycle 5 to 40 times. In some cases, the thermal cycle may be repeated at least 5 times. In some cases, the thermal cycle may be repeated at most 60 times. In some cases, the thermal cycle may be repeated 5 times, 10 times, 15 times, 20 times, 25 times, 30 times, 35 times 40 times, 45 times, 50 times, 55 times or 60 times.

A thermal cycle may be completed in a thermal cycling time period. In some cases, a thermal cycling time period may range from 2 seconds to 60 seconds per cycle. In some cases, a thermal cycle may be completed in about 2 seconds to about 60 seconds. In some cases, a thermal cycle may be completed in at least about 2 seconds. In some cases, a thermal cycle may be completed in at most about 60 seconds. In some cases, a thermal cycle may be completed in about 2 seconds to about 5 seconds, about 2 seconds to about 10 seconds, about 2 seconds to about 20 seconds, about 2 seconds to about 40 seconds, about 2 seconds to about 60 seconds, about 5 seconds to about 10 seconds, about 5 seconds to about 20 seconds, about 5 seconds to about 40 seconds, about 5 seconds to about 60 seconds, about 10 seconds to about 20 seconds, about 10 seconds to about 40 seconds, about 10 seconds to about 60 seconds, about 20 seconds to about 40 seconds, about 20 seconds to about 60 seconds, or about 40 seconds to about 60 seconds. In some cases, a thermal cycle may be completed in about 2 seconds, about 5 seconds, about 10 seconds, about 20 seconds, about 40 seconds, or about 60 seconds.

The temperature and time period of the denaturation cycle may be dependent on the properties sample to be identified, the reagents and the amplification protocol being used. A denaturation cycle may be performed at temperatures ranging from about 80° C. to about 110° C. A denaturation cycle may be performed at a temperature of at least about 80° C. A denaturation cycle may be performed at a temperature of at most about 110° C. A denaturation cycle may be performed at a temperature of about 80° C. to about 85° C., about 80° C. to about 90° C., about 80° C. to about 95° C., about 80° C. to about 100° C., about 80° C. to about 105° C., about 80° C. to about 110° C., about 85° C. to about 90° C., about 85° C. to about 95° C., about 85° C. to about 100° C., about 85° C. to about 105° C., about 85° C. to about 110° C., about 90° C. to about 95° C., about 90° C. to about 100° C., about 90° C. to about 105° C., about 90° C. to about 110° C., about 95° C. to about 100° C., about 95° C. to about 105° C., about 95° C. to about 110° C., about 100° C. to about 105° C., about 100° C. to about 110° C., or about 105° C. to about 110° C. A denaturation cycle may be performed at a temperature of about 80° C., about 85° C., about 90° C., about 95° C., about 100° C., about 105° C., or about 110° C.

In some cases, the time period of a denaturation cycle may be less than about 1 second. In some cases, the time period of a denaturation cycle may be at most about 100 seconds. In some cases, the time period of a denaturation cycle may be about 0 second to 1 second, about 1 second to about 5 seconds, about 1 second to about 10 seconds, about 1 second to about 20 seconds, about 1 second to about 40 seconds, about 1 second to about 60 seconds, about 1 second to about 100 seconds, about 5 seconds to about 10 seconds, about 5 seconds to about 20 seconds, about 5 seconds to about 40 seconds, about 5 seconds to about 60 seconds, about 5 seconds to about 100 seconds, about 10 seconds to about 20 seconds, about 10 seconds to about 40 seconds, about 10 seconds to about 60 seconds, about 10 seconds to about 100 seconds, about 20 seconds to about 40 seconds, about 20 seconds to about 60 seconds, about 20 seconds to about 100 seconds, about 40 seconds to about 60 seconds, about 40 seconds to about 100 seconds, or about 60 seconds to about 100 seconds. In some cases, the time period of a denaturation cycle may be less than about 1 second, about 5 seconds, about 10 seconds, about 20 seconds, about 40 seconds, about 60 seconds, or about 100 seconds.

The temperature and time period of the annealing and elongation cycles may be dependent on the properties sample to be identified, the reagents and the amplification protocol being used. An annealing and/or elongation cycle may be performed at a temperature of about 40° C. to about 70° C. An annealing and/or elongation cycle may be performed at a temperature of at least about 40° C. An annealing and/or elongation cycle may be performed at a temperature of at most about 70° C. An annealing and/or elongation cycle may be performed at a temperature of about 40° C. to about 45° C., about 40° C. to about 50° C., about 40° C. to about 55° C., about 40° C. to about 60° C., about 40° C. to about 65° C., about 40° C. to about 70° C., about 45° C. to about 50° C., about 45° C. to about 55° C., about 45° C. to about 60° C., about 45° C. to about 65° C., about 45° C. to about 70° C., about 50° C. to about 55° C., about 50° C. to about 60° C., about 50° C. to about 65° C., about 50° C. to about 70° C., about 55° C. to about 60° C., about 55° C. to about 65° C., about 55° C. to about 70° C., about 60° C. to about 65° C., about 60° C. to about 70° C., or about 65° C. to about 70° C. An annealing and/or elongation cycle may be performed at a temperature of about 40° C., about 45° C., about 50° C., about 55° C., about 60° C., about 65° C., or about 70° C.

In some cases, the time period of an annealing and/or elongation cycle may be less than about 1 second. In some cases, the time period of an annealing and/or elongation cycle may be at most about 60 seconds. In some cases, the time period of an annealing and/or elongation cycle may be about 0 seconds to 1 seconds, about 1 second to about 5 seconds, about 1 second to about 10 seconds, about 1 second to about 20 seconds, about 1 second to about 40 seconds, about 1 second to about 60 seconds, about 5 seconds to about 10 seconds, about 5 seconds to about 20 seconds, about 5 seconds to about 40 seconds, about 5 seconds to about 60 seconds, about 10 seconds to about 20 seconds, about 10 seconds to about 40 seconds, about 10 seconds to about 60 seconds, about 20 seconds to about 40 seconds, about 20 seconds to about 60 seconds, or about 40 seconds to about 60 seconds. In some cases, the time period of an annealing and/or elongation cycle may be less than about 1 second, about 5 seconds, about 10 seconds, about 20 seconds, about 40 seconds, or about 60 seconds.

In some cases, a cooling cycle may be performed between the denaturation cycle and annealing and/or elongation cycles. In some cases, a cooling cycle may be performed for about 1 second to about 60 seconds. In some cases, a cooling cycle may be performed for at least about 1 second. In some cases, a cooling cycle may be performed for at most about 60 seconds. In some cases, a cooling cycle may be performed for about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some cases, a cooling cycle may be performed for about 1 second, about 5 seconds, about 10 seconds, about 20 seconds, about 30 seconds, about 40 seconds, about 50 seconds, or about 60 seconds.

Detection of the amplified product may be performed at various stages of the amplification process. In some cases, the detection of an amplified product may be performed at the end of the amplification process. In some cases, the detection of the amplified product may be performed during a thermal cycle. Alternatively, in some cases, detection may be performed at the end of each thermal cycle. In addition to the detection methods described herein, detection of an amplified product may be performed using gel electrophoresis, capillary electrophoresis, sequencing, short tandem repeat analysis and other known methods.

Figure 6A:
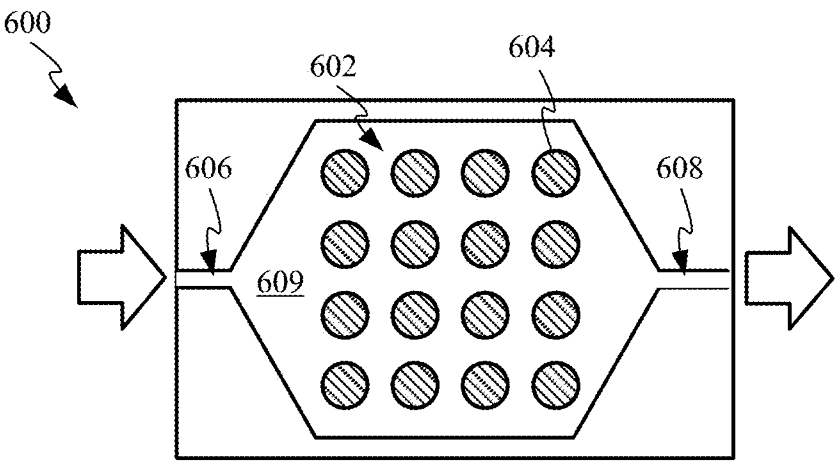
FIGS. 6A-6C show examples of hybridization and solid-phase PCR operations in a reaction vessel having a light absorbing layer with multiple discrete regions.
Figure 6B:
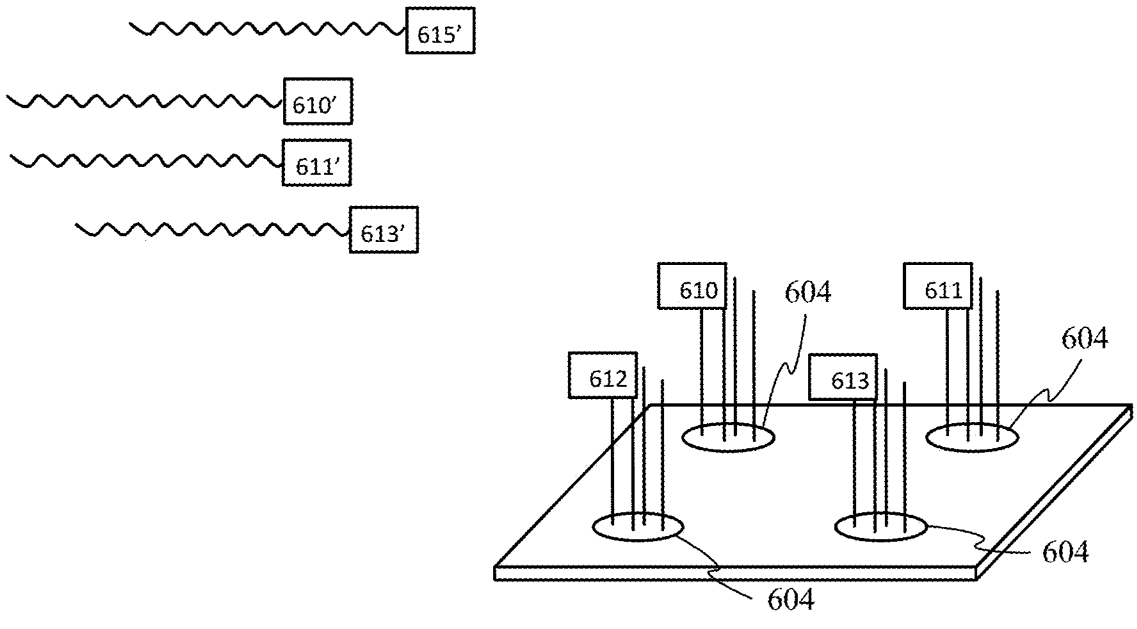
Figure 6C:
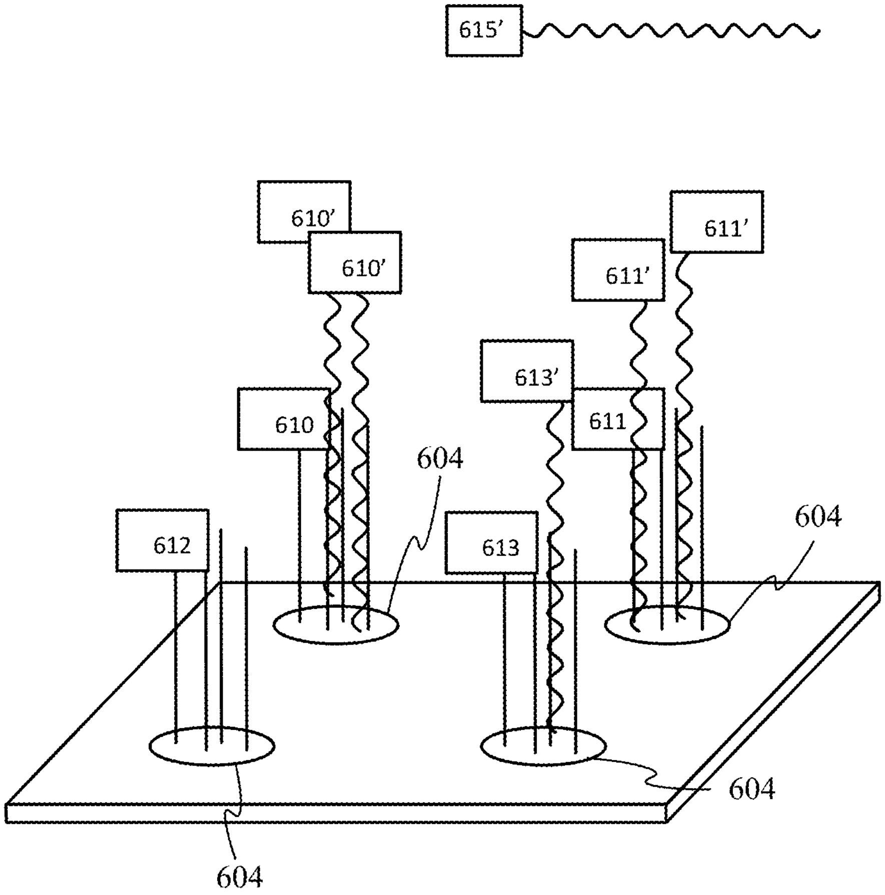

FIGS. 6A-6C show examples of hybridization and solid-phase PCR operations in a reaction vessel 600 having a light absorbing layer with multiple discrete regions. FIG. 6A shows a top view of a reaction vessel 600 having a light absorbing layer 602 that includes an array of discrete regions 604 arranged in a grid pattern. Reaction vessel 600 includes inlet port 606 and outlet port 608 that are configured to allow solution to flow into and out of reaction chamber 609.

FIG. 6B shows an example in which each discrete element 604 possesses a unique probe or primer sequence 610-613 bound by weak covalent interactions (e.g. Au-thiol), which is complementary to target molecules 610', 611' and 613' in solution but not complementary to target molecules 615' in solution. Target molecules 610', 611', 613' and 615' can be fluorescently labeled.

FIG. 6C shows how fluorescently labelled target molecules only hybridize to their complementary sequence bound on the surface, and the resulting fluorescence intensity at each discrete element can be used to detect the presence or absence of a given target molecule. Following hybridization, solid phase PCR can be performed to create a population of discrete amplicons, which can then be detected via a molecule that binds to double stranded DNA, and can be used to detect the presence of said molecule e.g. through fluorescence and/or electrochemical signal. Alternatively, amplicons can be sequenced to identify the presence of said molecule.

Figure 6D:
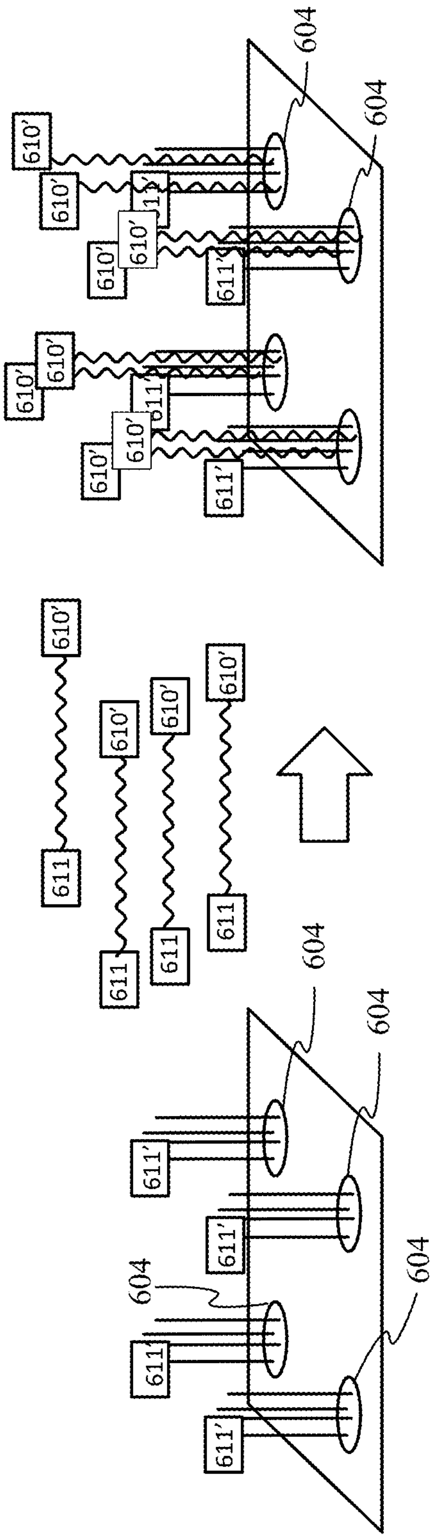
FIG. 6D shows another example of solid phase PCR in which single strands of DNA are bonded to single strand DNA attached to discrete regions of a light absorbing layer.

FIG. 6D shows another example where each discrete element 604 possesses a unique primer sequence 611' bound by weak covalent interactions (Au-thiol) which is complementary to a part of a target molecule that is foreign to the target DNA molecule, and is introduced through ligation of an adaptor 611, 610' possessing a region complementary to the bound primer sequence. Following hybridization, solid phase PCR can be performed to create a population of discrete amplicons, which can then be sequenced to identify the presence of said molecule.

Figure 7A:
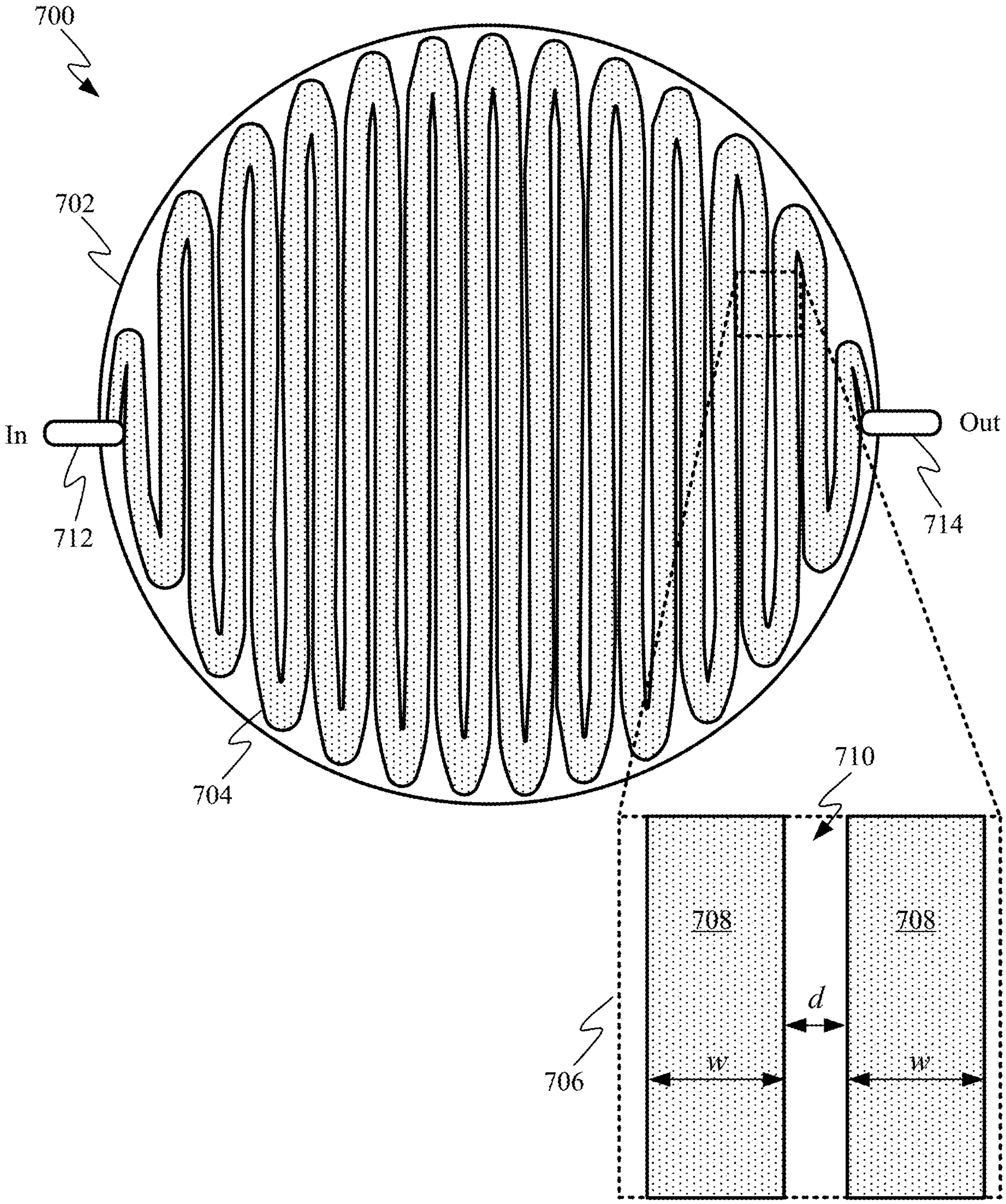
FIG. 7A shows a top view of a portion of a reaction vessel having a reaction vessel wall formed from optically transparent material.

FIG. 7A shows a top view of a portion of a reaction vessel 700. In particular, a reaction vessel wall 702 formed from optically transparent material is depicted. An interior-facing surface of reaction vessel wall 702 is plated with light absorbing layer 704, which has a serpentine or meandering pattern that covers a majority of the interior-facing surface of reaction vessel wall 702. Examples of reaction vessel walls are depicted in FIGS. 1A-1B by housing components 102 and 152. The reaction vessel wall 702 corresponds to that portion of housing components 102 and 152 that form reaction chamber 104. Because light absorbing layer 704 is positioned upon the interior-facing surface of reaction vessel wall 702, any photonic energy converted into heat energy by light absorbing layer 704 can be conducted directly into solution positioned within a reaction chamber defined at least in part by reaction vessel wall 702. Light absorbing layer 704 is formed from electrically conductive material such as elemental gold, chromium, titanium, germanium, nickel, platinum, graphene and silver or a gold alloy such as, e.g., gold-germanium, gold-chromium, gold-titanium, gold-chromium-germanium and gold-titanium-germanium, combinations thereof, or the like.

As depicted in FIG. 7A, the pattern of light absorbing layer 704 can be arranged so as to form an electrically conductive pathway that travels across the majority of an area provided by the interior-facing surface of reaction vessel wall 702. The large area occupied by light absorbing layer 704 allows light absorbing layer 704 to absorb a significant amount, for example, a majority of the photonic energy directed at reaction vessel wall 702. Close up view 706 shows how adjacent segments 708 of light absorbing layer 704 can be at least twice as wide (w) as a gap (d) 710 separating the adjacent segments. In some embodiments, adjacent segments of light absorbing layer 704 can be up to ten times as wide as gap 710. By including only a narrow gap 710 between adjacent segments as depicted, light absorbing layer 704 can have a density sufficient to efficiently heat material within reaction vessel 700.

In some embodiments, light absorbing layer 704 can cover between 5 and 95% of the surface area of reaction vessel wall 702. When larger amounts of heat transfer are required, light absorbing layer 704 can cover between 50 and 95% of the surface area reaction vessel wall 702. In some embodiments, gap 710 can be less than or equal to 800 nm. In some embodiments, This small gap size has the benefit of filtering out some infrared wavelengths of light from entering reaction vessel 700 while simultaneously allowing light having a shorter wavelength, for example, visible or ultraviolet wavelengths, to pass through the small gaps between the adjacent segments. An additional benefit of this configuration is that longer wavelengths of light (i.e. wavelengths longer than 800 nm) that are associated with light waves imparted by a photonic energy source are in most cases too large to pass through the gap and therefore unable to bypass the light absorbing layer. In this way, the small gaps between adjacent segments do not materially degrade the conversion of photonic energy into heat energy.

FIG. 7A also shows how electricity can be routed through the electrically conductive pathway defined by light absorbing layer 704. In particular, a first electrical pad 712 is depicted at a first side of reaction vessel 700 and electrically couples a first side of light absorbing layer 704 to an electrical input (In). A second electrical pad 714 is depicted at a second side of reaction vessel 700 and electrically couples a second side of light absorbing layer 704 to an electrical output (Out). By measuring a voltage drop between the first and second electrical pads the electrical resistance of light absorbing layer 704 can be determined.

Since the material making up light absorbing layer 704 is an electrically conductive material, electrical resistivity will generally increase with increasing temperatures. For example, an electrical resistivity of copper and gold generally increases linearly with respect to increases in temperature while other electrical conductors have non-linear responses to increases in temperature. These predictable changes in electrical resistance due to temperature allows for accurate measurements of temperature to be made within reaction vessel 700 without the need for a separate temperature sensor. This allows light absorbing layer 704 to act to both efficiently add heat to reaction vessel 700 and to measure how quickly that heat increases a temperature of the interior of reaction vessel 700. It should be noted that the changes in electrical resistance of the light absorbing layer due to temperature change are caused by small changes in the lattice structure of the metal resulting from the changes in temperature. In some embodiments, changes of the electrical resistivity of the light absorbing layer over time can also be used to measure a structural integrity of the light absorbing layer. Periodic calibration tests can be performed to identify these changes over time.

Figure 7B:
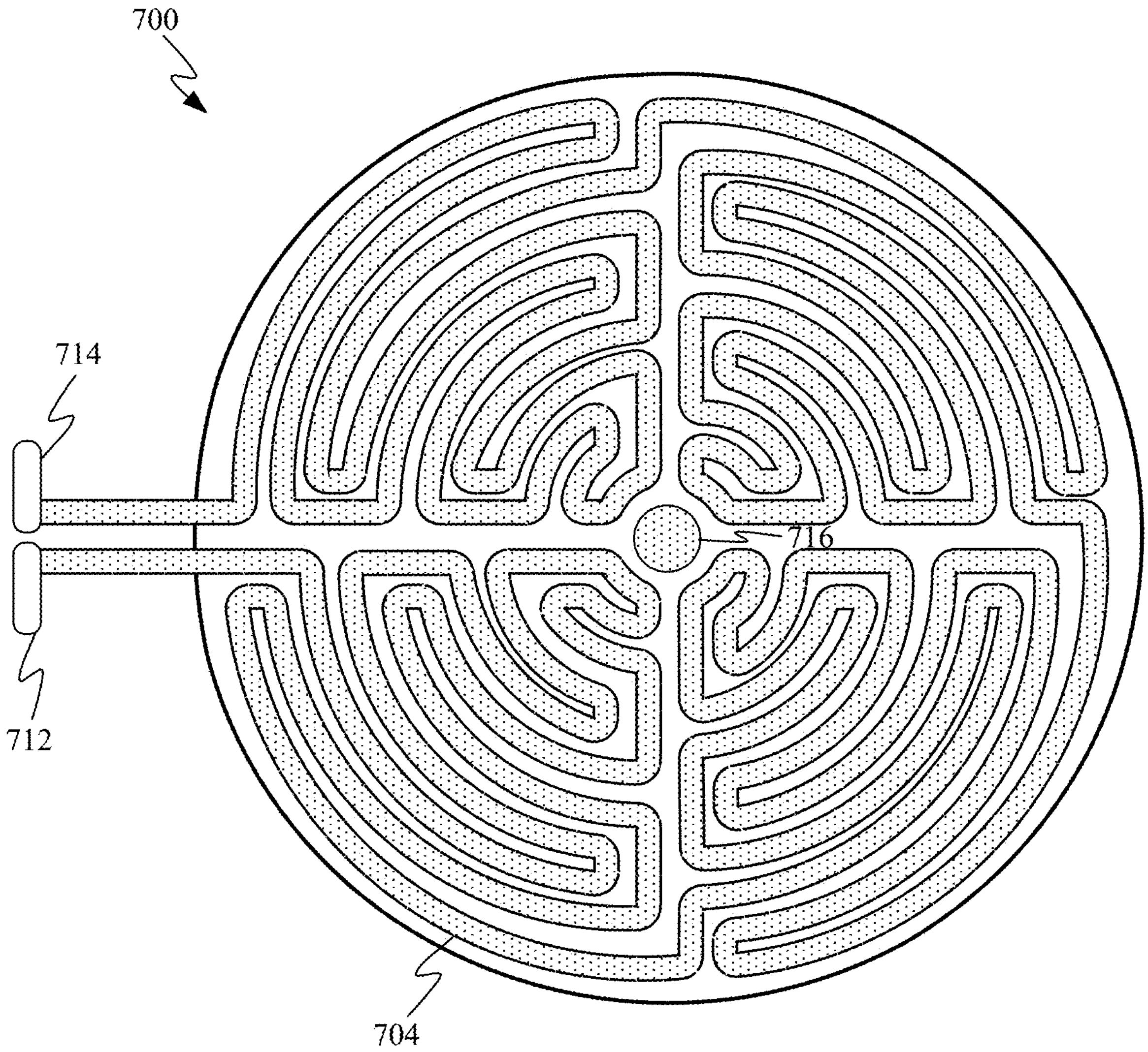
FIG. 7B shows a second configuration of a light absorbing layer.

FIG. 7B shows how light absorbing layer 704 can be arranged in a different pattern than the one depicted in FIG. 7A. In particular, the pattern illustrated in FIG. 7B forms an electrically conductive pathway that sequentially covers each of four quadrants of reaction vessel 700. The multiple turns of the electrically conductive path help increase an electrical resistance of the electrically conductive path, thereby helping make changes in the resistance more noticeable to a processor monitoring the voltage different between electrical pads 712 and 714. This configuration also shows how the electrically conductive pathway formed by light absorbing layer 704 can enter and exit reaction vessel 700 in substantially the same area. The entrance point through which the electrically conductive pathway enters and exits reaction vessel 700 can coincide with a liquid entry channel or can be used solely for the entry and exit of the electrically conductive pathway formed by light absorbing layer 704. FIG. 7B also shows how a central portion 716 of light absorbing layer 704 can be entirely disassociated from the electrically conductive pathway and functional primarily as a light absorbing layer to transfer heat converted from photonic energy into solution within reaction vessel 700.

Figure 7C:
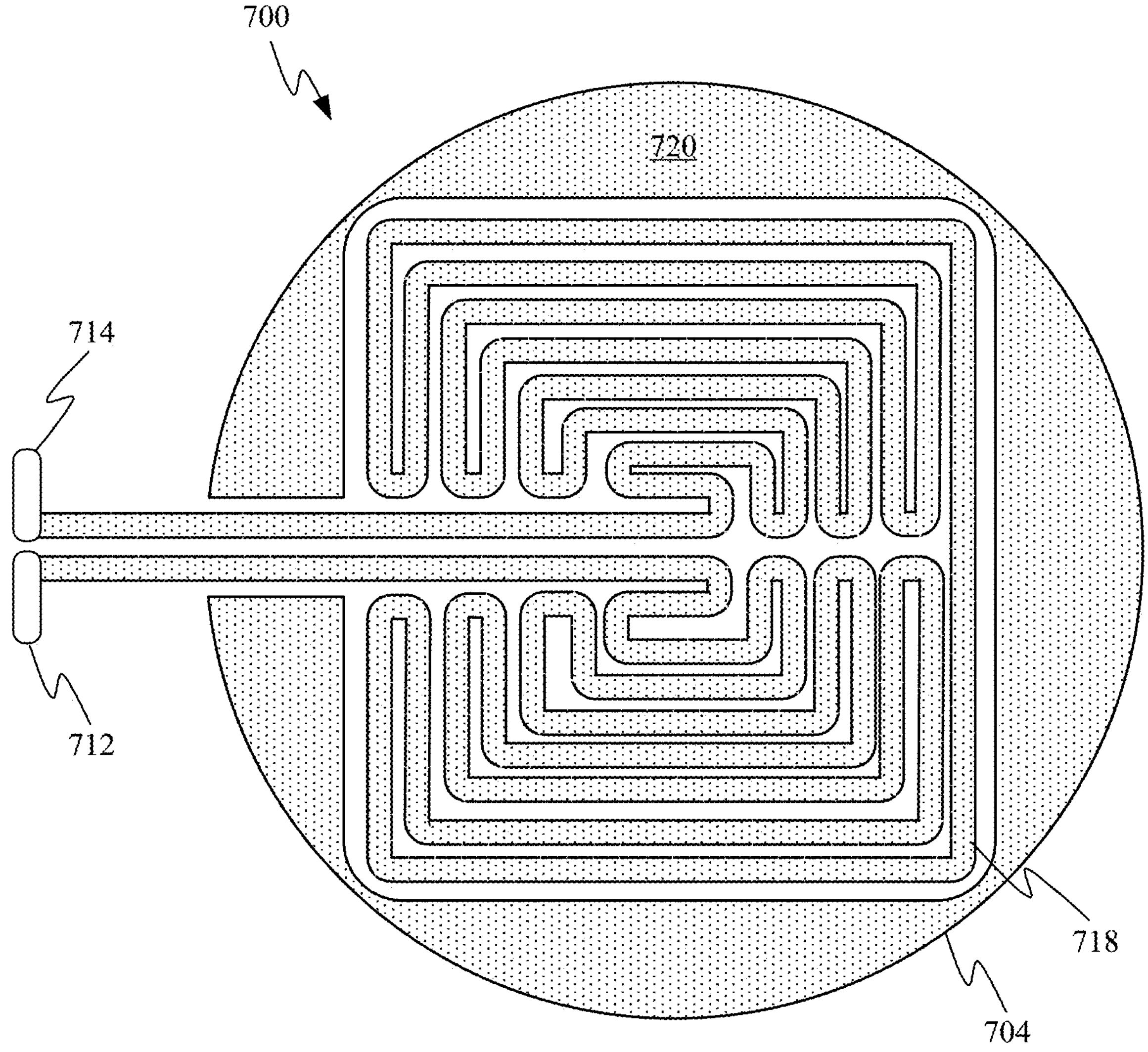
FIG. 7C shows a third configuration of a light absorbing layer in which a central region of light absorbing layer defines an electrically conductive pathway and a peripheral region of the light absorbing layer is used only for heat transfer.

FIG. 7C shows a third configuration of light absorbing layer 704 in which a central region 718 of light absorbing layer 704 defines an electrically conductive pathway coupled to electrical pads 712 and 714 and a peripheral region 720 of light absorbing layer 704 is not electrically connected to the central region and is used only for heat transfer. This configuration results in temperature measurements made using the electrically conductive pathway being biased toward the central region of reaction vessel 700. This may be helpful where reactions are more likely to occur in the central region of reaction vessel 700 and a peripheral region of the reaction vessel is expected to be at a slightly different temperature than a central region. This might be the case for a reaction vessel in which the peripheral region is shallower than the central region as shown by the reaction vessels depicted in FIGS. 1A-1B.

Figure 7D:
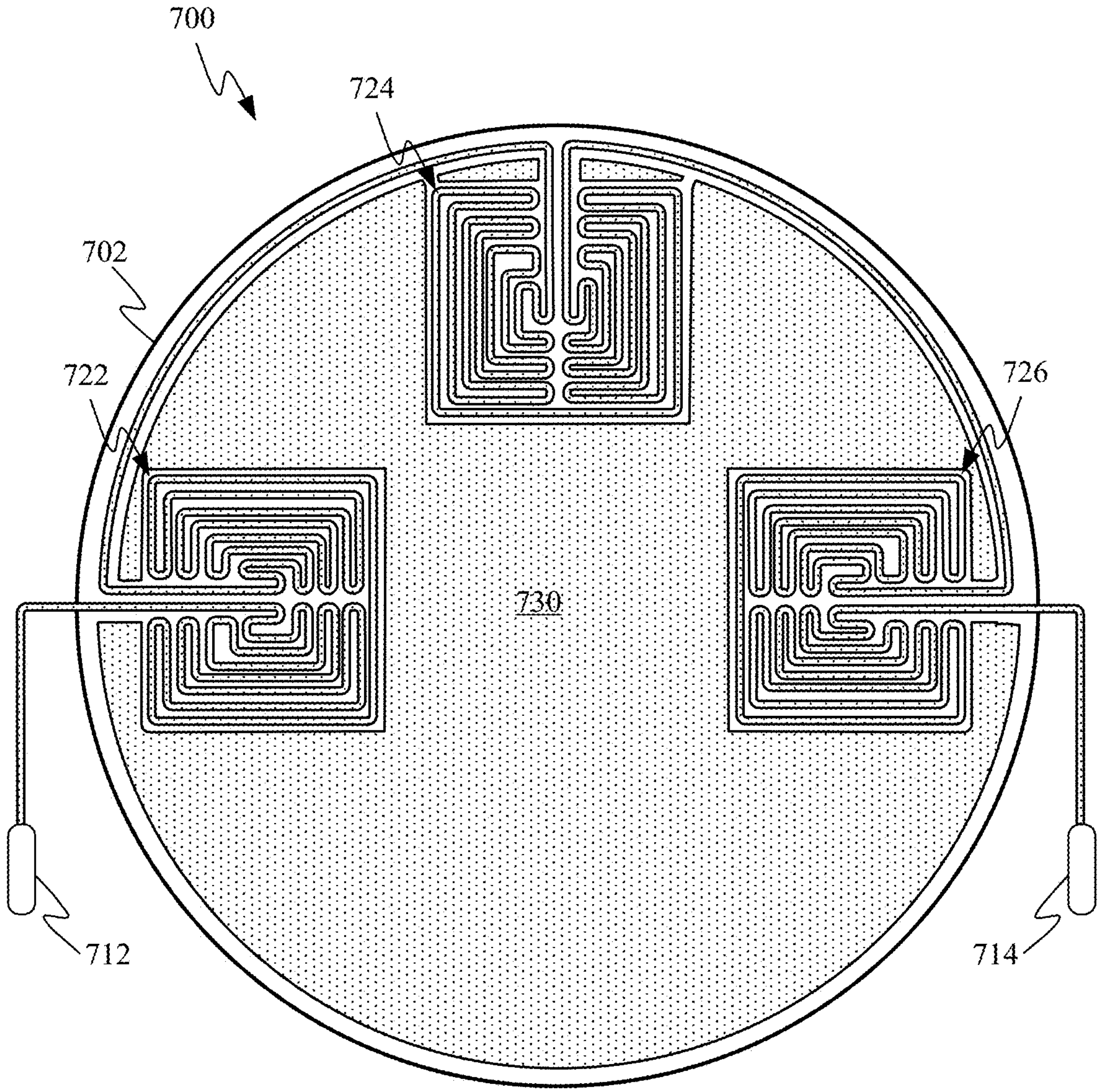
FIG. 7D shows a fourth configuration of light absorbing layer in which an electrically conductive pathway formed by light absorbing layer is concentrated in multiple discrete regions.

FIG. 7D shows a fourth configuration of light absorbing layer 704 in which the electrically conductive pathway formed by light absorbing layer 704 is concentrated in multiple discrete regions 722, 724, and 726 across the interior-facing surface of reaction vessel wall 702. In this embodiment, a central region 730 of light absorbing layer 704 functions only to transfer heat into reaction vessel 700. This configuration can be beneficial as temperature determinations made by measuring the voltage drop across electrical pads 712 and 714 can provide a localized temperature determination specific to discrete regions 722, 724, and 726. This can be particularly beneficial where reactions are localized to these particular discrete regions 722, 724, or 726 as energy changes resulting from these reactions can have some localized effect upon temperature of the reaction vessel. FIGS. 6A-6D show examples of specific reactions in which target molecules are affixed to specific locations within a reaction chamber such that reactions occur in predictable location within the reactions chamber. In these types of exemplary reactions patterned thin films can be positioned in the specific locations to allow for more accurate monitoring of the reactions.

Figure 8:
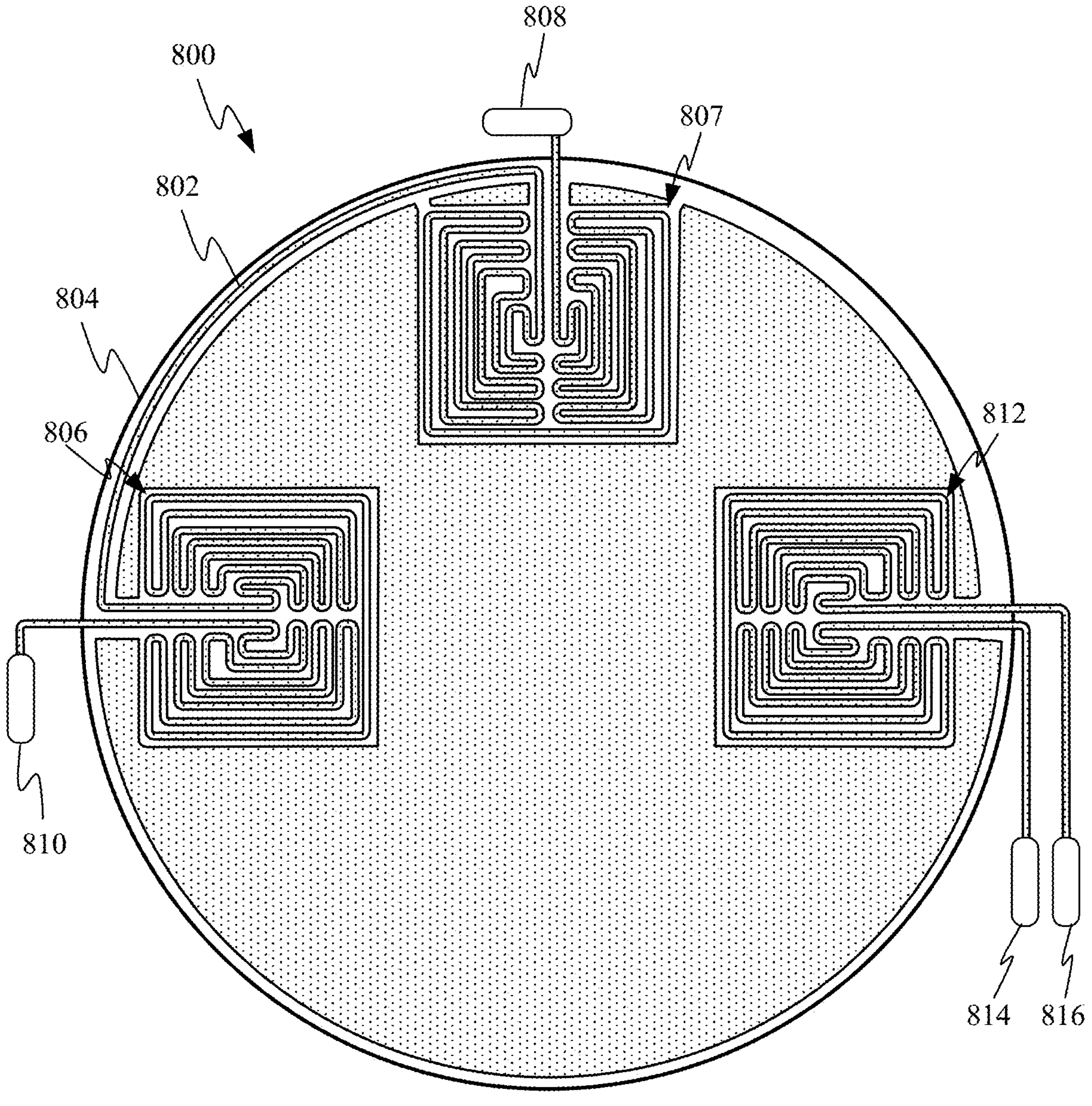
FIG. 8 shows a reaction vessel with a light absorbing layer distributed across a reaction vessel wall.

FIG. 8 shows a reaction vessel 800 with a light absorbing layer 802 distributed across reaction vessel wall 804. Light absorbing layer 802 includes a first electrically conductive pathway localized in two discrete regions 806 and 807 of light absorbing layer 802. This allows for determination of the temperature of discrete regions 806 and 807 by measuring a voltage drop between electrical pads 808 and 810. Light absorbing layer 802 includes a second electrically conductive pathway localized in one discrete region 812 of light absorbing layer 802 and allows for determination of a temperature of reaction vessel 800 within discrete region 812 of reaction vessel 800 by measuring a voltage drop across electrical pads 814 and 816. Including two different electrically conductive pathways allows for determination of temperature within different portions of reaction vessel 800. This can be particularly helpful in configurations similar to the one shown in FIG. 3B, in which multiple different light sources apply energy to different regions of a reaction vessel.

Separating the electrically conductive pathways also provides a certain amount of thermal isolation that can allow a larger thermal gradient to be applied. For example, first and second light sources could be directed at respective discrete regions 806 and 807 and a third light source could be directed at discrete region 812. This would allow for large differentials in energy input to the three discrete regions and a resulting temperature differential could be tracked due to the presence of the two discrete electrically conductive pathways. In some embodiments a larger number of discrete electrically conductive pathways could be utilized to track a larger number of thermal gradients in different regions of a reaction vessel. For example, the depicted first electrically conductive pathway could be split in two in order to track each of discrete regions 806 and 807 separately. Configurations having as many as four, five, or six or more electrically conductive pathways are also possible and deemed to be within the scope of this disclosure.

Figure 9A:
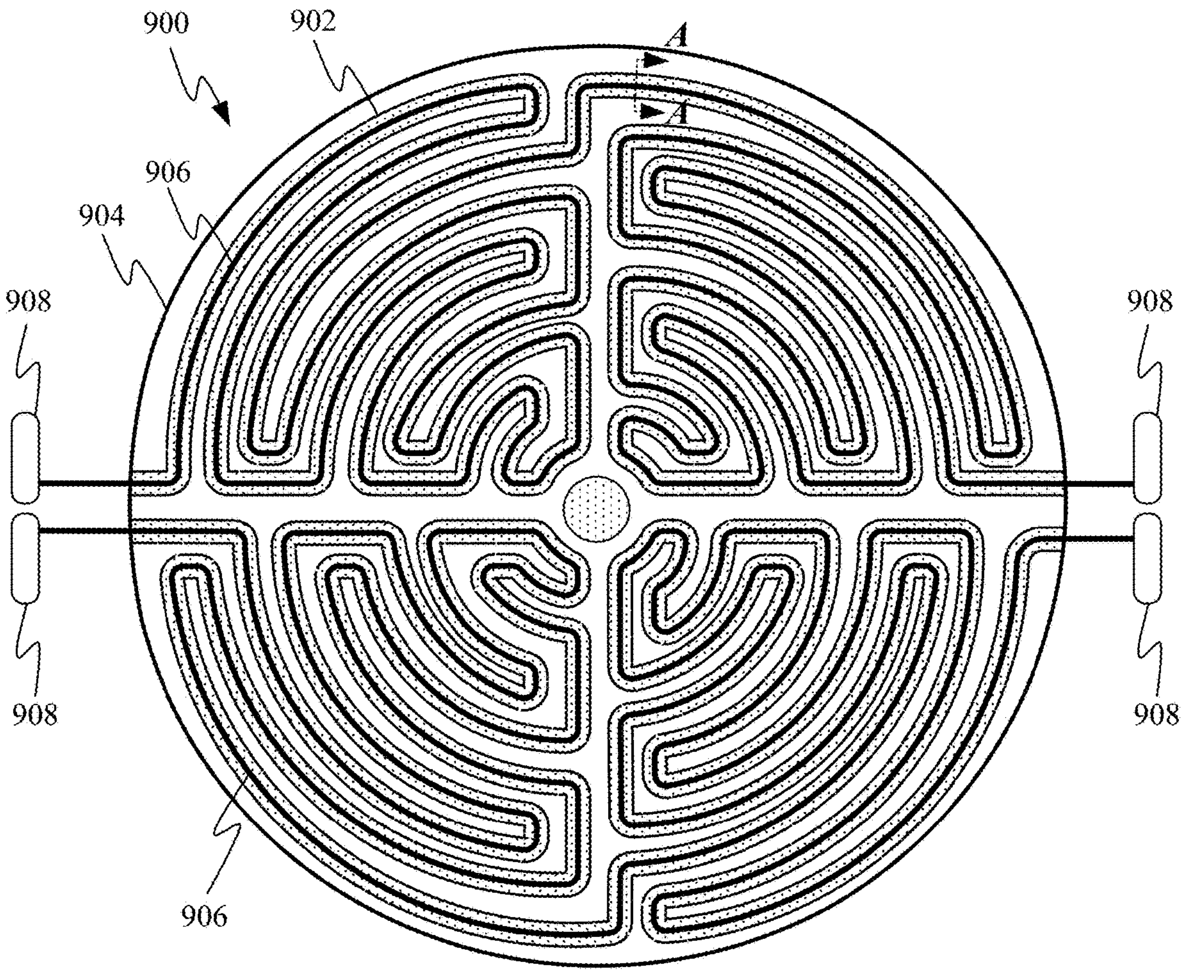
FIG. 9A shows a top view of a portion of a reaction vessel having a light absorbing layer arranged upon a reaction vessel wall.

FIG. 9A shows a top view of a portion of a reaction vessel 900 having a light absorbing layer 902 arranged upon a reaction vessel wall 904. As depicted, light absorbing layer 902 forms two different electrically conductive pathways covering opposing halves of reaction vessel wall 904, i.e., the top half and the bottom half. Light absorbing layer 902 is formed from a material known to be efficient at converting photonic energy to heat energy. An electrically conductive pathway 906 can be stacked atop light absorbing layer 902 and be formed from a material known to have high electrical resistance and a predictable increase and decrease in electrical resistance due to changes in temperature. Electrical energy can be routed through electrically conductive pathways 906 using electrical pads 908. As described more fully below, the embodiment illustrated in FIG. 9A enables functional separation between the material utilized as the light absorbing layer to convert photonic energy to heat energy and the material utilized as the electrically conductive pathway. Accordingly, a first material that absorbs heat efficiently, but is highly conductive, can be utilized in conjunction with a second material that is not an efficient heat absorber, but is highly resistive.

Figure 9B:
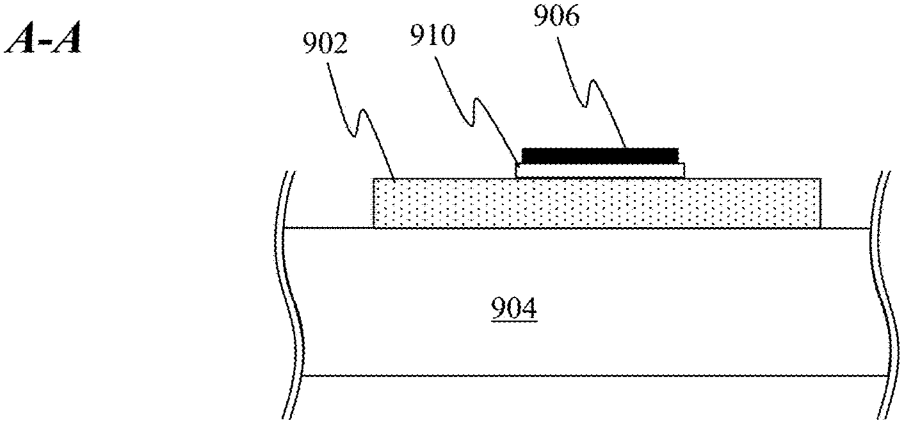
FIG. 9B shows a cross-sectional view of a reaction vessel in accordance with section line A-A of FIG. 9A.

FIG. 9B shows a cross-sectional view of reaction vessel 900 in accordance with section line A-A of FIG. 9A. In particular, FIG. 9B shows how electrically conductive pathway 906 can be electrically insulated from light absorbing layer 902 by an electrically insulating layer 910. In this way, electrical current received at electrical pads 908 through electrically conductive pathway 906 can be prevented from being unintentionally conducted to light absorbing layer 902. The electrical isolation provided by embodiments of the present invention can be important in obtaining accurate voltage drop readings that benefit from the higher electrical resistivity of the material used to form electrically conductive pathways 906. It should also be noted that electrically conductive pathway 906 can be substantially narrower than the segments of light absorbing layer 902 upon which it is positioned. This narrow configuration of electrically conductive pathway 906 allows portions of light absorbing layer 902 to remain exposed so that heat generated within light absorbing layer 902 can be conducted directly into solution flowing over and around light absorbing layer 902.

Figure 10:
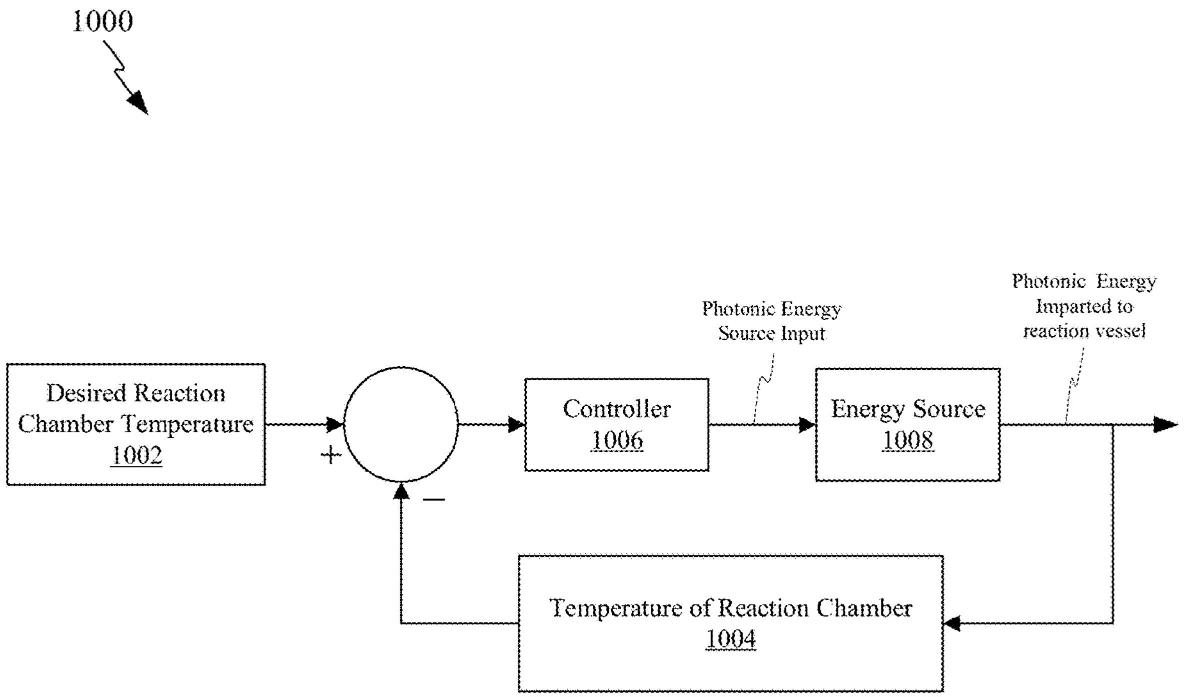
FIG. 10 shows a feedback control loop for modulating output of a photonic energy source into a reaction vessel based on temperature sensor readings.

FIG. 10 shows a feedback control loop 1000 for modulating output of a photonic energy source into a reaction vessel. In particular, the feedback control loop 1000 can receive a desired temperature profile for a reaction chamber of the reaction vessel associated with a particular procedure. A temperature of the reaction chamber can be monitored by a temperature sensor disposed within the reaction chamber. In some embodiments, the temperature sensor can be incorporated into a light absorbing layer that is responsible for transferring heat from a photonic energy source into the reaction chamber. In some embodiments, the temperature sensor can be a discrete sensor not directly associated with a light absorbing layer. The temperature sensor measures temperature information 1004, which is then subtracted from desired internal temperature profile 1002. A controller 1006 receives the difference between the actual and desired temperature and modulates the photonic energy source input signal transmitted to photonic energy source 1008 to maintain the desired temperature within the reaction chamber. Controller 1006 can take many forms including the form of a PI, PD, or PID controller.

Figure 11A:
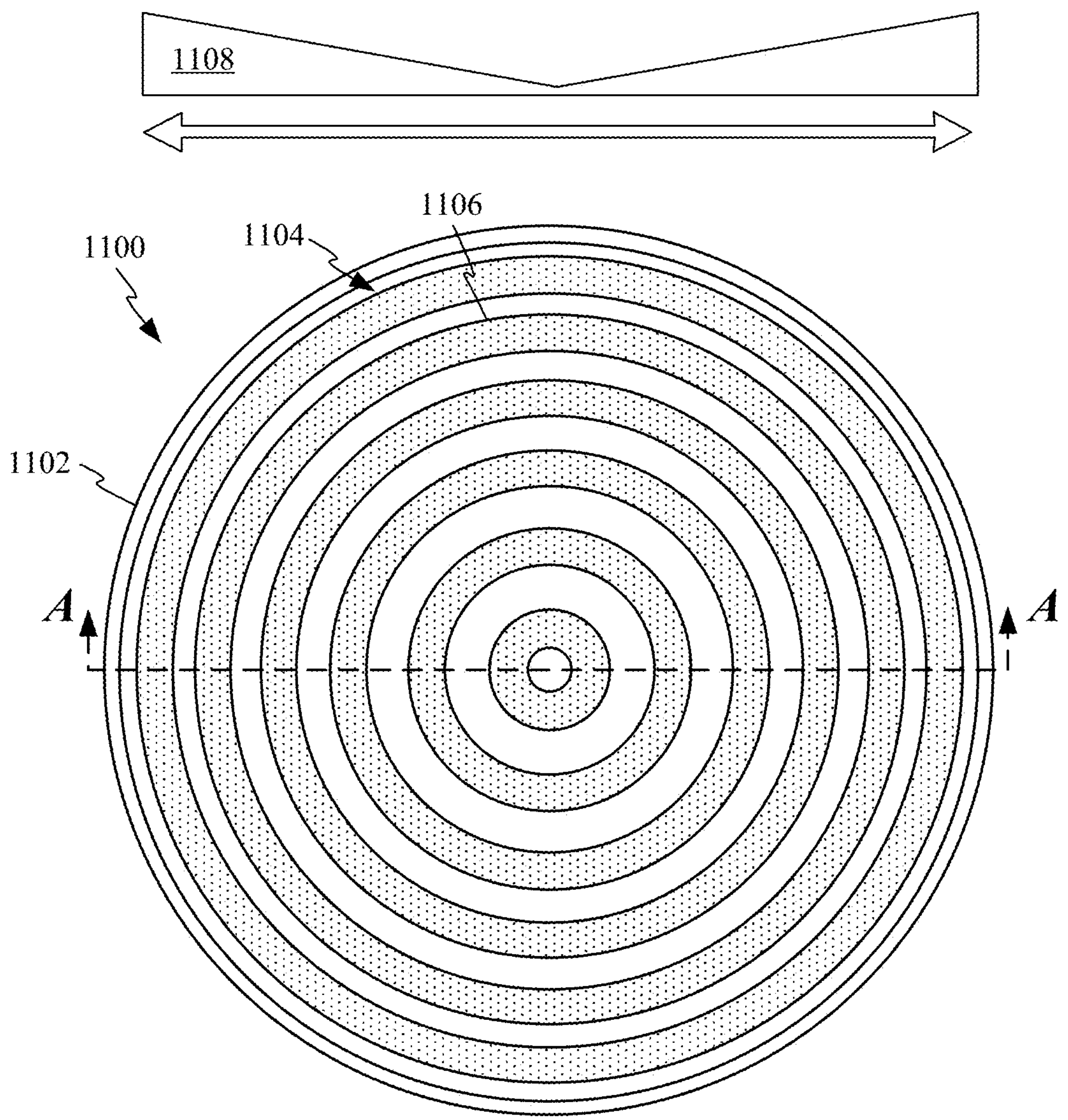
FIGS. 11A-11C show different light absorbing layer configurations formed from patterned metallic film that include discrete regions arranged so that a density of the light absorbing layer varies across a surface of a reaction vessel wall.
Figure 11B:
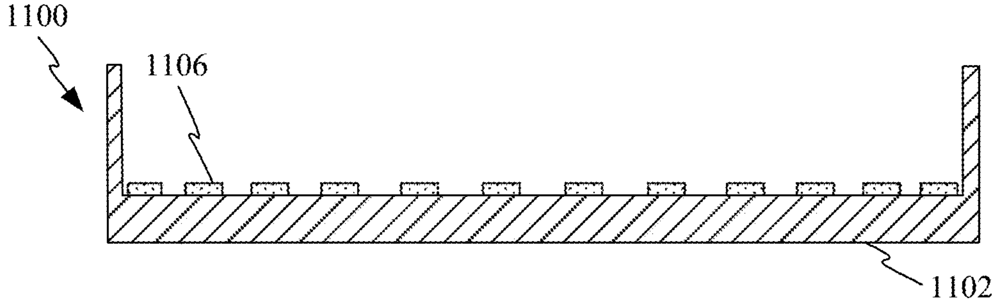
Figure 11C:
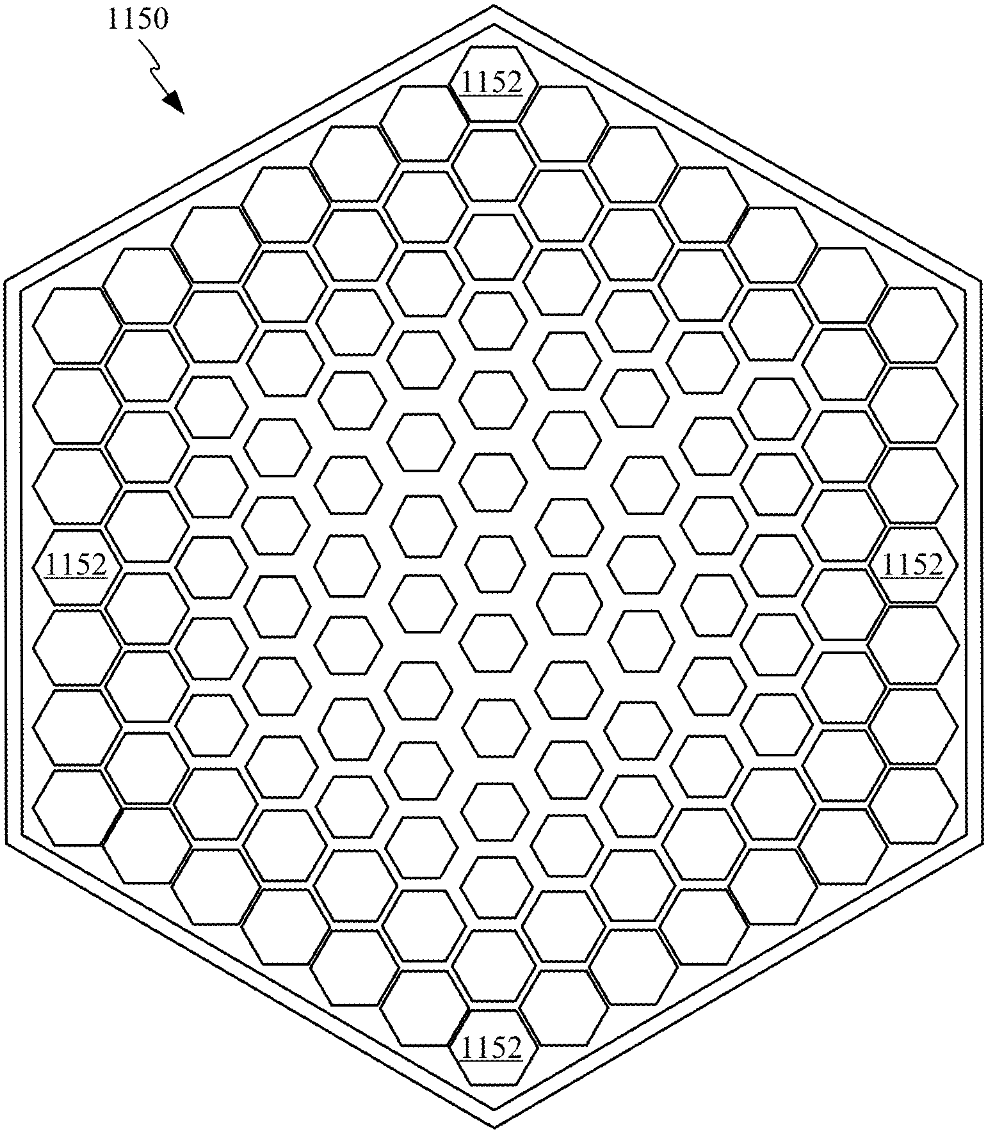

FIGS. 11A-11C show different light absorbing layer configurations formed from patterned metallic film that include discrete regions arranged so that a density of the light absorbing layer varies across a surface of a reaction vessel wall. In particular, FIG. 11A shows a reaction vessel 1100 having a reaction vessel wall 1102 that includes discrete regions of a light absorbing layer 1104 taking the shape of concentric rings 1106. A spacing between the concentric rings can get incrementally larger as the rings get increasingly closer to a central region of light absorbing layer 1104. Density profile 1108 shows an exemplary light absorbing layer density profile indicating how the density of the metallic film making up light absorbing layer can be substantially greater along its peripheral region than in its central region. In this way, a periphery of the light absorbing layer can be more efficient at absorbing and transferring heat into reaction vessel 1100 than a central portion of the light absorbing layer. In some embodiments, this configuration can be beneficial where a light source being directed at the light absorbing layer is more intense at its center than along its periphery. In such a case, reducing the density of light absorbing layer 1104 in the central region and increasing the density of light absorbing layer 1104 it along the periphery can help to normalize an amount of energy introduced across the surface of reaction vessel wall 1102 upon which light absorbing layer 1104 is disposed.

FIG. 11B shows a cross-sectional side view of reaction vessel 1100 in accordance with section line A-A of FIG. 11A. FIG. 11B shows a thickness of the patterned metallic film by illustrating a thickness of concentric rings 1106. FIG. 11B also depicts how a shape of reaction vessel wall 1102 can be substantially flat. This differs from the reaction vessel shown in FIGS. 1A-1B which showed concave geometries for the reaction vessel wall. In some embodiments, the concave geometry can perform a similar function as the density gradient of the light absorbing layer by reducing the amount of solution positioned along the periphery of the reaction vessel thereby reducing the amount of heat needing to be sent to the periphery and helping to establish an even distribution of heat within reaction vessel 1100. In some embodiments, a density gradient can be used in combination with a slightly concave geometry for a reaction vessel wall to achieve an even distribution of heat within the reaction vessel.

FIG. 11C shows an alternative variable density light absorbing layer configuration for a reaction vessel 1150 in which discrete regions 1152 of a light absorbing layer take the form of hexagonal discrete regions. At the outer periphery of the light absorbing layer the hexagonal discrete regions are only separated very slightly. The discrete hexagonal regions are then separated by incrementally greater distances towards the central region of a reaction vessel wall. A size of the discrete hexagonal regions can also be reduced towards the central region to help facilitate the larger gaps between the discrete regions. It should be appreciated that while the hexagonal shape does facilitate an efficient spacing of the discrete regions, other shapes for the discrete regions are possible and deemed to be within the scope of the disclosure. For example, triangular or even curved non-polygonal shapes are possible. FIG. 11C also shows how a geometry of the reaction vessel itself can have a non-circular/non-rectangular geometry well suited for accommodating a size and shape of the discrete regions of the light absorbing layer. Furthermore, reaction vessels in general can have other shapes and sizes as needed to help facilitate the even distribution of heat within the reaction vessel.

Figure 11D:
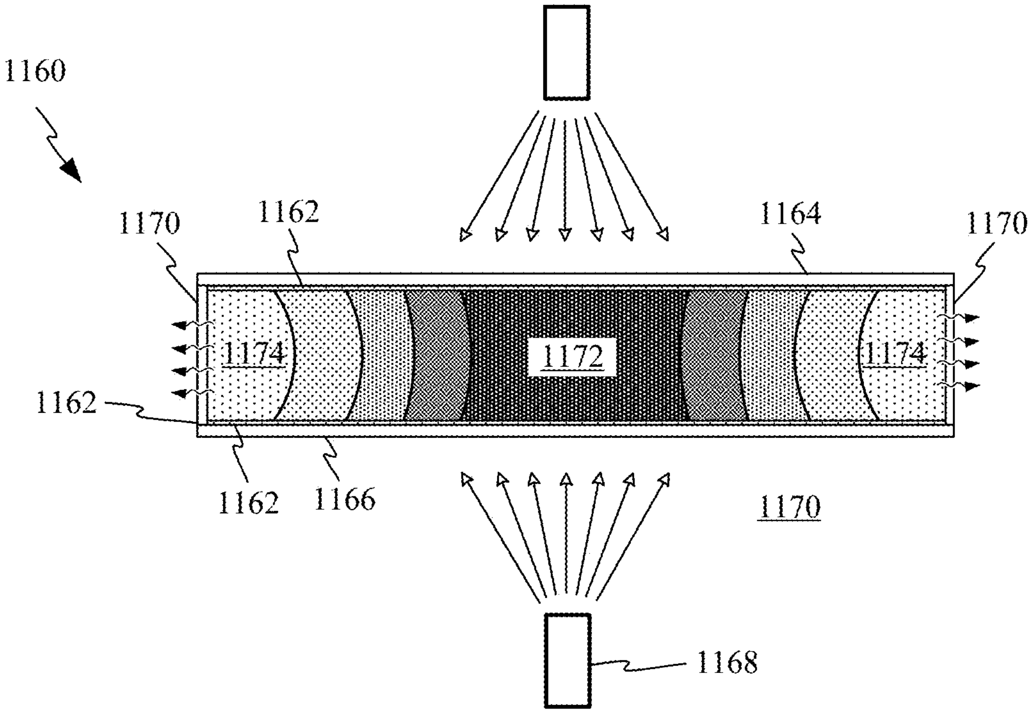
FIG. 11D-11E show exemplary side views of a distribution of heat within reaction vessels using conventional light absorbing layers and patterned light absorbing layers.
Figure 11E:
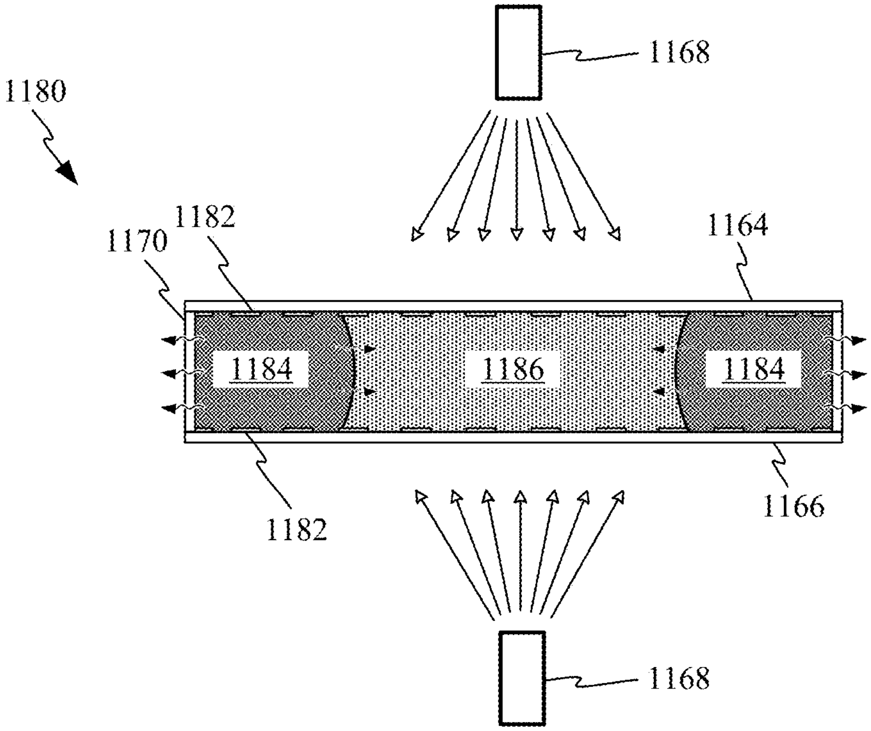

FIG. 11D-11E show exemplary side views of a distribution of heat within reaction vessels using conventional light absorbing layers and patterned light absorbing layers. FIG. 11D shows an interior portion of a reaction vessel 1160 including light absorbing layers 1162 on interior-facing surfaces of both an upper reaction vessel wall 1164 and a lower reaction vessel wall 1164 of reaction vessel 1160. Light absorbing layers 1162 can take the form of solid layers of metallic film. FIG. 11D also shows how when energy sources 1168 illuminate light absorbing layers 1162 an uneven distribution of heat builds up within reaction vessel 1160. This uneven distribution of heat occurs because heat is injected substantially evenly across upper and lower walls 1164 and 1166 of reaction vessel 1160 and the heat being added is only able to escape reaction vessel 1160 through lateral walls 1170 of reaction vessel 1160. This results in central region 1172 being the warmest region and the dot patterns indicate how the heat gradually drops until reaching its lowest temperature in peripheral region 1174 of reaction vessel 1160 due to the dissipation of the heat through lateral walls 1170. This highly varied distribution of heat can be undesirable where a more uniform distribution of heat is desired.

FIG. 11E shows how patterned light absorbing layers 1182 can be adhered to upper and lower reaction vessel walls 1164 and 1166 of reaction vessel 1180. Patterned light absorbing layers 1182 can have a varied density that results in a larger amount of heat being applied to peripheral region 1184 than to a central region 1186. This configuration of light absorbing layers 1182 can be similar to or the same as the light absorbing layer configurations depicted in FIGS. 11A and 11C. The use of this varied density light absorbing layer configuration results in heat transferring out of the peripheral region 1184 in two different directions. A first portion of the heat is conducted into central region 1186 and a second portion of the heat escapes the reaction vessel through lateral walls 1170 of reaction vessel 1180. In this way, a thermal gradient within reaction vessel can be normalized even though heat still escapes reaction vessel 1180 through lateral walls 1170. While FIG. 11E does depict a slight thermal gradient remains between central region 1186 and peripheral region 1184, it should be noted that in some embodiments, this configuration or a similar one can result in little to no variation in temperature within reaction vessel 1180.

Figure 12A:
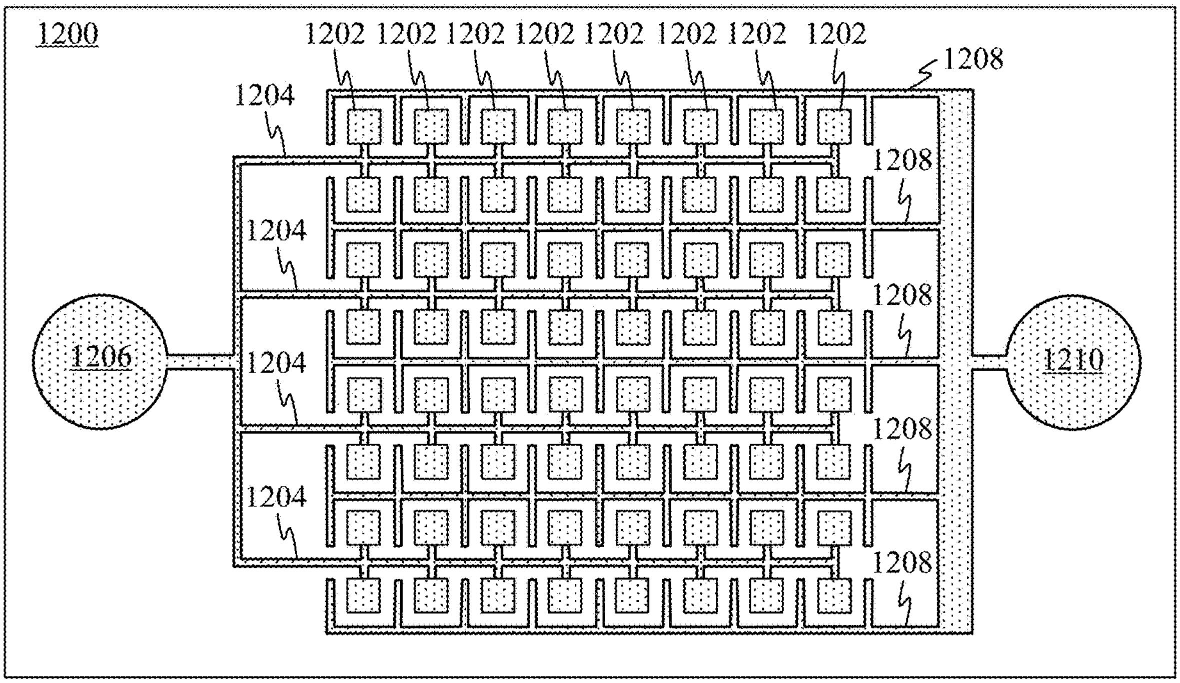
FIG. 12A shows a top view of a microfluidic device that includes an array of microwells for conducting various types of operations such as PCR operations.

FIG. 12A shows a top view of a microfluidic device 1200 that includes an array of microwells 1202 for conducting various types of experiments such as PCR operations. The array of microwells is connected by a series of fluidic channels 1204 to a sample inlet 1206. In some embodiments, the fluidic channels 1204 are separate from the microwells 1202, which may be discrete reaction chambers, as described below. That is, the fluidic channels 1204 are employed merely to transport fluid to the various microwells 1202, while the reactions (e.g., PCR or other amplifications) may be configured to occur within the individual microwells 1202. As shown in FIG. 12A, in some embodiments, the microwells 1202 may have dimensions larger than the width of the fluidic channels 1204 through which fluids are introduced. Micro-fluidic device 1200 also includes a series of circulation channels 1208 that are configured to allow suction to be applied at suction outlet 1210 to help draw solution through fluidic channels 1204 and into microwells 1202.

Each of the microwells 1202 may be a "discrete reaction chamber." In some embodiments, as described elsewhere herein, each of these discrete reaction chambers may include discrete regions of a light absorbing layer (e.g., as described with respect to the discrete regions 302, 304 and 306 in FIG. 3A). Each of the microwells 1202 may be configured as a discrete reaction chamber by separating each of the microwells 1202 such that diffusion or convection among the different microwells 1202 is prevented, or at least reduced appreciably. For example, each of the microwells 1202 may be fluidly coupled or connected by fluidic channels 1204, but may be separated from each other by a suitable distance (e.g., a threshold distance beyond which appreciable numbers of molecules such as DNA molecules are incapable of diffusing). There are many applications in which it is desirable to carry out separate reactions simultaneously (e.g., on many separate sample partitions) on a single substrate or device. For example, nucleic acid amplifications such as PCR (e.g., use for accurate quantification of specific DNA molecules and the detection of rare DNA molecules) may require simultaneous reactions that occur separately. As another example, single-cell DNA/RNA amplification, where the DNA/RNA within individual cells of the sample are amplified in order to generate single-cell information on a large collection of cells, may require simultaneous reactions that occur separately.

However, when multiple individual sample partitions are thermally cycled, they cannot be in both thermal and fluidic contact, since such contact would cause the individual sample partitions would amplify together and the primers and amplicons would be mixed. In that case, the connected partitions may behave as a single partition. Conventional methods of performing nucleic acid amplification in multiple partitions on a single substrate employ a means of interrupting the fluidic contact between the partitions. This is done with a variety of methods, such as the use of mechanical valves or valve-like deformations of an elastomeric device, droplets separated by a non-aqueous immiscible phase, or the use of a second phase such as an immiscible oil or air to separate the partitions in an array after the chambers containing them have been filled. These methods add a layer of complexity and may lead to, for example, increased costs of manufacturing, manufacturing defects, increased risk of malfunction, increased maintenance costs, etc.

In some embodiments of the invention disclosed herein, regions (e.g., microwells) of the device may be fluidically coupled (e.g., there may be no physical barrier physically sealing the partitions from each other), but thermal contact between them may be broken. The lack of thermal contact may allow these "partitions" to be heated and cooled individually (e.g., by photonic heating, as described elsewhere herein). To ensure separation between the reactions, it may be ensured that transport of molecules between the partitions by diffusion or convection cannot occur. Convection may be suppressed by making sure the entire device is sealed during cycling, to prevent movement of fluid within the device.

In some embodiments, to avoid transport of molecules by diffusion, it may be necessary to ensure that the fluid pathway between neighboring partitions is long enough to prevent molecules from traveling between them. As an example, referencing FIG. 12A, the pathways provided by the fluidic channels 1204 between each of the microwells 1202 may be long enough to prevent molecules from traveling between the microwells 1202. In some embodiments, a minimum distance to prevent diffusion may be calculated. As an example, a device may include multiple chambers that are 50 μm high, and 200×200 μm in area, with a volume of 2 nl. When these chambers are filled with a PCR master mix, e.g., with a typical primer concentration of 0.1 to 0.5 this means there are in the order of 1 to $6\times10^{8}$ primer molecules in a chamber before amplification starts. It also means that the total number of DNA amplicons that can be generated is also in the order of $10^{8}$ molecules. One dimensional diffusion from a source at constant concentration is given by the following solution to Fick's Law:

$$\frac{c}{c_0} = \text{erfc}\left(\frac{x}{2\sqrt{Dt}}\right)$$

where c is the concentration of the diffusing molecule, co is the concentration at the source, x is the distance from the source, D is the diffusion coefficient, and t is the time. One property of the complementary error function erfc is that it goes to zero very quickly. Based on the number of molecules present, a concentration ratio below $10^{-8}$ may be needed to completely suppress diffusion between chambers. This may require that:

$$\frac{x}{2\sqrt{Dt}} > 4.05$$

Essentially, based on the equation above, the distance x may need to be greater than 8.1-07. The distance x may be estimated based on literature values of the diffusion constant of molecules (e.g., DNA molecules) as a function of their size. As an example, for 100 base pairs, the diffusion constant is $1.8\times10^{-7}$ $cm^2/s$. The time t is at most equal to the total time needed for the entire amplification reaction. Using, for example the photonic energy method described herein, the total time may be in the order of 600 seconds. Therefore, in this example, a separation of about 837 μm between chambers may be needed. As is evident from the equations above, reducing the total time reduces the distance required between partitions or microwells 1202. As described elsewhere, embodiments of the invention described herein allow for faster reaction times (and therefore less total time t) than conventional methods (e.g., due to improved speed in thermal cycling). As such, the invention may allow for more dense packing of microwells 1202, which may result ultimately in increased throughput and/or reduced device size. In some embodiments, the pathways between the microwells 1202 may be made more tortuous (e.g., by curving or bending the pathways) and/or narrower in order to achieve both reduced diffusion and high density.

Figure 12B:
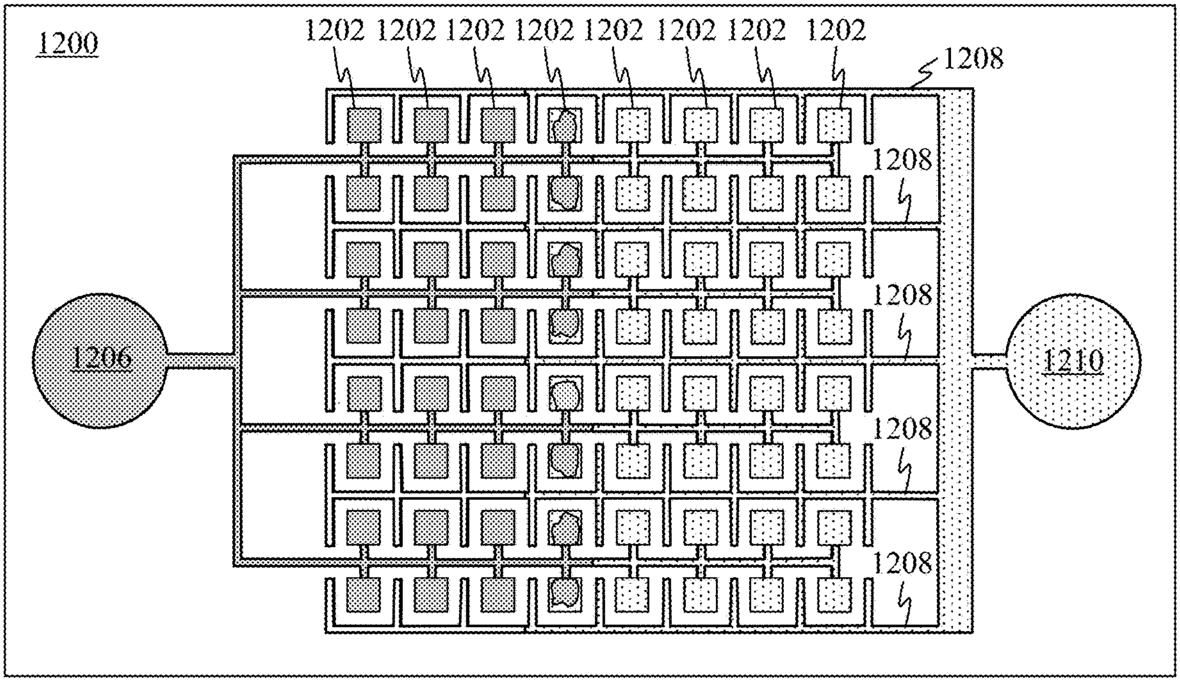
FIG. 12B shows how solution containing a desired concentration of DNA materials can be input into the series of fluidic channels through a sample inlet.

FIG. 12B shows how a solution containing a desired concentration of DNA materials can be input into the series of fluidic channels 1204 through sample inlet 1206. If fluidic channels 1204 terminated at microwells 1202 and were fully sealed up then inputting solution into fluidic channels 1204 would quickly drive up pressure within microfluidic device 1200 due to gas existing within the microfluidic device 1200, and would prevent fluid from filling some or all of the microwells 1202. One solution to this problem would be to have one or more outlets that would provide a means of egress for the gas within the microfluidic device 200. However, the use of outlets may be problematic for some use cases in that it introduces the possibility of flow through the device channels. This flow may prevent microwells from remaining filled with the same fluid, as some of the fluid may get caught in the flow.

The use of gas-permeable materials may remedy this problem in that gas within the device may escape without requiring an outlet. That is, a design incorporating gas-permeable materials may allow a device to have only a single inlet for a fluid (similarly, it may allow for a reaction chamber or microwell 1202 to have a single access channel). This may ensure that the device (or reaction chamber) remains filled with the same fluid by ensuring that no flow through the device channels is possible after the device is filled. One method to ensure sufficient gas permeability is to make the entire device with a material such as silicone rubber, or polydimethylsiloxane (PDMS). This material has a high gas permeability, which furthermore can be adjusted by varying the degree of cross-linking. A microfluidic device made of PDMS may allow for "blind filling," or "dead-end filling" of channels or microwells simply by applying enough pressure on the filling fluid such that the fluid naturally fills the microwells indiscriminately. However, this method may be slow and uncontrolled, since there is no specific destination for the air displaced from the dead-end channels other that the bulk of the PDMS that constitutes the device. The pathway that the displaced air has to travel through by permeability is long, and certainly longer than the dimensions of the channels and chambers being filled. Other methods have been proposed by various researchers to create specific gas permeable structures to facilitate dead-end filling. One such method involves creating a three-dimensional structure, in which the ceiling is composed of a gas-permeable membrane. In the upper channel, a vacuum is used to remove the air in the channel being filled. One disadvantage of this method is that it requires complex microfluidic device fabrication, with multiple layers, and the need for a gas permeable membrane.

In some embodiments of the invention, the microfluidic device may include one or more lateral gas-permeable barriers along a periphery of the microwells 1202 (or any other such "dead-end areas") being filled. Around the microwells 1202 to be filled, one or more circulation panels 1208 may be used to apply a vacuum. Once negative pressure of the vacuum is applied to circulation channels 1208 gases trapped within microwells 1202 can be drawn through gas-permeable walls positioned between microwells 1202 and circulation channels 1208. The described configuration of using circulation channels 1208 to transport gas outside of the microfluidic device 1200 may have the added advantage of preventing the introduction of any air bubbles within microwells 1202 that could affect the consistency the amount of volume of solution within each of microwells 1202. In some embodiments, as illustrated in FIGS. 12A-12D, circulation channels 1208 may surround each individual microwell 1202, which may allow the circulation channels 1208 to be located as closely to the egressing gas as the fabrication tolerances allow. Since PDMS fabrication typically uses replication of masters that are made with photolithographic methods, these tolerances can be very small. A typical lithographic tolerance could be 5 micrometers, although channel separations are often somewhat larger, 10 to 100 micrometers for instance. This means that two laterally separated channels on the same layer can be located closer together than the typical thickness of a film or membrane used for gas permeability in a three-dimensional structure.

Figure 12C:
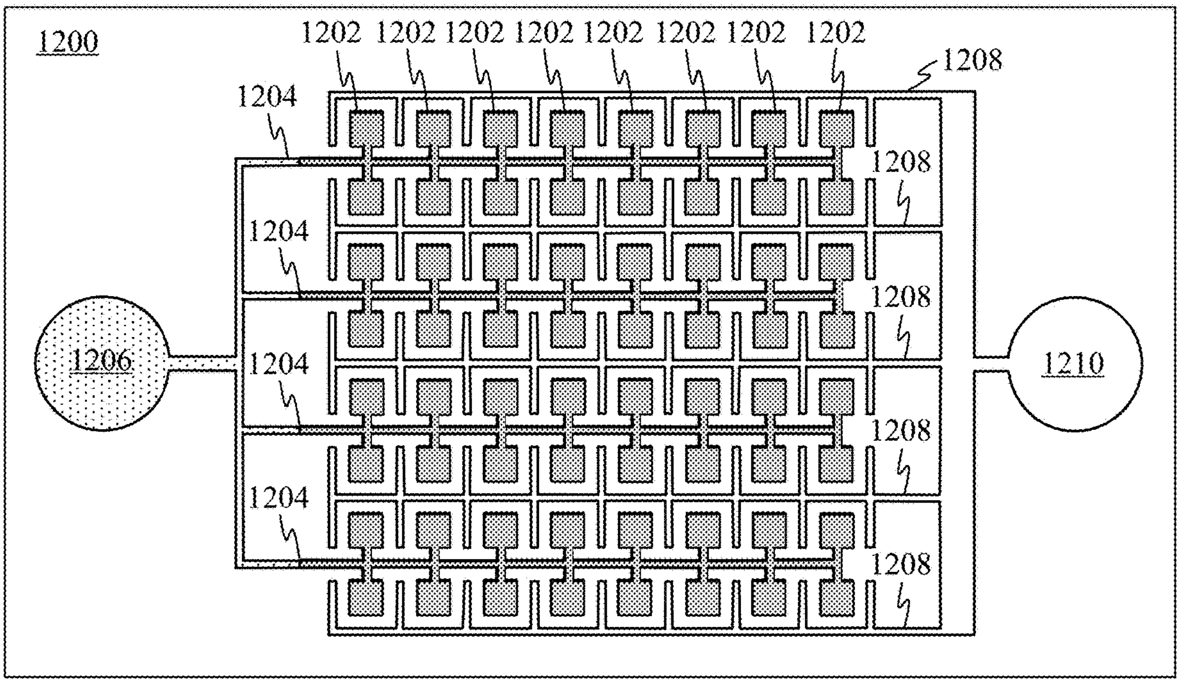
FIG. 12C shows how solution is ultimately drawn into and fills each of the microwells.

FIG. 12C shows how solution is ultimately drawn into and loads each of microwells 1202. In some embodiments, there may be portions of fluidic channels 1204 that do not have any fluid (e.g., the left-most portion of fluidic channels in FIG. 12C). These portions may be filled with air (e.g., via the sample inlet 1206), which may prevent the solution from backing out of microwells 1202 after ceasing the application of negative pressure through circulation channels 1208. As explained previously, molecules within the microwells 1202 may remain within their respective microwells 1202, because the microwells 1202 may be configured such that the microwells 1202 are separated by a distance beyond which the molecules may be unable to diffuse appreciably.

Figure 12D:
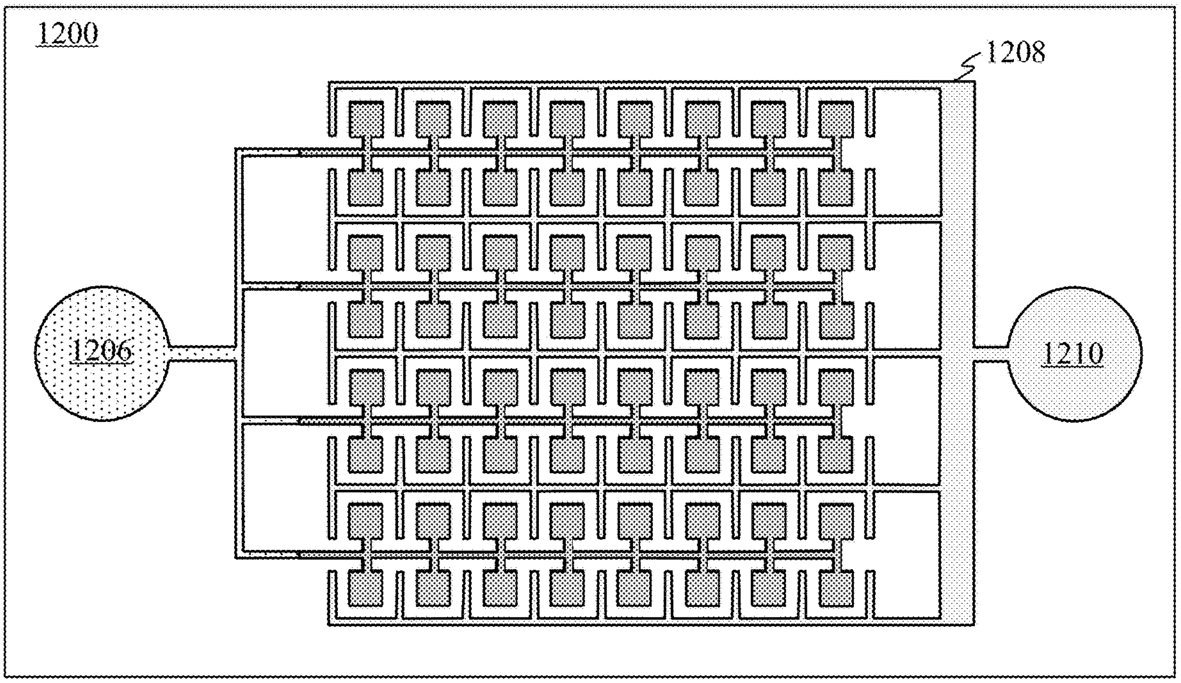
FIG. 12D shows how circulation channels can be filled up with liquid once the microwells have been filled.

FIG. 12D shows how circulation channels 1208 can be filled up with liquid once microwells 1202 have been loaded. Filling circulation channel 1208 with the filler liquid can prevent evaporated solution from passing through the gas permeable walls to escape microwells 1202. In some embodiments, the circulation channels 1208 may be operably coupled to a filler liquid source. The filler liquid source may be a part of the microfluidic device 1200, or may be outside the microfluidic device 1200. The microfluidic device 1200 may include a valve that separates the filler liquid source from the circulation channels 1208. Alternatively, the valve may be outside the microfluidic device 1200. Filling circulation channels 1208 with the filler liquid can be easier if circulation channels 1208 remain mostly free of gases since the low pressure will help draw the fluids into circulation channels 1208. In some embodiments, the filler liquid may be water.

Figure 13:
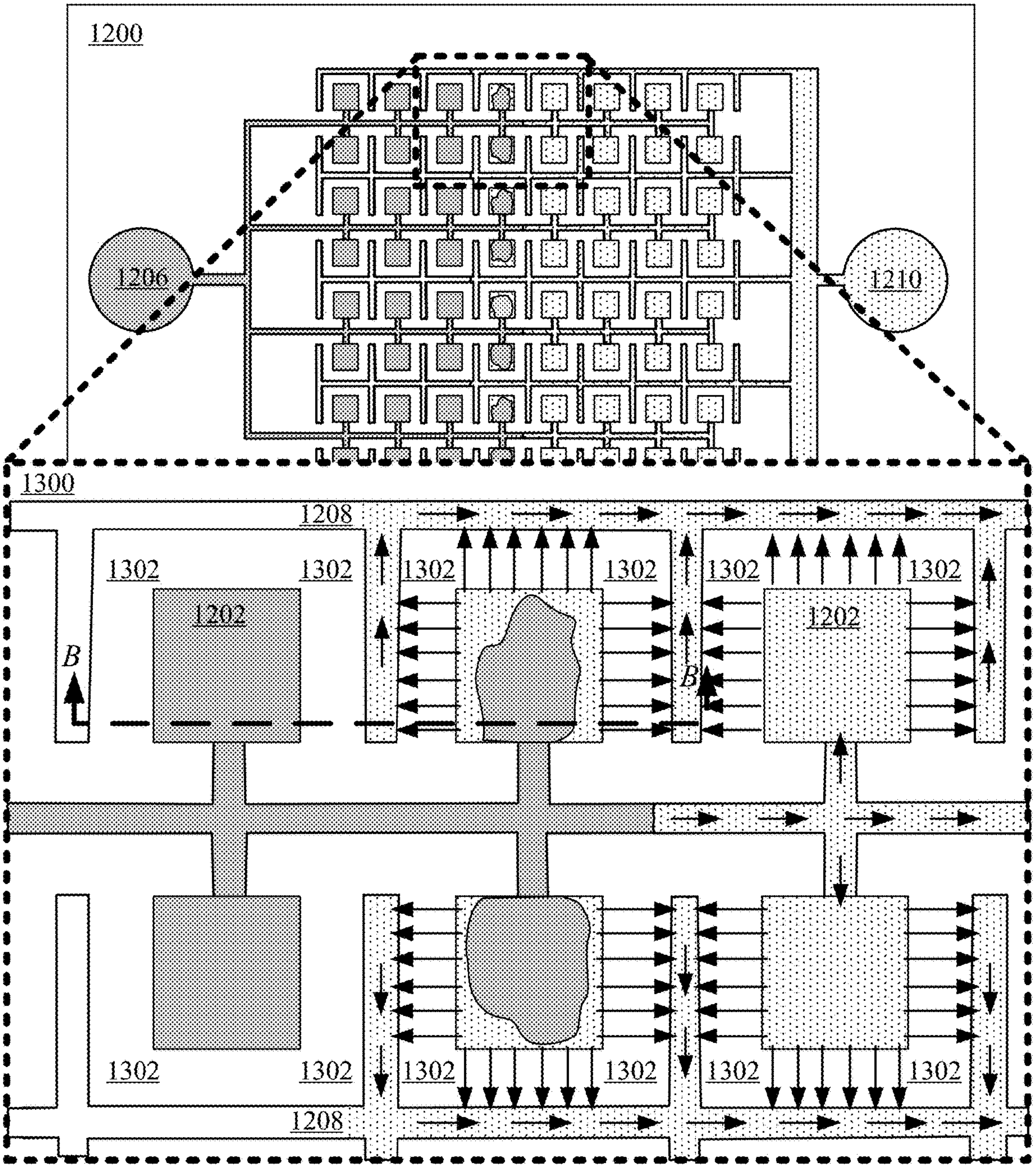
FIG. 13 shows a close up view of one portion of a microfluidic device.

FIG. 13 shows a close up view 1300 of one portion of microfluidic device 1200. Arrows indicate how air within microwells 1202 is drawn out of microwells 1202 and into circulation channels 1208 to suction outlet 1210. In some embodiments, suction outlet 1210 can include a fitting for attaching a negative pressure apparatus such as a vacuum for reducing pressure within circulation channels 1208.

Figure 14A:
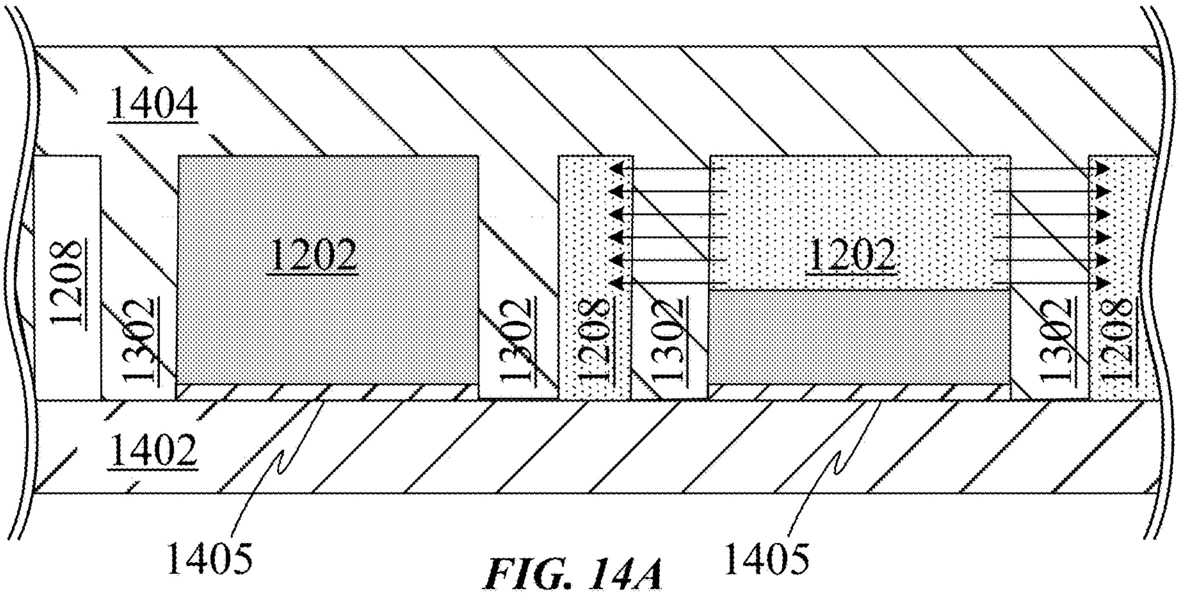
FIG. 14A shows a cross-sectional side view of the microfluidic device depicted in FIGS. 12A-13 in accordance with section line B-B of FIG. 13.

FIG. 14A shows a cross-sectional side view of microfluidic device 1200 in accordance with section line B-B of FIG. 13. In particular embodiments, a first substrate 1404 can be formed from gas permeable material and include recesses that define fluidic channels 1204, microwells 1202 and circulation channels 1208. In some embodiments, a second substrate 1402 having a flat geometry can be formed from a gas-impermeable material such as glass, polymer or semiconductor wafer material. First substrate 1404 and second substrate 1402 can be coupled together by an attachment feature such as one or more clamps or a hinge and clamp combination. Arrows show how air molecules within microwells 1202 can be drawn through gas permeable walls 1302 to enter circulation channels 1208. It should also be noted that a layer of patterned film 1405 can be affixed to a portion of second substrate 1404 so that illumination of layer of patterned film 1405 can be used as a mechanism for heating and cooling solution positioned within. While patterned film 1405 is shown positioned at the base of microwells 1202 it should be noted that it could also be positioned at the top of each of microwells 1202. In some embodiments, patterned film 1405 can be positioned on both bottom and top surfaces of each of microwells 1202.

Figure 14B:
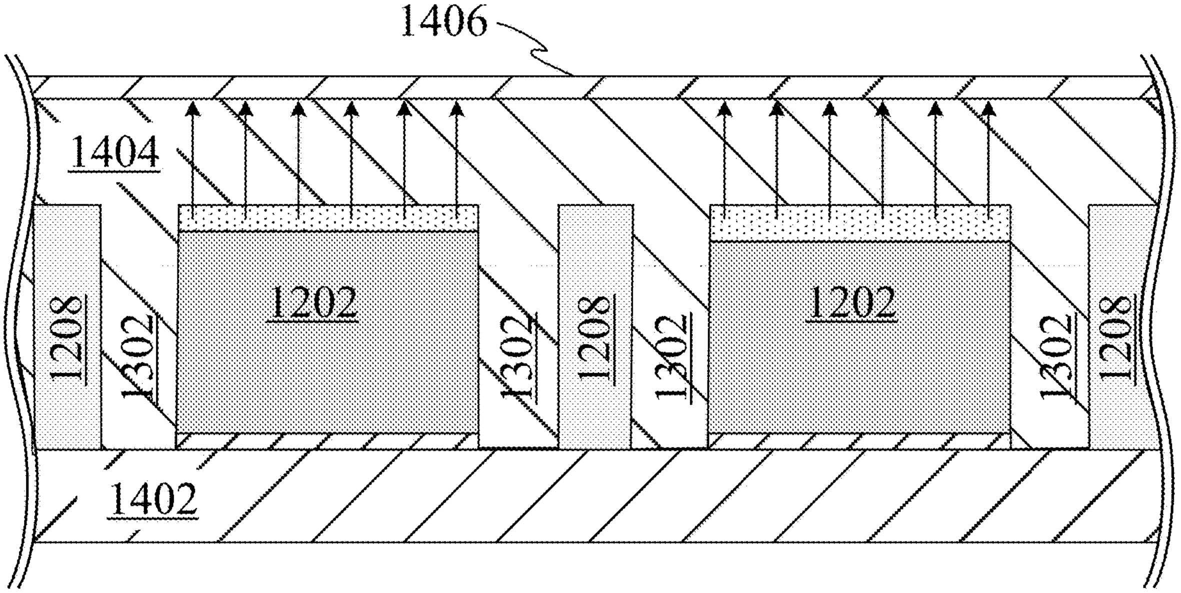
FIG. 14B shows another cross-sectional view of the microfluidic device depicted in FIG. 12A-13.
Figure 14C:
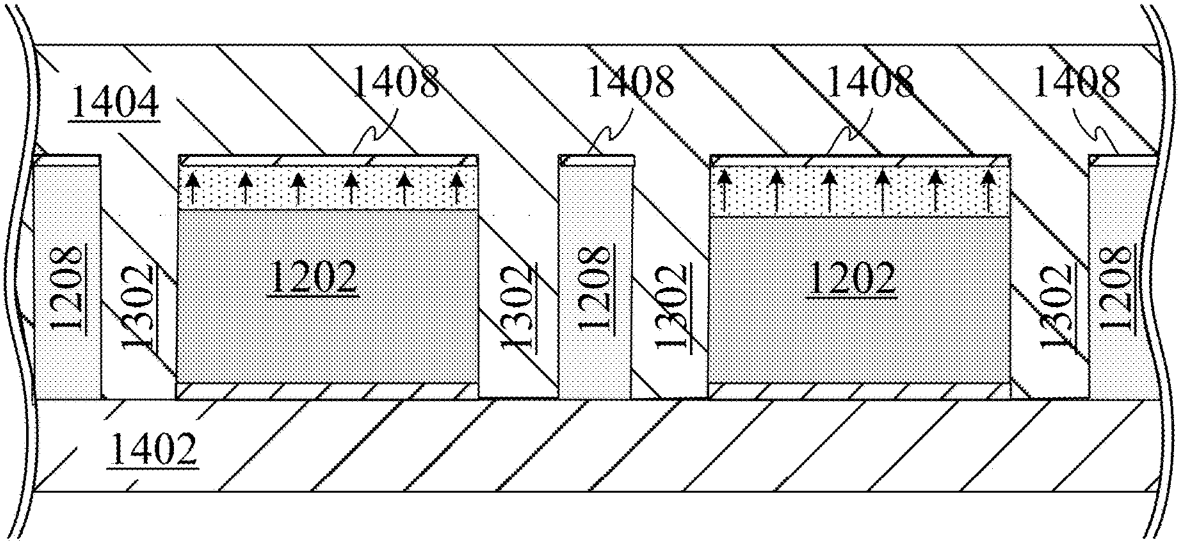
FIG. 14C shows how evaporation barriers can be positioned along a top surface of microwells and circulation channels.

FIG. 14B shows another cross-sectional view of microfluidic device 1200. FIG. 14B shows how when solution within microwells 1202 undergoes heating and cooling at least partial vaporization of the solution can occur. By filling circulation channels 1208 with a liquid the vapor can be prevented from passing through walls 1302. The arrows in FIG. 14B show how vapor within microwells 1202 can move vertically through second substrate 1404. By placing a third substrate 1406 formed of gas-impermeable material, the vapor can be prevented from escaping microfluidic device 1200. FIG. 14C shows how evaporation barriers 1408 can be positioned along a top surface of microwells 1202 and circulation channels 1208. In this way, vapor within microwells 1202 and circulation channels 1208 can be prevented from entering into second substrate 1404 during heating and cooling operations that tend to vaporize portions of the solution within microwells 1202.

Based on the literature definition of gas permeability, it may be possible to calculate the rate at which air or another gas is removed from a microwell by the application of a vacuum in a circulation channel located next to it. In the case that both the microwell and the circulation channel have the same height h, $$Q = P\frac{hl\Delta p}{d}$$

where Q is the gas flow rate, P is the gas permeability of the device material, h is the channel height, l is the length of the circulation channel along the perimeter of the microwell, Δp is the pressure difference between the fluid in the microwell and the circulation channel, and d is the distance between the fluid in the microwell and the circulation channel. The filling time may then be given as the chamber volume divided by Q. It can be seen that in order to achieve fast filling, which means high Q, l may be increased and d may be decreased. As such, in some embodiments, l may be brought as close as possible to the full perimeter of the microwell, although room must be provided for a fluidic channel. For example, l may be adjusted such that the channel surrounds more than 60% of the perimeter. As another example, l may be adjusted such that the channel surrounds more than 70% of the perimeter. The distance d between the fluid and circulation channels must be as small as possible, and typically smaller than the dimensions (e.g., length and/or width) of a microwell. For example, the distance may be less than 50% of the dimensions of a microwell. As another example, the distance may be less than 25% of a microwell.

Figure 15:
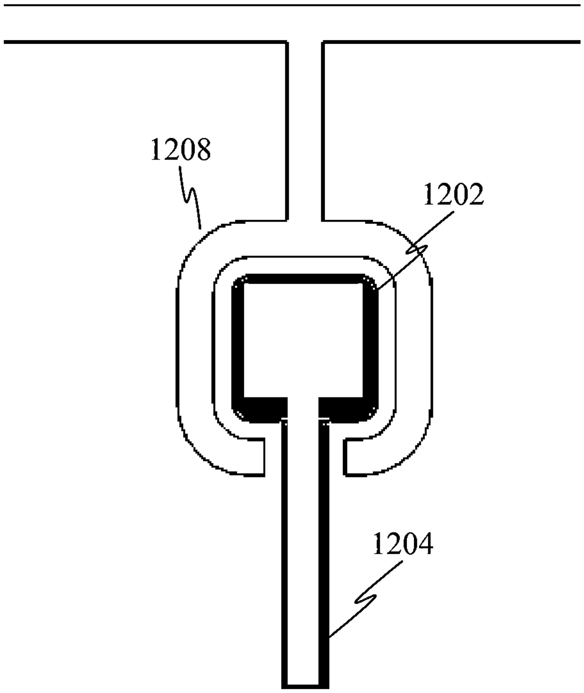
FIG. 15 shows an example embodiment where the length of a circulation channel around the perimeter of a microwell may be maximized and a distance between the fluid in the microwell and the circulation channel may be minimized, while leaving room for a fluidic channel.

FIG. 15 shows an example embodiment where the length l of a circulation channel 1208 around the perimeter of a microwell 1202 may be maximized and a distance d between the fluid in the microwell 1202 and the circulation channel 1208 may be minimized, while leaving room for a fluidic channel 1204. As an example, the microwell may have dimensions of 200×200 μm. The height for the circulation channel 1208 and the microwell 1202 may be 50 μm, and the separation between the two may be 25 μm. The volume of the chamber in this example embodiment of FIG. 14 may be 2 nl, and the loading time may be calculated using the equation above for the gas flow. Using a known permeability value of a material (e.g., PDMS) and assuming an applied vacuum of 0.5 atmospheres, it can be calculated that the loading time for this geometry will be around 8 seconds. This is much faster than the loading times that can be achieved with other lateral vacuum geometries, such as the one described in Martin Kolnik, Lev S. Tsimring and Jeff Hasty, "Vacuum-assisted cell loading enables shear-free mammalian microfluidic culture", Lab Chip, 2012, 12, 4732-4737. (In that reference, the video in the supplemental information section shows a filling time of about 90 seconds, which is an order of magnitude slower.) The invention herein allows for faster loading due to the various factors described herein. For example, the vacuum channel surrounds a large portion of the perimeter of the chamber, thereby increasing flow. As another example, the separation between the vacuum channel and the chamber is much smaller than the lateral dimensions of the chamber, again increasing flow.

Figure 16:
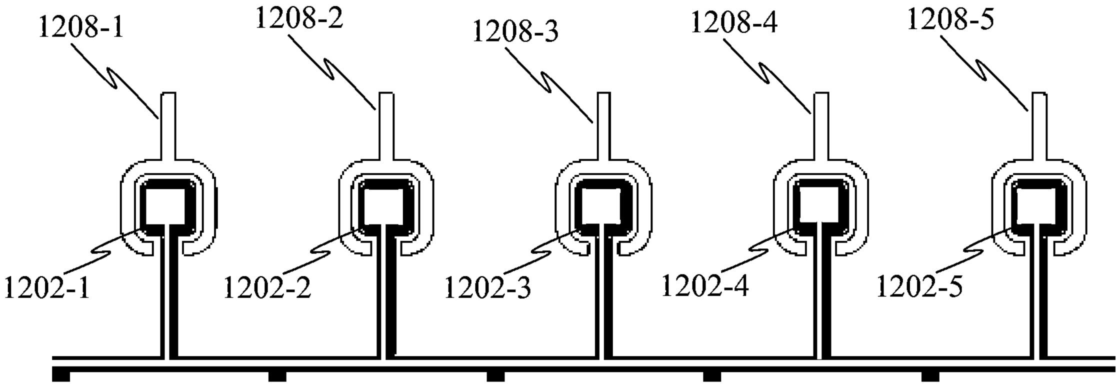
FIG. 16 shows an example embodiment of a microfluidic device with multiple vacuum sources.

FIG. 16 shows an example embodiment of a microfluidic device with multiple vacuum sources. In some embodiments, the microfluidic device 1200 may include a means for selectively controlling the vacuum in circulation channels 1208 around individual microwells 1202, or groups of microwells 1202. This selective control with multiple vacuum sources may be effectuated by having multiple standalone vacuum devices, or by a single vacuum device coupled to a system of valves that may be used to isolate segments of circulation channels 1208 to selectively apply a vacuum to one or more desired segments (e.g., applying a vacuum to a first segment while a valve leading to a second segment is closed during a first time period, and then opening the valve to apply the vacuum to the second segment during a second time period). In some embodiments, by selectively controlling the vacuum in circulation channels 1208 it may be possible to selectively control loading of microwells 1202. In some embodiments, as illustrated in FIG. 16, each microwell 1202-1 to 1202-5 may be loaded separately by controlling separated circulation channel segments 1208-1 to 1208-5 separately, for example, by coupling each of the circulation channel segments to a separate vacuum source. The negative pressure applied to each microwell 1202 may in this manner be individually controlled, and can be different for different chambers at certain times. Selective control of the vacuum as described can be used for any suitable purpose. For example, the microwells 1202 may be loaded in a desired order. A set of one or different samples can be flowed along fluidic channels 1204 and used to fill any of the chambers in any order. This level of control may permit a single microfluidic device 1200 to simultaneously allow for a number of different reactions to occur (e.g., referencing FIG. 16, loading a first sample into microwells 1202-4 to 1202-5, then loading a different second sample into microwell 1202-3, and then loading a different third sample into microwell 1202-1 to 1202-2). As another example, sets of microwells 1202 of the microfluidic device 1200 may be filled in a wave pattern, for example from left to right, by selective control of the vacuum in the circulation channels 1208. Referencing FIG. 16 as an example, the strength of a vacuum may be modulated over time such that it is strongest first within 1208-1, and then strongest within 1208-2, and so on until the whole row is filled. The method of filling chambers in a wave pattern may be useful for a microfluidic device 1200 that includes an outlet. Referencing FIG. 16 as an example, if an outlet is provided to the right of the microwell 1202-5, the strongest vacuum may be applied within the circulation channel 1208-1 at the opposite side of the outlet, and the vacuum may be sequentially increased among circulation channels 1208-2 to 1208-5 from left to right until all the microwells 1202 are filled. In some embodiments, an outlet may be provided with an outlet channel that allows for gas or liquid to be evacuated, for example to decrease the load time of a microfluidic device 1200—the load time may decrease because it may be faster for gas to egress from an outlet via an outlet channel than for gas to egress via a gas-permeable material.

Figure 17:
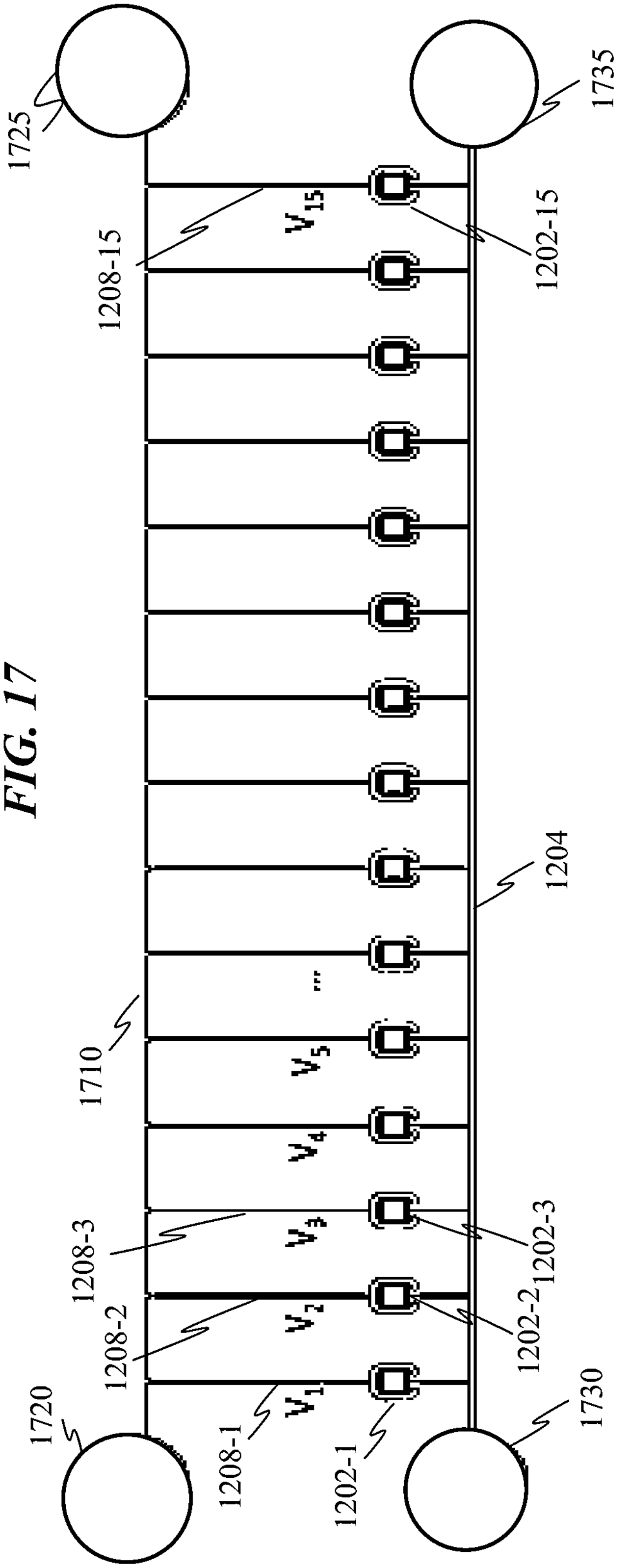
FIG. 17 shows another example embodiment of a microfluidic device with multiple vacuum sources.

FIG. 17 shows another example embodiment of a microfluidic device with multiple vacuum sources. As illustrated in FIG. 17, a vacuum device may be coupled to a master circulation channel bus 1710, which may be coupled to vacuum sources 1720 and 1725. The microfluidic device may have a series of microwells 1202-1 to 1202-15, each connected to a fluidic channel 1204, which may in turn be connected to a sample inlet 1730 and a sample outlet 1735. As illustrated, each of the microwells 1202-1 to 1202-15 may be connected to respective circulation channels 1208-1 to 1208-15, each of which may be coupled to the master circulation channel bus 1710. A sample fluid may be introduced from the sample inlet 1730. Initially, a relatively strong vacuum may be applied by vacuum source 1720, and a week or zero vacuum may be applied by vacuum source 1725. This may create a vacuum gradient in the circulation channel bus 1710. As a result, the vacuum experienced by microwells 1202-1 to 1202-15 may vary as the individual vacuum values of $V_1$ to $V_{15}$ (which may depend on a concentration of air remaining within the respective circulation channels 1208-1 to 1208-15) may vary. This may create the strongest filling force at the microwell 1202-1, and progressively weakening filling forces to the right of microwell 1202-1, with the weakest filling force being at the microwell 1202-15. The strength of the vacuum source 1725 may gradually be increased, thereby causing the microwells to be gradually be filled from left to right in a wave pattern. As discussed previously, a wave pattern may be particularly suitable in microfluidic devices using an outlet such as the outlet 1735 (e.g., because it may prevent or reduce the amount of sample fluid that may prematurely escape to the outlet 1735). Any suitable pattern may be effected using selective control of vacuum sources, and any suitable number of vacuum sources may be employed for the selective control.

Figure 18:
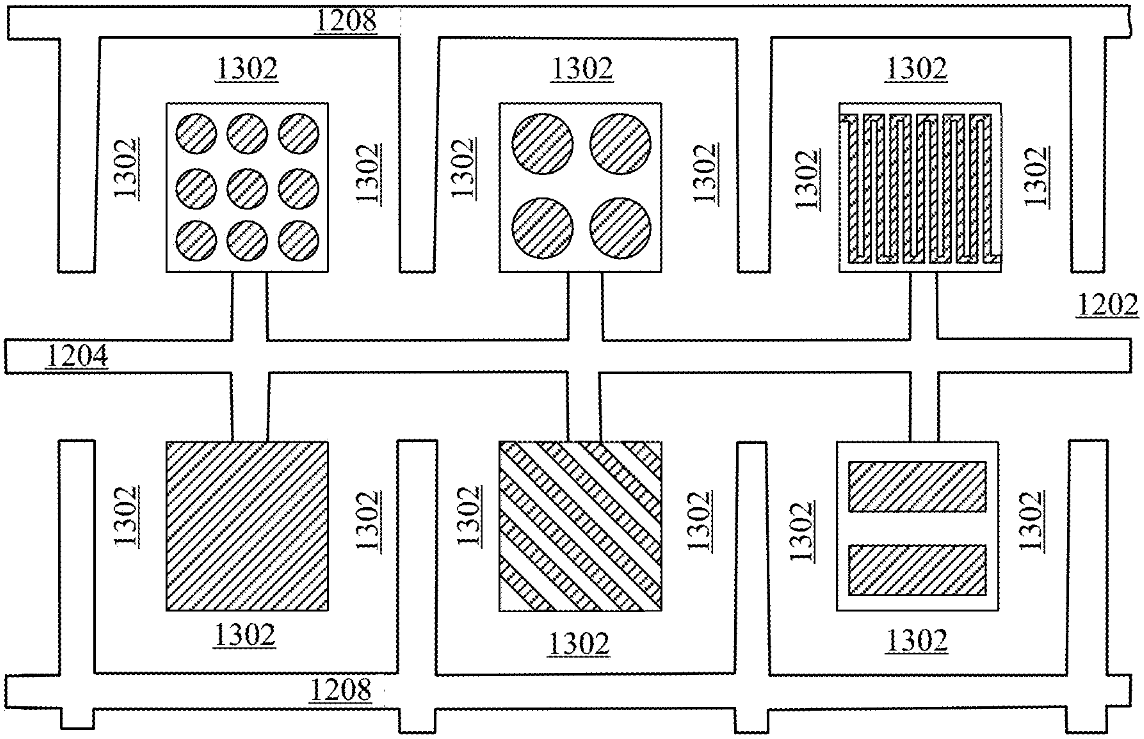
FIG. 18 shows a close up view of a microfluidic device having microwells utilizing a number of different patterned film configurations.

FIG. 18 shows a close up view of a portion of microfluidic device 1200, which includes microwells 1202 with various different patterned film configurations the utility of which are discussed above. It should be noted that microfluidic device 1200 can include many different patterned film configurations as depicted or every microwell 1202 can have the same patterned film configuration. In this way, microfluidic device 1200 can be configured to concurrently run the same type of PCR operation or a large variety of different types of PCR operations. The patterned film configurations can be arranged along substrate 1402 and/or substrate 1404. Microfluidic device 1200 can have many different configurations and also include features described in U.S. Pat. No. 9,737,888, which is incorporated by reference in its entirety and for all purposes.

Figure 19A:
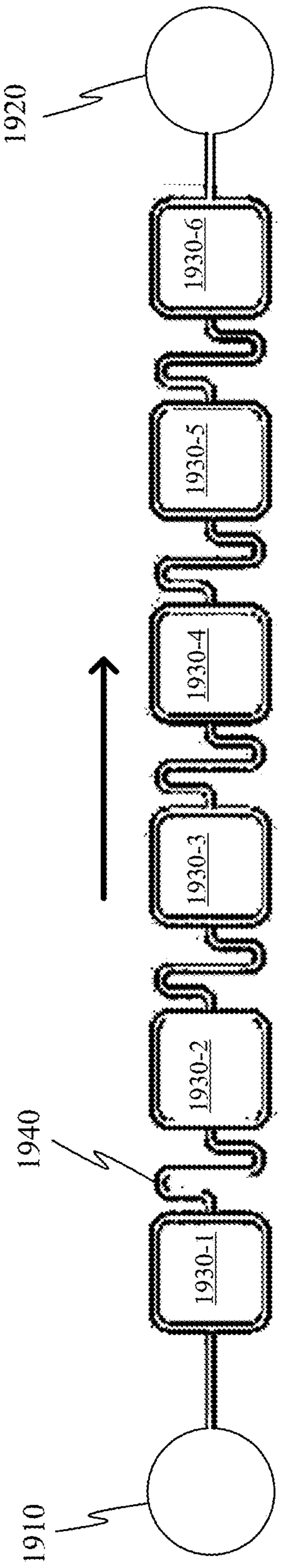
FIG. 19A shows an example embodiment of a microfluidic device that includes microwells coupled in series by fluidic channels.

FIG. 19A shows an example embodiment of a microfluidic device that includes microwells 1930-1, 1930-2, 1930-3, 1930-4, 1930-5, and 1930-6 (collectively, microwells 1930) coupled in series by fluidic channels 1940. In some embodiments, a sample fluid may be flowed through the microfluidic device from a sample inlet 1910, which may include a reservoir of the sample fluid. The sample fluid may include a liquid and cells of interest suspended in the liquid. For example, each of the microwells 1930 may have a single cell that may have been trapped by any of the methods disclosed herein. This may be advantageous for a variety of applications such as single-cell nucleic acid amplification (e.g., PCR), single-cell nucleic acid sequencing, or any optical characterization following a biochemical reaction to the contents of a single cell. For example, a single cell may be trapped within each of the microwells 1930, and the DNA of this single cell may be amplified (e.g., using PCR) such that each microwell 1930 includes amplified DNA of a respective single cell. The sample fluid may be caused to flow through the microwells 1930 and the fluidic channels 1940 toward the vacuum source 1920. The vacuum source 1920 may be a syringe pump, a suction source, or any other device suitable for applying negative pressure to draw the sample fluid through the microwells 1930 and the fluidic channels 1940 toward the vacuum source 1920 (in the direction shown by the arrow). After the microwells are filled, flow may be stopped (e.g., by closing a valve at the sample inlet 1910 or at the vacuum source 1920). Thermal cycling may then be performed as discussed above. Although this description of FIG. 19A focuses on a sample fluid including cells, the disclosure contemplates that any sample fluid (with or without cells) may be used. For example, a sample fluid with nucleic acids, or any biochemical target molecules, may be used. In alternative embodiments, separate circulation channels may be placed near the microwells for filling the wells, similar to what is illustrated in FIGS. 12, 15, 16, and 17.

In some embodiments, as illustrated in FIG. 19A, the fluidic channels 1940 may be shaped to have a tortuous (e.g., a meandering or serpentine) pathway between the microwells may be used to form a predetermined distance between microwells so as to prevent or reduce diffusion between neighboring microwells 1930 (e.g., after the microwells 1930 have been filled and the suction source 1920 has stopped providing suction). As such, target molecules (e.g., DNA or other nucleic acids) within each of the microwells may be isolated therein without diffusion. This may be particularly useful for applications such as single-cell PCR, where the contents of each microwell need to be isolated. For example, referencing FIG. 19A, each of the microwells 1930 may include a single cell. The tortuous fluidic channels 1910 may allow for an adequate distance between the microwells 1930 such that diffusion of target molecules (e.g., DNA) is effectively prevented between the microwells 1930 for a total reaction time. For example, the tortuous fluidic channels 1940 may create a distance equal to or greater than 837 μm (e.g., 1.3 mm) between the microwells 1930, which may be sufficient to prevent diffusion for a total reaction time of about 600 seconds. The calculation of this distance is explained in further detail above.

Figure 19B:
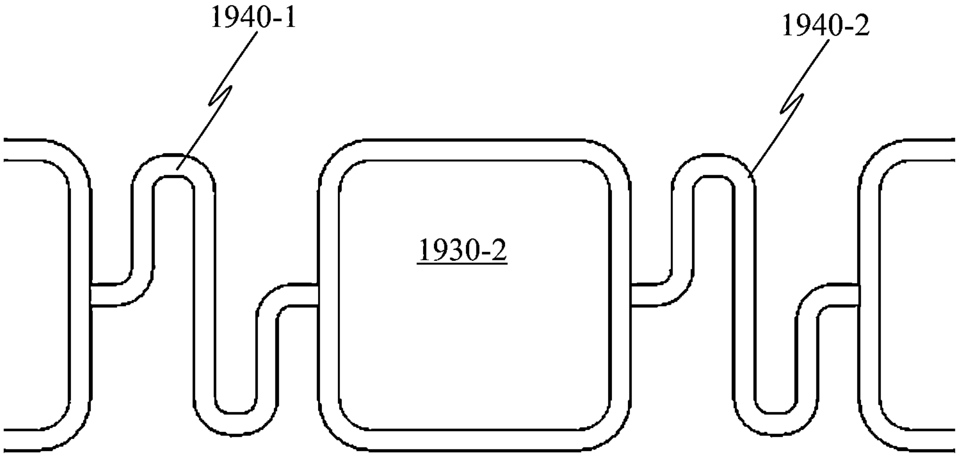
FIGS. 19B and 19C illustrate close-up views of a microwell of FIG. 19A and adjacent fluidic channels.
Figure 19C:
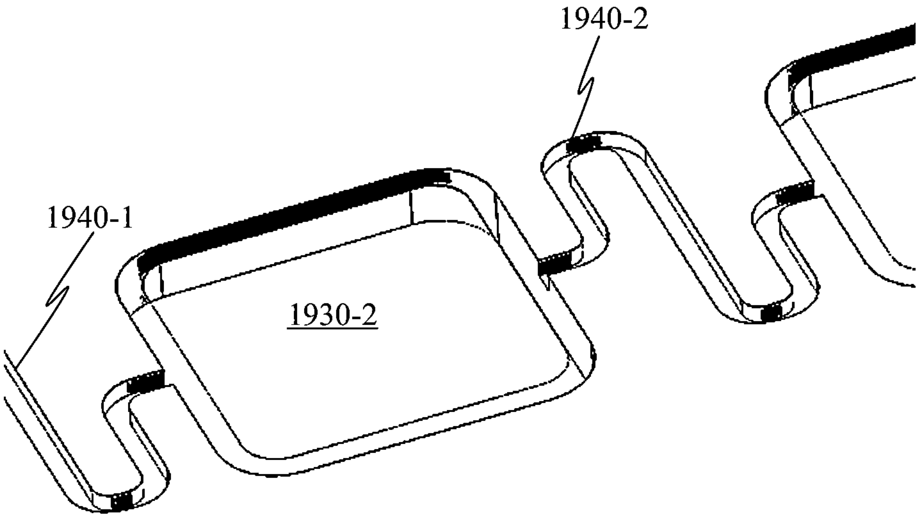

FIGS. 19B and 19C illustrate close-up views of a microwell 1930-2 of FIG. 19A and adjacent fluidic channels 1940-1 and 1940-2. As illustrated in these figures, the microwell 1930-2 is connected on two ends to adjacent microwells via the fluidic channels 1940-1 and 1940-2. As described above, these fluidic channels follow a tortuous pathway to create a predetermined distance of separation between adjacent microwells. In some embodiments, the microwells may be about 600×600 micrometers in dimension. The fluidic channels (e.g., 1940-1 and 1940-2) may have a cross section of about 40 micrometers×30 micrometers. The tortuous pathway between neighboring wells we have a length of 1.3 mm, which may be (considerably) higher than a distance suitable for preventing diffusion from neighboring microwells into microwell 1930-2. Discrete regions of a light absorbing layer may be placed adjacent to the microwells (e.g., within the microwells on a floor/ceiling of the microwells, on a substrate above or below the microwells, etc.). In some embodiments, the discrete regions may be slightly larger than the microwells, about the same size as the microwells, or smaller than the microwells.

Figure 20A:
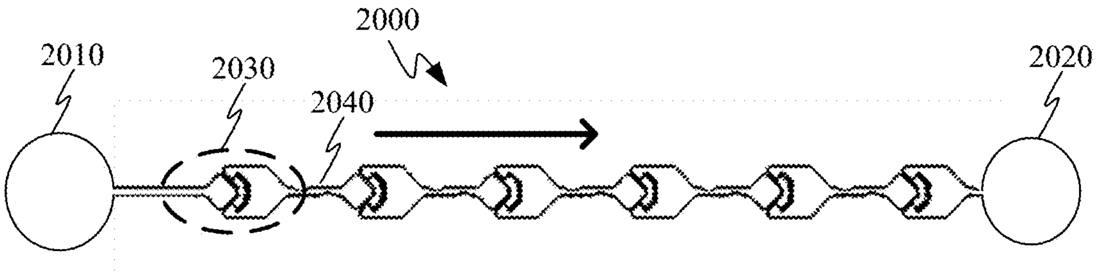
FIG. 20A shows another example embodiment of a microfluidic device that includes a plurality of microwells coupled in series by fluidic channels.

FIG. 20A shows another example embodiment of a microfluidic device 2000 that includes a plurality of microwells 2030 coupled in series by fluidic channels 2040. The illustrated microwells 2030 include a cell-trapping portion configured to isolate single cells within each microwell. As discussed above, isolating single cells may be advantageous for a variety of applications such as single-cell nucleic acid amplification (e.g., PCR), single-cell nucleic acid sequencing, or any optical characterization following a biochemical reaction to the contents of a single cell. As illustrated in these figures, the microwells 2030 are connected on two ends to adjacent fluidic channels 2040 in series such that a sample fluid may be flowed through the plurality of microwells 2030. For example, a sample inlet 2010 may include a reservoir of a sample fluid that includes cells of interest, and a suction source 2020 (e.g., a vacuum source, a syringe pump) may draw the sample fluid from the sample inlet 2010 through the microwells 2030 and the fluidic channels 2040 toward the suction source 2020 (in the direction illustrated by the arrow). The fluidic channels 2040 may have a length sufficient to reduce or prevent diffusion of target molecules (e.g., DNA) between the microwells 2030 once flow has stopped for a predetermined period (e.g., for a period of thermal cycling during PCR). In some embodiments, the fluidic channels 2040 may be shaped to have a tortuous pathway (similar to the fluidic channels 1940 illustrated in FIGS. 19A-19C) to increase the distance between the microwells to reduce or prevent diffusion for a predetermined period.

Figure 20B:
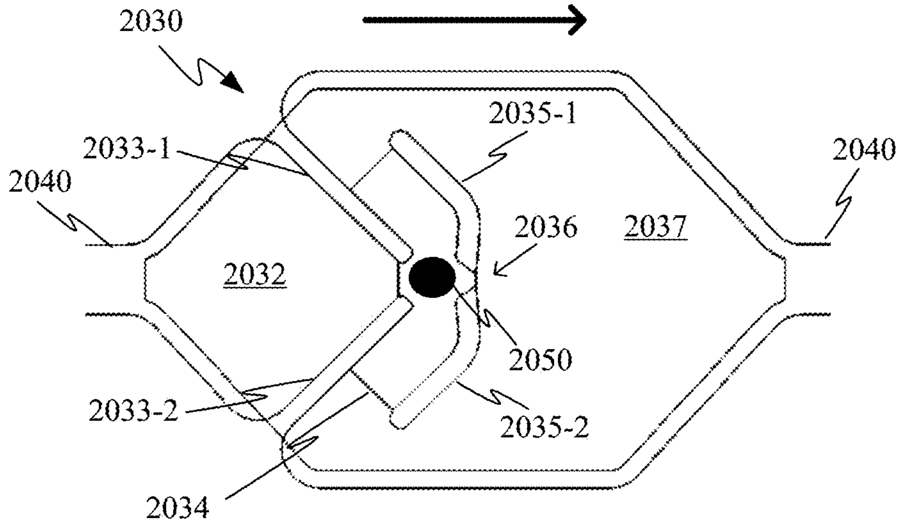
FIGS. 20B and 20C illustrate close-up views of a microwell of FIG. 20A and adjacent fluidic channels.
Figure 20C:
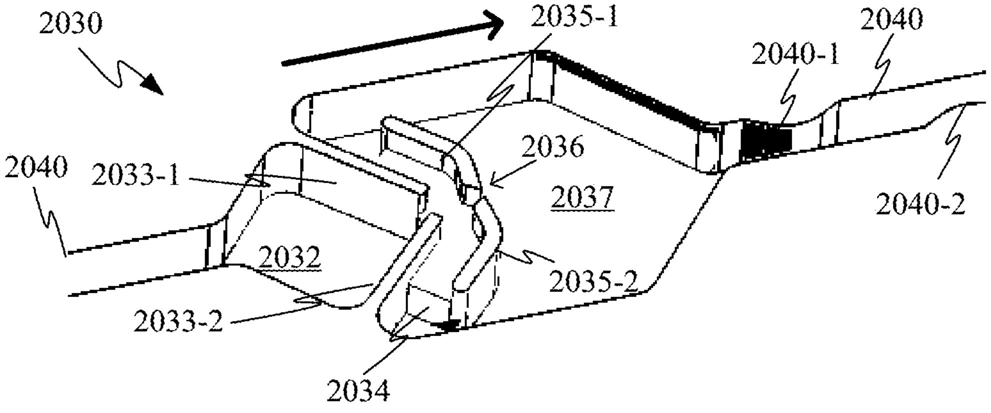

FIGS. 20B and 20C illustrate close-up views of a microwell 2030 of FIG. 20A and adjacent fluidic channels 2040. The microwell 2030 may be connected on two ends to adjacent microwells (or to the sample inlet 2010 or the suction source 2020) via the fluidic channels 2040. The microwells may have an anterior chamber 2032 into which the sample fluid is fed via a fluidic channel 2040. As illustrated, the anterior chamber 2032 may have a widened portion, which may be tapered toward a center by the guiding structures 2033-1 and 2033-2. These guiding structures serve to push cells in the sample fluid toward the center of the anterior chamber. The sample fluid is drawn into a shelf region 2034, which may be a raised platform. At some point, a cell 2050 in the sample fluid may be urged out of the anterior chamber 2032 and onto a central portion of the shelf region 2034. The cell 2050 may be held in this position by trapping walls 2035-1 and 2035-2. The microwell 2030 may have a reservoir portion 2037, which may surround the shelf region 2034 or may otherwise be fluidly coupled with the shelf region 2034, such that the sample fluid is able to flow from the shelf region 2034 to the reservoir portion 2037. As illustrated, in some embodiments, the trapping walls 2035-1 and 2035-2 may be dimensioned to facilitate this flow. In some embodiments, there may be an aperture 2036 between the trapping walls 2035-1 and 2035-2. The aperture 2036 may be near the central region of the shelf 2034. This aperture may be sized to admit the liquid of the fluid sample into the reservoir portion but not admit a cell of the fluid sample through the aperture. The shelf region 2034 may be a raised region, as can be seen in FIG. 20C, which may cause the shelf region 2034 to have a gap height less than surrounding regions. That is, when a microwell 2030 is filled, the shelf region may be shallower than surrounding regions. For example, the shelf region 2034 may have a gap height of 20 micrometers (such that the sample fluid, when the microwell 2030 filled, is 20 micrometers deep), while the reservoir portion 2037 may have a gap height of 50 micrometers (such that the sample fluid, when the microwell 2030 is filled, is 50 micrometers deep). The gap height is less on the shelf region 2034 so as to prevent multiple cells from being retained on the shelf. However, cells are still able to be forced past any trapped cells (e.g., the trapped cell 2050) so that other cells can be trapped within other microwells along the fluid path.

In some embodiments, as illustrated in FIG. 20C, the fluidic channels 2040 may include one or more constrictions 2040-1 and 2040-2 to urge cells within the sample fluid toward the center. This may help “focus” the cells to the center of the antechamber and may this facilitate the trapping of cells. In some embodiments, as illustrated in FIG. 20C, the constrictions may be offset in order to prevent clogging of the cells within the fluidic channel 2040.

In some embodiments, discrete regions of a light absorbing layer may be placed adjacent to the microwells 2030 (e.g., within the microwells on a floor/ceiling of the microwells, on a substrate above or below the microwells, etc.). This light absorbing layer may allow for photonic heating of the content of the microwells for applications such as thermal cycling (e.g., for PCR) as described elsewhere herein. For example, referencing FIG. 20C, a discrete region may be placed on the ceiling of the microwell 2030 or on a substrate above the microwell 2030. This placement may be advantageous for this embodiment, because such placement would allow for a flat discrete region that would not need to account for variations in gap height (e.g., as is the case due to the shelf region 2034). In some embodiments, the discrete regions may be slightly larger than the microwells, about the same size as the microwells, or smaller than the microwells.

Figure 21A:
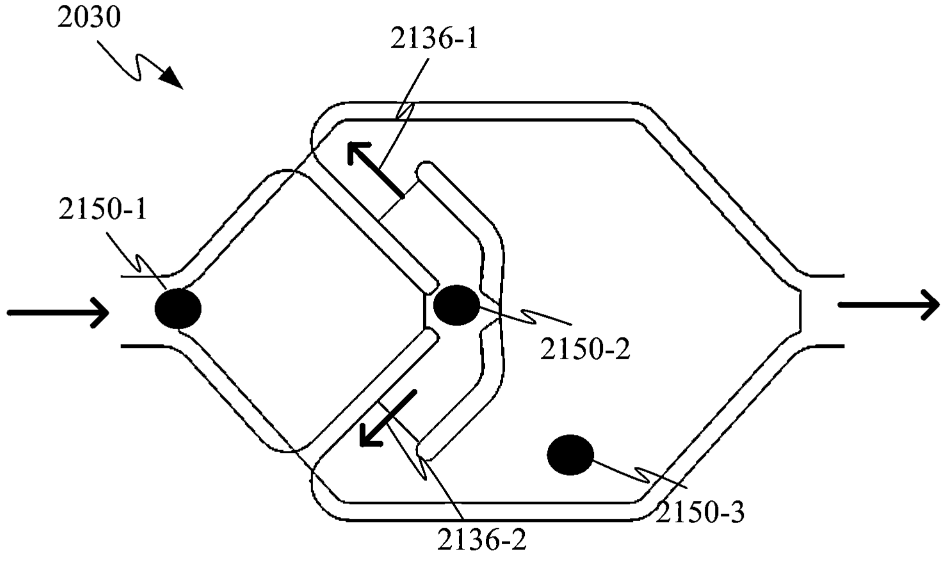
FIG. 21A illustrates the movement of cells of the sample fluid through the microwell 2030 in a cell-loading phase.

FIG. 21A illustrates the movement of cells 2150-1, 2150-2, and 2150-3 of the sample fluid through the microwell 2030 in a cell-loading phase. As illustrated, a cell 2150-2 may have initially passed through the antechamber into the shelf region and been trapped. Sample fluid may have continued to flow around the cell 2150-2, causing the cell 2150-3 to have exited the shelf region into the reservoir portion in a direction illustrated by either arrows 2136-1 or 2136-2. As flow continues, a new cell 2150-1 is seen entering the microwell 2030.

Figure 21B:
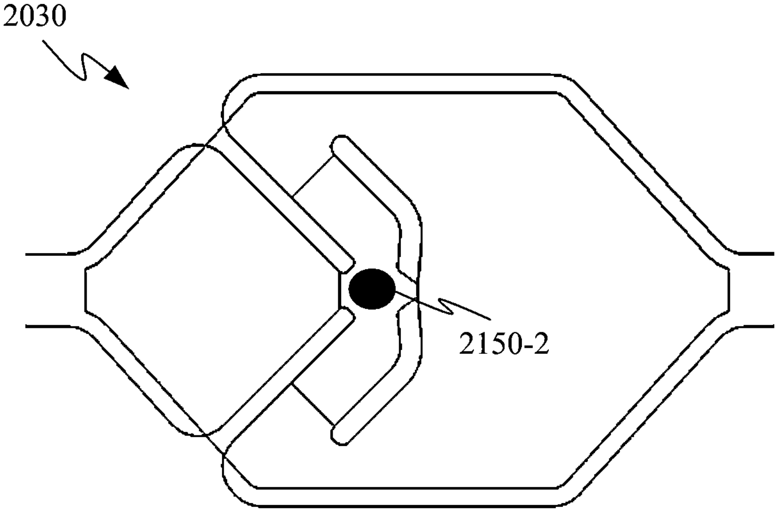
FIG. 21B illustrates the microwell after a flushing phase.

FIG. 21B illustrates the microwell 2030 after a flushing phase. Once the cell-loading phase is completed, a cell-flushing phase may be initiated to flush cells that are not trapped from the microwells. For example, a solution that does not include any cells may be flushed through the microwells of the microfluidic device 2000. This may help ensure that only trapped cells are in the cells microwells, such that single-cell applications may be performed.

Figure 22:
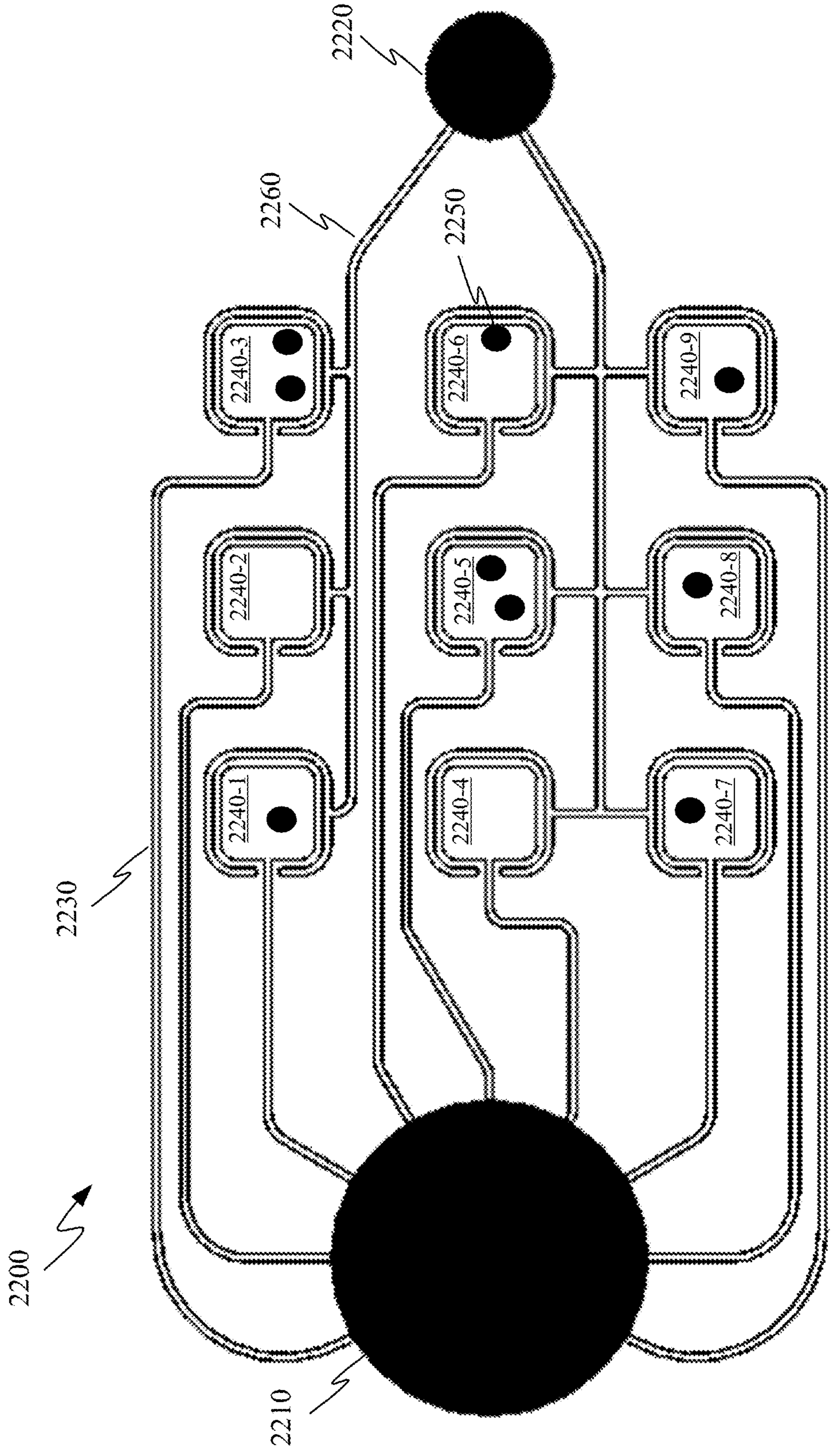
FIG. 22 illustrates another example embodiment of a microfluidic device with microwells that are isolated from each other.

FIG. 22 illustrates another example embodiment of a microfluidic device 2200 with microwells 2240-1 to 2240-9 (collectively, microwells 2040) that are isolated from each other. Each of these microwells 2240 may be coupled to a sample inlet 2210 via a separate fluidic channel 2230. The microwells 2240 may not have any outlet, such that their loading is complete once an adequate amount of sample fluid from the sample inlet 2210 flows into the microwells 2240. The microfluidic device 2200 may include a plurality of circulation channels that may at least partially surround the microwells 2240 (e.g., as illustrated in FIG. 22) or be near the microwells 2240. These circulation channels may be coupled to a suction source 2220. In some embodiments, the plurality of circulation channels may be a network of interconnected channels 2260 and may be coupled to a single suction source 2220, as illustrated in FIG. 22. In other embodiments, the plurality of circulation channels (or subsets of the circulation channels) may be connected separately two different suction sources. As illustrated in FIG. 22, once the microwells 2240 are loaded, a number of the microwells 2240 may include only one cell 2250 (e.g., the microwell 2240-1) or a small number of cells 2250 (e.g., the microwell 2240-5). Some microwells may not include any cells (e.g., the microwell 2240-2). Although this description of FIG. 22 focuses on a sample fluid including cells, the disclosure contemplates that any sample fluid (with or without cells) may be used. For example, a sample fluid with nucleic acids, or any biochemical target molecules, may be used.

The microwells may have linear dimensions of between 50 and 2000 micrometers, and preferably between 200 and 1000 micrometers, and the microwells may have depths between 20 and 1000 micrometers, and preferably between 40 and 200 micrometers. The interior volumes of the microwells may range from 0.05 to 4000 nanoliters, and preferably from 1.6 to 200 nanoliters. The fluidic channels connecting the chambers may have depths between 10 micrometers and 200 micrometers, and preferably between 40 and 100 micrometers. The widths of these fluidic channels may be between 10 and 500 micrometers, and preferably between 30 and 100 micrometers.

Similar to other embodiments above, the microfluidic device 2200 may include discrete regions of a light absorbing layer placed adjacent to the microwells 2240 (e.g., within the microwells on a floor/ceiling of the microwells, on a substrate above or below the microwells, etc.). This light absorbing layer may allow for photonic heating of the content of the microwells for applications such as thermal cycling (e.g., for PCR) as described elsewhere herein. In some embodiments, the discrete regions may be slightly larger than the microwells, about the same size as the microwells, or smaller than the microwells.

Figure 23:
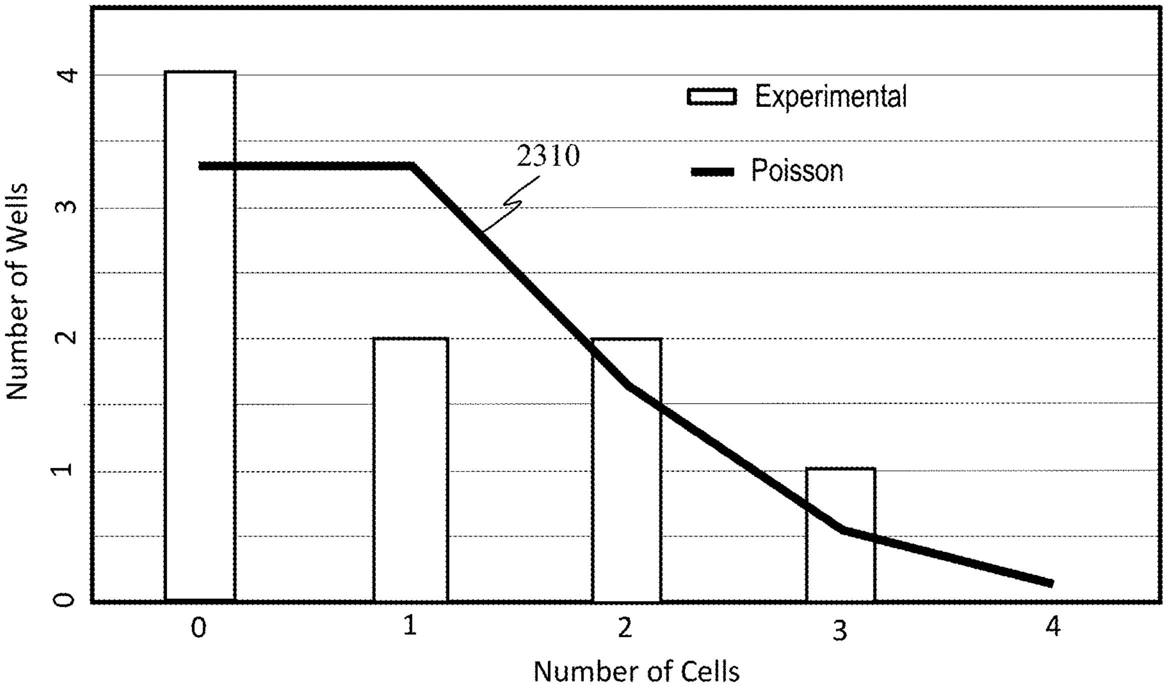
FIG. 23 illustrates an example graph showing experimental data of the observed distribution of the cells across the nine microwells of the microfluidic device illustrated in FIG. 22.

FIG. 23 illustrates an example graph 2300 showing experimental data of the observed distribution of the cells across the nine microwells of the microfluidic device 2200 illustrated in FIG. 22. The histogram illustrates the actual observed distribution of cells. In the particular experiment corresponding to the histogram illustrated in FIG. 23, there were four microwells with 0 cells, two microwells with 1 cell, two microwells with 2 cells, and one microwell with 3 cells. FIG. 23 also overlays a line graph 2310 corresponding to a Poisson distribution. As can be seen in FIG. 23 the observed data roughly corresponds to a Poisson distribution.

Figure 24:
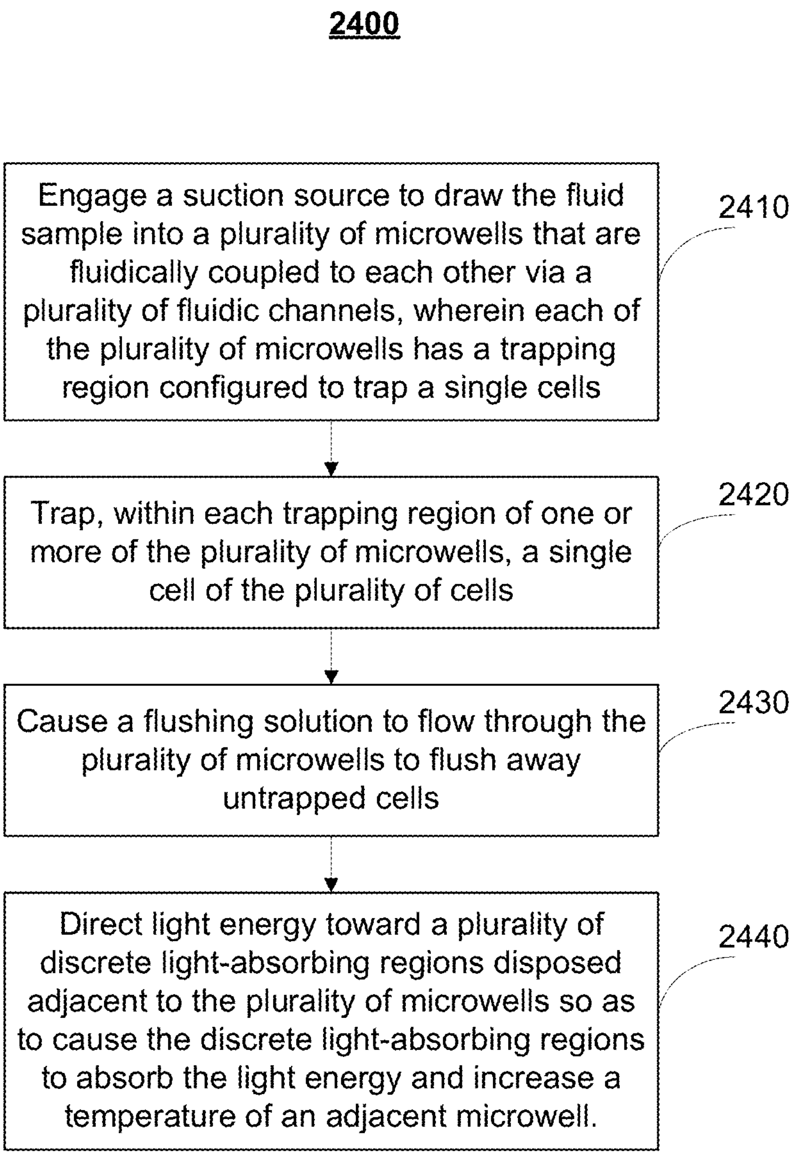
FIG. 24 illustrates an example method for thermal cycling portions of a fluid sample including a liquid and a plurality of cells on a microfluidic device.

FIG. 24 illustrates an example method 2400 for thermal cycling portions of a fluid sample including a liquid and a plurality of cells on a microfluidic device. The method may include engaging a suction source to draw the fluid sample into a plurality of microwells that are fluidically coupled to each other via a plurality of fluidic channels, wherein each of the plurality of microwells has a trapping region configured to trap a single cells (step 2410). The method may further include trapping, within each trapping region of one or more of the plurality of microwells, a single cell of the plurality of cells (step 2420). The method may include causing a flushing solution to flow through the plurality of microwells to flush away untrapped cells (step 2430). The method may include directing light energy toward a plurality of discrete light-absorbing regions disposed adjacent to the plurality of microwells so as to cause the discrete light-absorbing regions to absorb the light energy and increase a temperature of an adjacent microwell (step 2440).

Particular embodiments may repeat one or more steps of the method of FIG. 24, where appropriate. Although this disclosure describes and illustrates particular steps of the method of FIG. 24 as occurring in a particular order, this disclosure contemplates any suitable steps of the method of FIG. 24 occurring in any suitable order. Moreover, although this disclosure describes and illustrates an example method for thermal cycling portions of a fluid sample, including the particular steps of the method of FIG. 24, this disclosure contemplates any suitable method for thermal cycling portions of a fluid sample, including any suitable steps, which may include all, some, or none of the steps of the method of FIG. 24, where appropriate. Furthermore, although this disclosure describes and illustrates particular components, devices, or systems carrying out particular steps of the method of FIG. 24, this disclosure contemplates any suitable combination of any suitable components, devices, or systems carrying out any suitable steps of the method of FIG. 24. Finally, although the steps of the method of FIG. 24 are listed as distinct steps, the disclosure contemplates that any of the steps may be performed in combination (e.g., simultaneously and concurrently).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of thermal cycling on a microfluidic device, the method comprising:

providing a fluidic device comprising a plurality of microwells, wherein the fluidic device comprises a network of interconnected fluidic channels coupled to at least one sample inlet and the microwells, wherein the microwells are physically separated but connected to each other via the network of interconnected fluidic channels to provide discrete reaction chambers;

applying, using a suction outlet, a negative pressure to one or more circulation channels of the fluidic device to evacuate the one or more circulation channels, wherein the one or more circulation channels are located in proximity to at least a portion of the network of interconnected fluidic channels coupled to the at least one sample inlet and partially surround the plurality of microwells, and wherein the one or more circulation channels and the network of interconnected fluidic channels are disposed in a first substrate including a gas-permeable material;

causing a gas within the network of interconnected fluidic channels to diffuse in a plurality of directions through the first substrate into the one or more circulation channels;

causing one or more sample fluids to move from the sample inlet toward one or more of the plurality of microwells; and thermal cycling a first microwell of the plurality of microwells.

2. The method of claim 1, wherein the first microwell is connected to a second microwell via a first fluidic channel, wherein the first microwell is separated from the second microwell by a first distance that is greater than a distance at which one or more molecules are capable of diffusing during thermal cycling.

3. The method of claim 2, wherein the one or more molecules comprises nucleic acids, nucleotide molecules, or fluorescent dyes.

4. The method of claim 3, wherein the first distance is between about 100 μm to 1 mm.

5. The method of claim 1, wherein the microwells are disposed in the first substrate mounted to a second substrate, wherein a plurality of films are arranged across regions of the second substrate that correspond to positions of the microwells, the films being configured to absorb photonic energy to increase a temperature of a corresponding microwell, and wherein thermal cycling in the first microwell comprises:

applying a first photonic energy to a first film corresponding to the first microwell such that the first film absorbs the first photonic energy to increase a temperature of the first microwell by a first amount.

6. The method of claim 5, wherein the fluidic device comprises a number of photonic energy sources corresponding to a number of the microwells of the fluidic device.

7. The method of claim 5, further comprising applying a second photonic energy to a second film corresponding to a second microwell such that the second film absorbs the second photonic energy to increase a temperature of the second microwell by a second amount.

8. The method of claim 7, wherein the one or more sample fluids in the first microwell and the second microwell is thermally cycled, and wherein the one or more sample fluids in a first fluidic channel connecting the first microwell to the second microwell remains substantially not thermally cycled.

9. The method of claim 7, wherein the first photonic energy is emitted by a first source, and wherein the second photonic energy is emitted by a second source different from the first source.

10. The method of claim 7, wherein the first amount is different from the second amount.

11. The method of claim 10, wherein the first film and the second film are patterned films, wherein the first film is of a different pattern than the second film.

12. The method of claim 1, wherein the first substrate comprises silicon, rubber, or polydimethylsiloxane (PDMS).

13. The method of claim 1, further comprising a vacuum source or a syringe pump operably connected to the suction outlet.

14. The method of claim 1, wherein the plurality of microwells are arranged in an array.

15. The method of claim 1, wherein each microwell has an interior volume between 0.05 to 4,000 nanoliters.

16. The method of claim 1, wherein the one or more sample fluids comprise a biological sample.

17. The method of claim 1, further comprising detecting a target molecule in the one or more sample fluids following thermal cycling.

18. The method of claim 1, wherein the network of interconnected fluidic channels comprises microchannels having a width between 10 μm and 500 μm.

19. The method of claim 1, wherein thermal cycling comprises performing at least 30 thermal cycles.

* * * * *